(12) United States Patent  
Kawase et al.

(10) Patent No.: US 6,206,681 B1
(45) Date of Patent: Mar. 27, 2001

(54) MOLD FOR PRODUCING RESIN-MOLDED PRODUCT

(75) Inventors: Hajime Kawase; Osamu Sasai; Yasunori Wada; Shinsuke Tsutsui; Hikaru Ito, all of Yokkaichi (JP)

(73) Assignee: Sumitomo Wiring, Mie (JP)

( * ) Notice: Subject to any disclaimer, the term of this patent is extended or adjusted under 35 U.S.C. 154(b) by 0 days.

(21) Appl. No.: 09/246,692

(22) Filed: Feb. 9, 1999

Related U.S. Application Data

(62) Division of application No. 08/613,526, filed on Mar. 11, 1996, now Pat. No. 5,915,760.

(30) Foreign Application Priority Data

| Mar. 16, 1995 | (JP) | 7-86155 |
| Mar. 16, 1995 | (JP) | 7-86156 |
| Mar. 17, 1995 | (JP) | 7-86437 |
| Mar. 17, 1995 | (JP) | 7-86438 |
| Mar. 17, 1995 | (JP) | 7-86439 |
| Mar. 17, 1995 | (JP) | 7-86440 |
| Mar. 17, 1995 | (JP) | 7-86442 |
| Mar. 17, 1995 | (JP) | 7-86443 |
| Jul. 27, 1995 | (JP) | 7-212577 |
| Jul. 31, 1995 | (JP) | 7-215178 |
| Aug. 7, 1995 | (JP) | 7-222657 |
| Sep. 18, 1995 | (JP) | 7-264899 |

(51) Int. Cl.[7] .................................................. B28B 3/10
(52) U.S. Cl. .................. 425/517; 425/317; 425/556; 425/572; 425/577; 425/578; 264/238
(58) Field of Search .................. 425/517, 519, 425/570, 572, 588, 577, 556, 317; 264/238

(56) References Cited

U.S. PATENT DOCUMENTS

| 4,295,814 | 10/1981 | Rosenberg | 425/517 |
| 4,519,761 | * 5/1985 | Kenmochi et al. | 425/135 |
| 5,108,317 | 4/1992 | Beinhauer et al. | 439/736 |
| 5,665,397 | * 9/1997 | Fisher et al. | 425/116 |
| 5,709,831 | 1/1998 | Endo et al. | 264/238 |
| 5,814,356 | * 9/1998 | Ito et al. | 425/556 |

FOREIGN PATENT DOCUMENTS

| 2157132 | 5/1973 | (DE) . |
| A1-3926682 | 2/1991 | (DE) . |
| A1-4241409 | 6/1994 | (DE) . |
| A1-4412775 | 10/1995 | (DE) . |
| A2-0733463 | 9/1996 | (EP) . |
| 2537915 | 6/1984 | (FR) . |
| 57-135122 | 8/1982 | (JP) . |
| 02102012 | 4/1990 | (JP) . |
| B2-2-29011 | 6/1990 | (JP) . |
| 04105913 | 4/1992 | (JP) . |
| 06297501 | 10/1994 | (JP) . |

* cited by examiner

*Primary Examiner*—Harold Pyon
*Assistant Examiner*—Emmanuel Luk
(74) *Attorney, Agent, or Firm*—Oliff & Berridge, PLC

(57) ABSTRACT

A movable mold is movable toward and away from a fixed mold so as to close and open the mold. The fixed mold includes an intermediate plate facing a movable-side mold plate. This intermediate plate has a retainer-molding recess which cooperates with the movable-side mold plate to form a retainer-molding cavity, and a core pin, which cooperates with a housing-molding recess to form a housing-molding cavity, is mounted on the intermediate plate. A retainer, molded in the molding cavity, is moved downward by an ejector pin into a position where the retainer is disposed coaxial with a housing. Then, the two molds are again closed together, so that the housing and the retainer are connected together, and then this assembled product is taken out.

6 Claims, 37 Drawing Sheets

MOLD FOR PRODUCING RESIN-MOLDED PRODUCT

This is a Division of application Ser. No. 08/613,526 filed Mar. 11, 1996, now U.S. Pat. No. 5,915,760 issued on Jun. 29, 1999.

BACKGROUND OF THE INVENTION

This invention relates to a method of and a mold for producing a connector, and more particularly to a method of producing a connector of the type having a retainer attached to a connector housing from a front side thereof or a rear side thereof.

There are known connectors called "front retainer type" and connectors called "rear retainer type" (see FIGS. 6 and 7). Reference is first made briefly to the front type connector shown in FIG. 6. Cavities 31 for respectively receiving metal terminals 30 are formed in a connector housing 3, and a lance 32 for engagement with the metal terminal 30 is formed in the cavity 31. The lance 32 is of the cantilever type, and therefore is elastically deformable. When the metal terminal 30 is inserted into the cavity, the lance 32 is first elastically deformed or flexed to be received in a flexure space formed in a lower surface of the cavity, and when the metal terminal 30 is further inserted into a predetermined position, the lance 32 is restored to engage the metal terminal 30 (primary retained condition).

A retainer 4 for preventing withdrawal of the metal terminals 30 is attached to a front portion of the connector housing 3. Holder piece portions 34 project from the retainer 4, and can be inserted respectively into the flexure spaces for the respective lances 32. When the retainer 4 is attached to the housing 3, each holder piece portion 34 is brought into facing relation to the underside of the associated lance 32, thereby limiting the flexing of the lance 32, so that the metal terminal 30 is positively prevented from withdrawal (secondary retained condition).

Although not shown in detail, the retainer 4 can be held in two positions, that is, a provisionally-retained position (where the depth of insertion of the retainer 4 into the housing 3 is small) and a completely-retained position (where the depth of insertion is large). In the provisionally-retained position of the retainer, the flexing of the lances 32 is allowed, thereby enabling the insertion of the metal terminals 30. In the completely-retained position of the retainer, the flexing of the lances 32 is limited as described above, thereby preventing the metal terminals 30 from being withdrawn.

On the other hand, in the rear retainer-type connector shown in FIG. 7, cavities 40 are formed in a connector housing, and metal terminals 42 can be inserted into these cavities, respectively. A rear retainer can be moved relative to the connector housing between a provisionally-retained position and a completely-retained position as in the front type connector. In the provisionally-retained position of the rear retainer, a terminal retaining pawl 44, formed in each cavity, is primarily engaged with a jaw 43 of the associated metal terminal 42. When the rear retainer is moved into the completely-retained position, edge portions 41 of the rear retainer engage rear ends of the metal terminals 42, respectively, in a secondary manner, thereby holding the metal terminals 42 against withdrawal.

In the production of either of the above connectors, the housing 3 and the retainer 4 have been molded separately from each other, using separate molding machines, and these molded parts have been brought into an assembling site where the parts have been assembled together to form the connector. This assembling operation has been carried out either by an automatic machine equipped with a part feeder or by a manual operation.

In the above conventional techniques, however, the molding of the housing 3 and retainer 4 and the assembling operation of connecting them together have been effected separately, and the finished product has been obtained through the molding step, the conveyance step and the assembling step. Moreover, when the parts have been assembled by the operator, an examination step has been further required. Thus, many steps have been required for obtaining the finished product, and this has increased the manufacturing cost. Furthermore, it is necessary to take care of the mold for the housing 3 and the mold for the retainer 4, and therefore its management cost has been added.

SUMMARY OF THE INVENTION

The present invention has been made in view of the above problems of the prior art, and an object of the invention is to provide a method of producing a connector at low costs.

To achieve the above object, the invention provides a method and a mold metal of producing a resin-molded product assembled by at least two resin components, in that a plurality of resin component be fit with each other are molded by a pair of metal molds which are movable to be close to and away from each other in an axial direction, the resin components are moved to face with each other, one of the resin components is moved to be close to the other resin component to assemble the resin components together in a predetermined condition.

In the invention, when the two molds are closed together, the plurality of molding cavities are formed between the two molds. The molten resin is filled in these cavities to mold the resin components. After the resin is solidified, the molds are opened away from each other, so that the molded resin components to be assembled together are retained on the two molds, respectively. Then, the molded resin components are moved in the mold by the moving mechanism, so that they are faced each other in the common axis. Then, at least one of the resin components is moved by the assembling mechanism toward the other resin component, so that the two resin components are assembled together in the predetermined condition.

According to the invention, the sequential steps, that is, the molding of the plurality of resin components and the assembling operation for these molded resin components, are carried out in the mold, and therefore the resin-molded product can be obtained at low costs because of the shortened process. And besides, in the open condition of the mold, the resin components can be assembled together by slightly operating the assembling mechanism, and therefore the time required for this operation is shorter as compared with the case where resin components are assembled together utilizing a mold-closing operation, and also the required energy is smaller.

DETAILED DESCRIPTION OF PREFERRED EMBODIMENTS

First Embodiment

Figure 1:
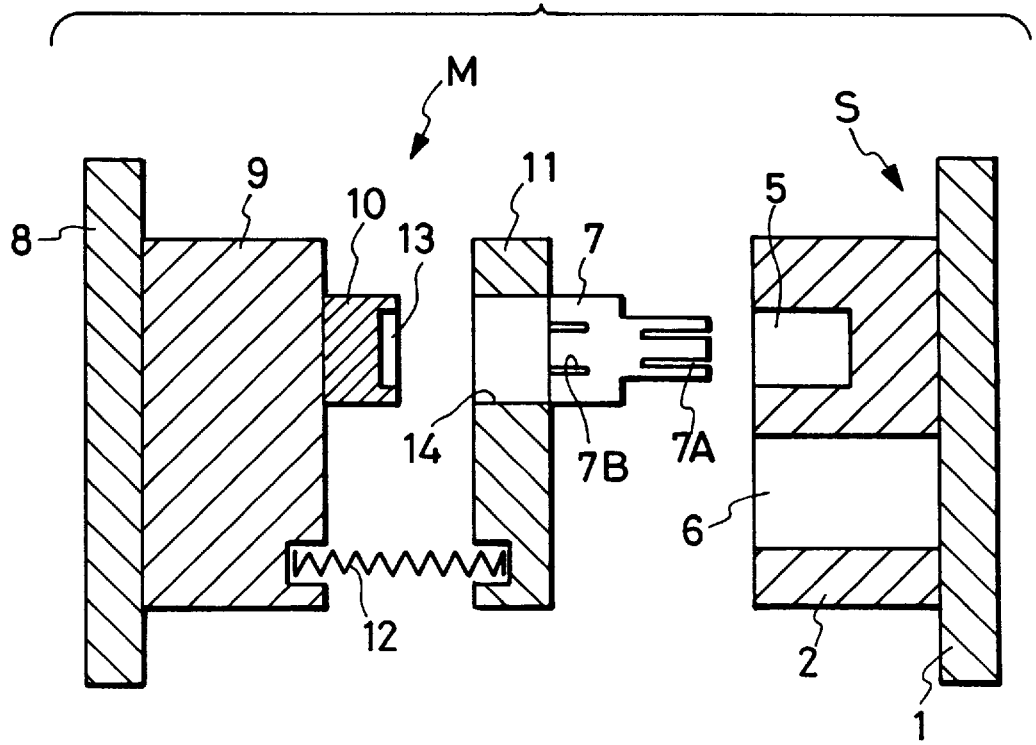
FIG. 1 is a cross-sectional view showing a first embodiment of a mold of the invention.

A first preferred embodiment of the present invention will now be described with reference to FIGS. 1 to 7. Although this embodiment is directed to a front retainer-type connector as described above, the invention can be applied to a rear retainer-type connector. A mold for performing the method of this invention is incorporated in an injection molding system, and important portions thereof are generally as described below, but FIGS. 1 to 5 are simplified for explanation purposes, and the mold does not strictly correspond to the connector shown in FIG. 6.

The mold of this embodiment comprises a movable mold, and a fixed mold, and the movable mold S comprises a movable-side mold plate 2 secured to a movable-side die plate 1. A housing-molding recess 5 for forming a housing 3 of the connector is formed in a molding surface of the movable-side mold plate 2, and a relief hole 6 for receiving an intermediate core 7 is formed in this molding surface, and is disposed below the housing-molding recess 5, the axes of the recess 5 and the relief hole 6 being disposed on a common vertical plane (in the drawings). The movable die plate 1 is connected to a drive mechanism (not shown), and is movable a predetermined stroke in right and left directions (in the drawings).

The fixed mold M comprises a fixed-side mold plate 10 mounted on a fixed-side die plate 8 through a mounting plate 9, and the intermediate core 7 mounted on an intermediate plate 11.

The fixed-side mold plate 10 is mounted on that side or surface of the mounting plate 9 facing the movable mold. A retainer-molding recess 13 is formed in that surface of the fixed-side mold plate 10 facing the movable mold, and is disposed coaxially with the housing-molding recess 5 in the horizontal direction (in the drawings).

The intermediate plate 11 is mounted on the fixed-side die plate 8, and is disposed between the fixed-side mold plate 10 and the movable-side mold plate 2. A spring 12 is provided between the mounting plate 9 and the intermediate plate 11, and urges the intermediate plate 11 away from the mounting plate 9. A relief window 14 is formed through that portion of the intermediate plate 11 disposed in registry with the fixed-side mold plate 10, and this relief window 14 is disposed coaxially with the housing-molding recess 5 and the retainer-molding recess 13. The intermediate plate 11 is movable in the left and right directions (in the drawings), with the fixed-side mold plate 10 closely fitted in the relief window 14, and is therefore movable into intimate contact with the mounting plate 9.

The intermediate core 7 is provided on that surface of the intermediate plate 11 facing the movable mold. The intermediate core 7 is normally located in registry with the relief window 14, and its distal and proximal portions are opposed to the movable-side mold plate 2 and the fixed-side mold plate 10, respectively. A core-side molding portion 7A is formed in that surface of the intermediate core 7 facing the mold plate 2, and cooperates with the molding recess 5 in the mold plate 2 to form a molding cavity for molding the housing 3 when the two molds S and M are closed together. A core-side molding portion 7B is formed in that surface of the intermediate core facing the mold plate 10, and cooperates with the molding recess 13 in the mold plate 10 to form a molding cavity for molding the retainer 4 when the two molds S and M are closed together. The intermediate core 7 is normally disposed in registry with the relief window 14 as described above. The intermediate core 7 is connected to a reciprocating slide mechanism so that it can be moved downward (in the drawings) into registry with the relief hole 6 in the movable mold before the housing 3 and the retainer 4 are connected together, and when the housing and the retainer are connected together, the intermediate core 7 is inserted into the relief hole 6 so that it will not interfere with the movable mold.

When the molded retainer 4 and the molded housing 3 are retained respectively in the molding recesses 5 and 13 after the mold is opened, those surfaces of the molded retainer and the molded housing to be connected together are exposed in opposed relation to each other. Gates (not shown) are open respectively to the two molding recesses, and a molten resin is filled in these molding recesses through the respective gates.

The molding of the housing 3 and the retainer 4 using the mold of the above construction, as well as the assembling procedure, will now be described.

In the mold-open condition shown in FIG. 1, when the movable mold is moved toward the fixed mold, the movable-side mold plate 2 first abuts against the intermediate plate 11, so that the core-side molding portion 7A of the intermediate core 7 is inserted into the housing-molding recess 5, thereby forming the housing-molding cavity therebetween. When the movable mold S further advances, the intermediate plate 11 is retracted while compressing the spring 12. Then, when the intermediate plate 11 comes into intimate contact with the mounting plate 9, the fixed-side mold plate 10 enters the relief window 14, so that the core-side molding portion 7B of the intermediate core 7 and the retainer-molding recess 13 cooperate with each other to form the retainer-molding cavity therebetween.

Figure 2:
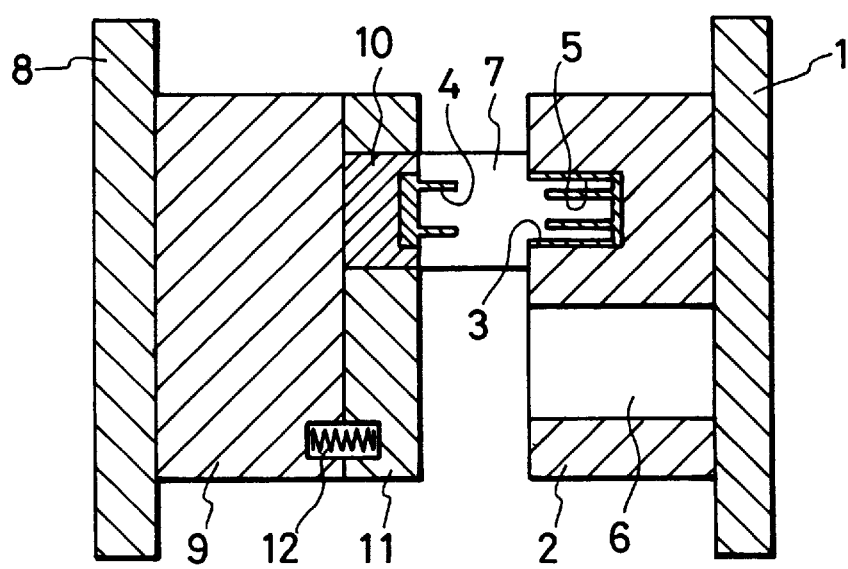
FIG. 2 is a cross-sectional view showing a molding condition in the first embodiment.

After the mold is thus closed, the molten resin is filled in the housing-molding cavity, formed between the intermediate core 7 and the mold plate 2, and the retainer-molding cavity formed between the intermediate core 7 and the mold plate 10 (see FIG. 2). Then, when the resin is solidified upon lapse of a predetermined period of time, the movable mold is moved back to open the mold. As a result, the intermediate core 7 is withdrawn from the housing-molding recess 5, and since the intermediate plate 11 is spaced apart from the mounting plate 9 under the influence of the spring 12, the fixed-side mold plate 2 is withdrawn from the relief window 14. At this time, the housing 3 is retained in the housing-molding recess 5, and the retainer 4 is retained in the retainer-molding recess 13.

Figure 3:
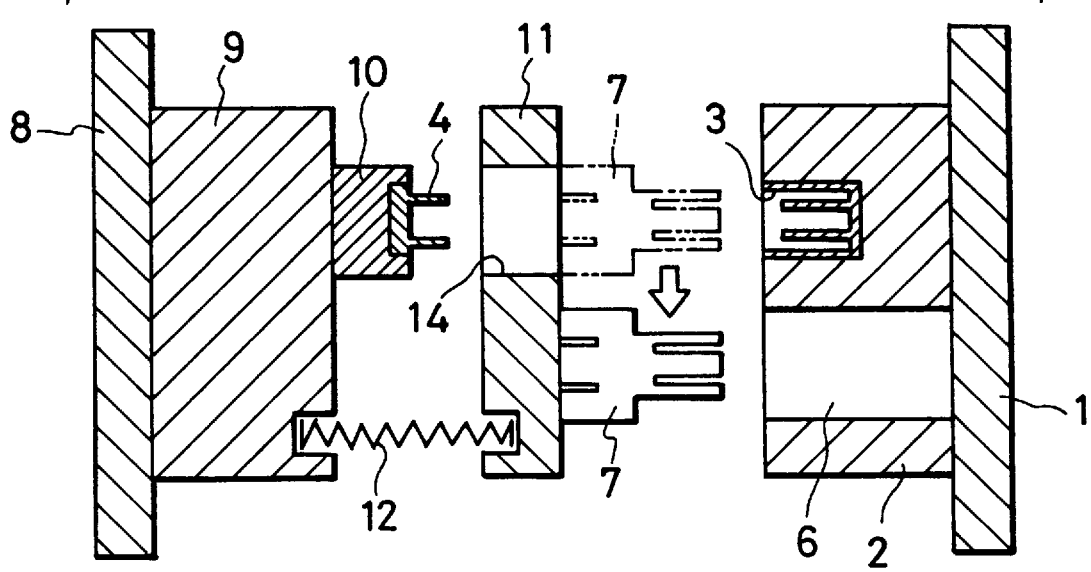
FIG. 3 is a cross-sectional view showing the movement of an intermediate core in a mold-open condition in the first embodiment.
Figure 4:
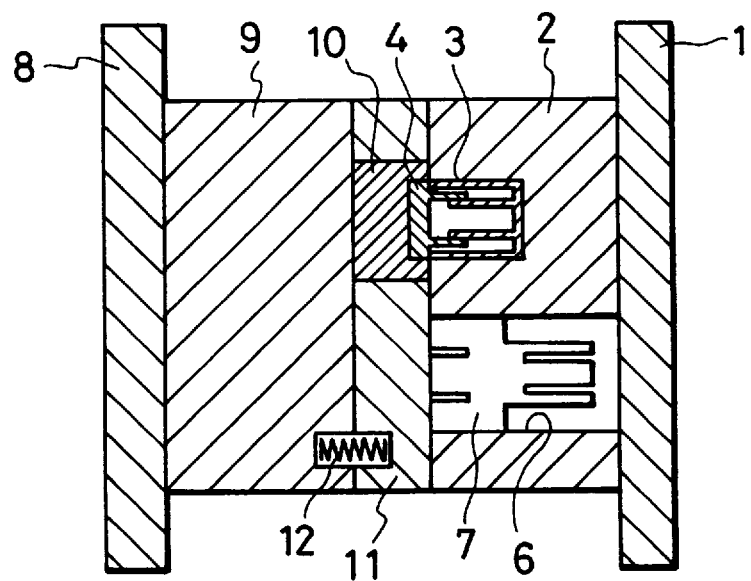
FIG. 4 is a cross-sectional view showing a condition in which a housing and a retainer are connected together in the first embodiment.

Then, the intermediate core 7 is moved by the reciprocating slide mechanism (not shown) into registry with the relief hole 6 in the movable mold (that is, moved from the position indicated in phantom to the position indicated by solid lines in FIG. 3). As a result, the relief window 14 is open in the right and left directions, and the molded housing 3 and the retainer 4 are disposed in opposed, coaxial relation to each other.

Then, the movable mold S is again moved left (in the drawings) to move the intermediate plate 11 back into intimate contact with the mounting plate 9. During this time, the intermediate core 7 is inserted into the relief hole 6 in the movable mold. At the same time, the fixed-side mold plate 10 again enters the relief window 14 in the intermediate plate 11, and is brought into intimate contact with the movable-side mold plate 2. As a result, the retainer 4 is connected to the front side portion of the housing 3 in a provisionally-retained condition.

Figure 5:
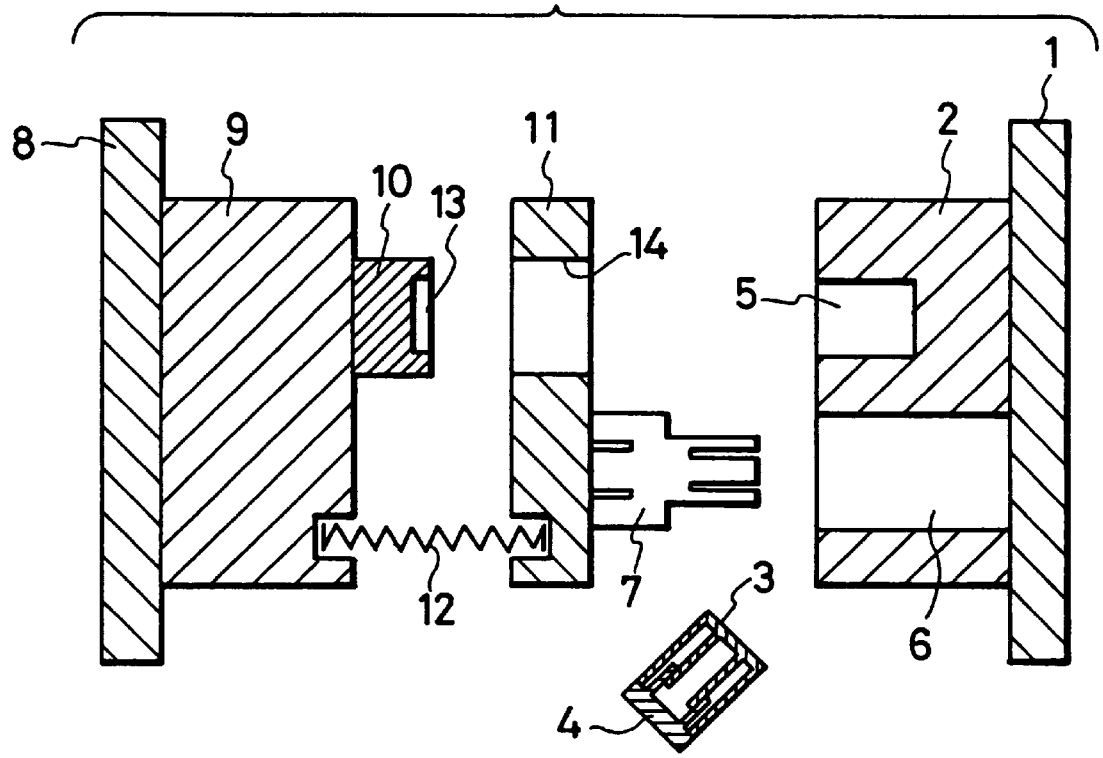
FIG. 5 is a cross-sectional view showing a condition in which the finished product in the first embodiment is taken out from the mold.
Figure 6:
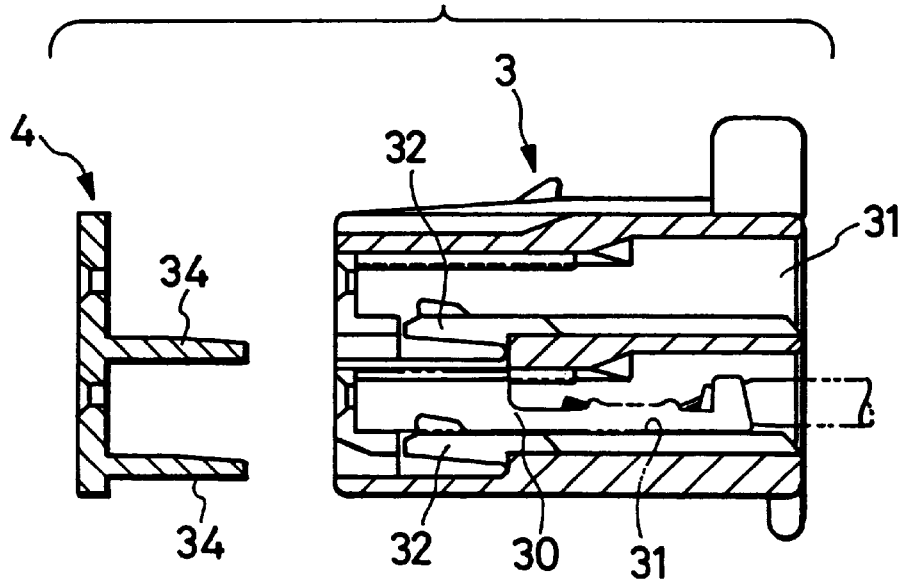
FIG. 6 is a cross-sectional view of a connector to be molded in the embodiments of the invention.
Figure 7:
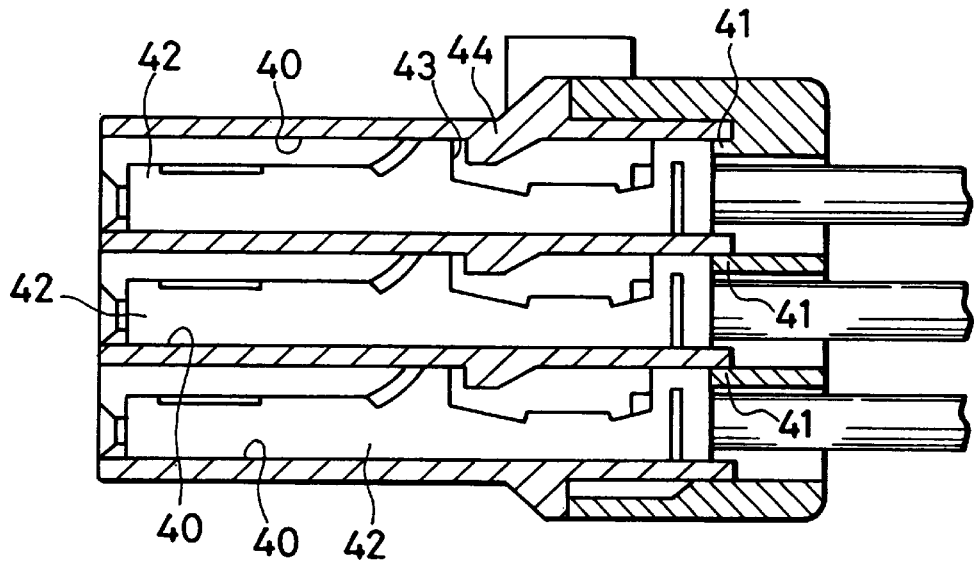
FIG. 7 is a cross-sectional view of a rear retainer-type connector which can be molded in the embodiments of the invention.
Figure 8:
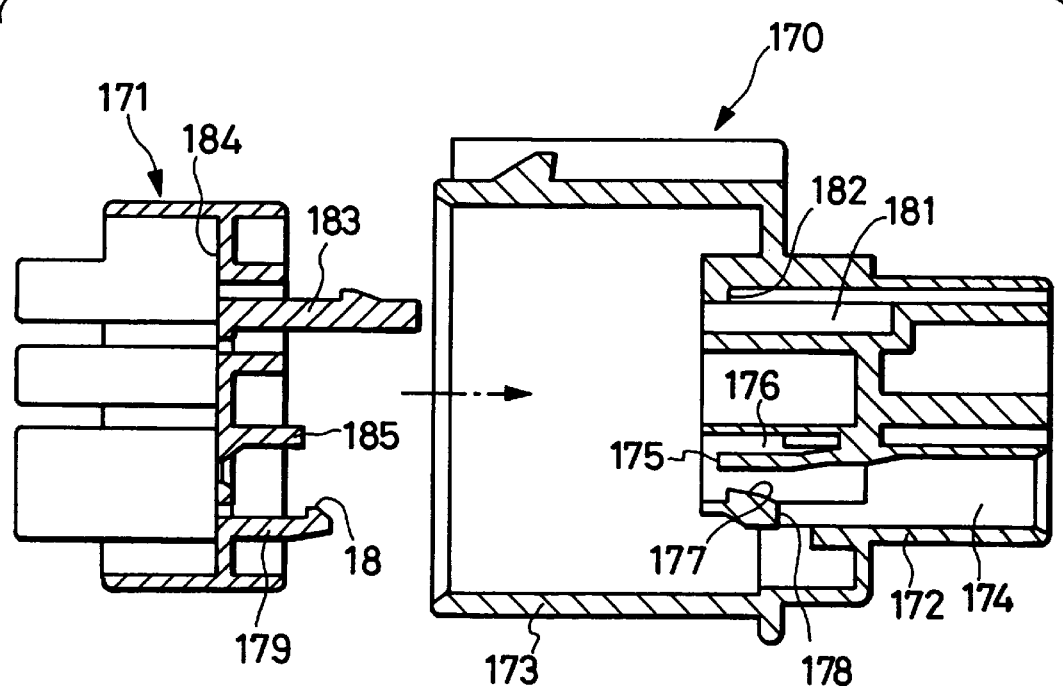
FIG. 8 is a cross-sectional view of a connector which can be molded in embodiments of the invention.

Then, when the movable mold is again spaced apart after the above operation, the connector, having the housing 4 and the retainer 4 connected together, remains in the housing-molding recess 5, and this connector is ejected from the mold by an ejector pin (not shown) operated in accordance with the mold-opening operation (or independently thereof). FIG. 5 shows a condition during the mold-opening operation, and thereafter the fixed side is returned to the initial position (shown in FIG. 1) to be ready for a subsequent molding operation.

As described above, in this embodiment, the step of molding the housing 3 and the retainer 4 and the assembling step of connecting them together can be carried out at the same time, and therefore the conveyance and the assembling operation as required in the conventional method are not necessary, and the lead time for the finished product is shortened by the shortened process, and the manufacturing cost can be reduced. And besides, since different kinds of molded products, that is, the housing 3 and the retainer 4, can be molded in one mold, this is advantageous from the viewpoint of management of the mold.

Second Embodiment

A second embodiment of the present invention will now be described with reference to FIGS. 8 to 15. First, a connector to be molded will be briefly described with reference to FIG. 8. Although the connector to be described here is a so-called front retainer-type connector, the invention can be applied to a rear retainer-type connector.

The connector comprises a connector housing 170 and a retainer 171 both of which are integrally molded of a synthetic resin. The housing 170 includes a rear portion (right-hand portion in FIG. 8) defining a base portion 172 for receiving metal terminals (not shown), and a front portion (left-hand portion) defining a hood portion 173 of a larger size into which distal end portions of the metal terminals are projected in juxtaposed relation, the hood portion 173 being open in a direction of attachment of the retainer 171.

Terminal receiving chambers 174 are formed in the base portion 172, and extend along the axis of the housing 170, and the metal terminal can be inserted into the associated terminal receiving chamber 174 from the rear side. An elastic piece portion 175, which is elastically deformable upwardly (in the drawings), is formed in the terminal receiving chamber 174 in a cantilever manner. Upon insertion of the metal terminal, the elastic piece portion 175 is brought into a retraction space 176 provided on the upper side (in the drawings) thereof. A retaining projection 177 is formed in opposed relation to the retraction space 176, and when the metal terminal is inserted into a predetermined-depth position, the retaining projection 177 engages the metal terminal. A completely-retaining edge 178 is formed inwardly of the retaining projection 177, and when the retainer 171 is completely retained, the completely-retaining edge 178 engages a connection arm 179 of the retainer 171.

An insertion hole 181 for receiving a holder piece portion 180 (described later) of the retainer 171 is formed in the base portion 172, and extends to a predetermined depth along the axis of the housing 170. A retaining step 182 is formed on an inner surface of the insertion hole 181 adjacent to a front end thereof, and when the retainer 171 is in a provisionally-retained condition, this retaining step 182 engages a provisionally-retaining pawl 183 of the holder piece portion 180. The depth of the insertion hole 181 is sufficiently large to allow the holder piece portion 180 to be inserted thereinto beyond the retaining step 182 until the retainer 171 is completely retained.

The retainer 171 has a square shape as a whole so that it can be fitted into the hood portion 173, and a base plate 184, which can abut against the front end of the base portion 172, is formed in the retainer 171. The following three projected portions are formed on the base plate 184. The holder piece portion 180, which is the longest among the three, is formed on an upper portion of the base plate 184, and extends in the direction of insertion of the retainer into the hood portion 173. The holder piece portion 180 can be inserted into the insertion hole 181, and in the provisionally-retained position of the retainer 171, the provisionally-retaining pawl 183, formed on the holder piece portion 180 intermediate the opposite ends thereof, engages the provisionally-retaining step 182 formed on the inner surface of the insertion hole 181. The limitation piece portion 185, which is the shortest, extends from a central portion of the base plate 184 along the axis. In the completely-retained position of the retainer 171, this limitation piece portion 185 is inserted into the retraction space 176, and in the provisionally-retained position of the retainer 171, the limitation piece portion 185 is spaced away from the retraction space 176. Therefore, in this provisionally-retained position, each metal terminal can be inserted into the associated terminal receiving chamber 174, but when the retainer 171 is moved into the completely-retained position, the limitation piece portion 185 is inserted into the retraction space 176, thereby limiting the flexing of the elastic piece portion 175. The elastically-deformable connection arm 179 extends from a lower portion (in the drawings) of the base plate 184 along the axis, and a hook 186 is formed at its distal end. In the completely-retained position of the retainer 171, the hook 186 elastically engages the completely-retaining edge 178.

The construction of a mold for producing the connector of the above construction will now be described. In this embodiment, the mold is incorporated in an injection molding system. In the drawings, important portions are shown merely broadly, and details thereof are omitted for the sake of simplicity of the description. Therefore, details of the above construction of the connector are not shown, and for example the number and shape of core pins (described later) are merely broadly shown in the drawings.

The mold of this embodiment comprises a movable mold and a fixed mold. The fixed mold 101, shown at a left side in the drawings, includes a fixed-side mounting plate 103, and a fixed-side mold plate 105 (at a right side in the drawings) is mounted on the plate 103 through a spacer block 104. An intermediate plate 132 is mounted on the fixed-side mold plate 105.

The intermediate plate 132 is movable along the axis into and out of intimate contact with the fixed-side mold plate 105, and guide posts 106 for guiding this movement are provided respectively at end portions of the spacer block 104, and extend through the fixed-side mold plate 105, and can slidably extend through the intermediate plate 132. A spring 121 is provided between the fixed-side mold plate 105 and the intermediate plate 132, and urges the intermediate plate 132 away from the fixed-side mold plate 105.

A fixed-side retainer-molding recess 108 for mainly forming an outer frame portion of the retainer 171 is formed in that surface of the fixed-side mold plate 105 facing the intermediate plate 132. A core pin 109 for molding part (part of the provisionally-retaining pawl 183, part of the hook 186 of the connection arm 179, and so on) of the internal structure of the retainer 171 is mounted on the fixed-side mold plate 105 in parallel relation to the axis, and a distal end portion of this core pin 109 extends through the fixed-side retainer-molding recess 108, and can project into a core-side retainer-molding recess 135 in the intermediate plate 132 when the mold is in the condition shown in FIGS. 9 and 11.

Figure 13:
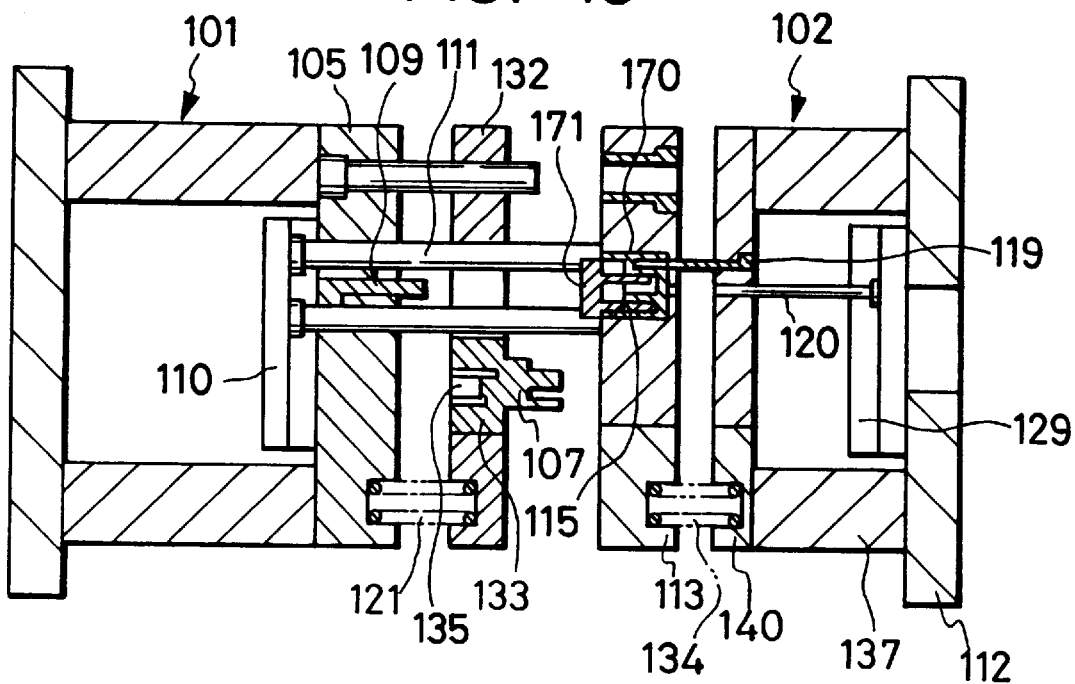
FIG. 13 is a cross-sectional view showing an assembling operation in the second embodiment.
Figure 14:
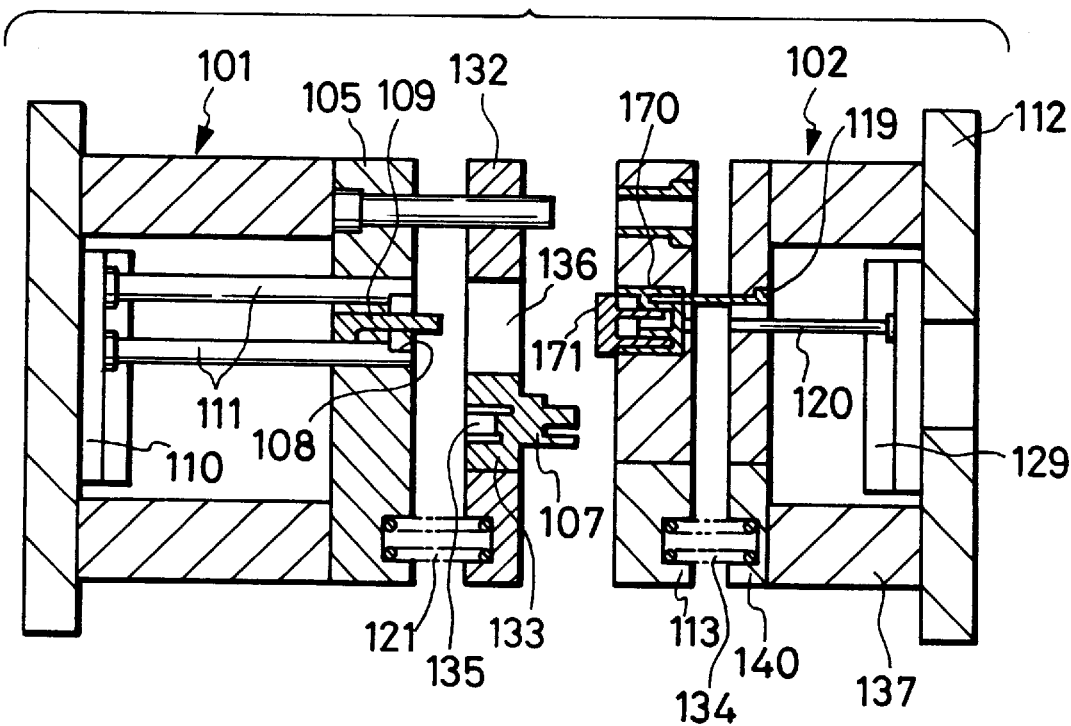
FIG. 14 is a cross-sectional view showing a condition in which the assembled connector is retained in a movable-side mold plate in the second embodiment.
Figure 15:
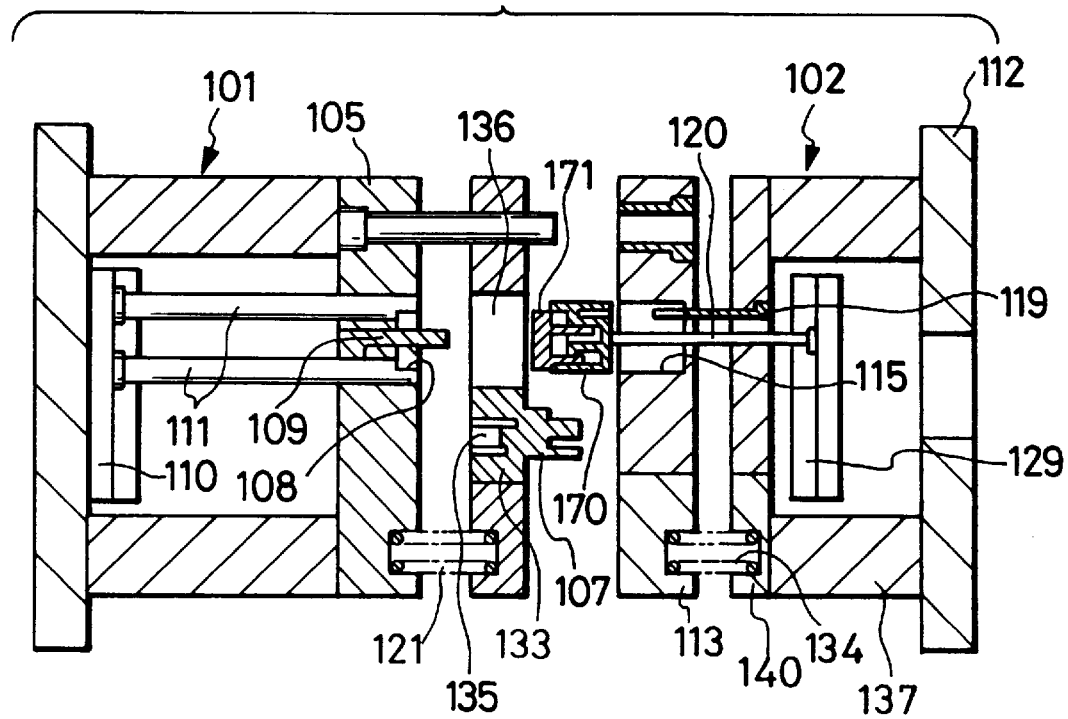
FIG. 15 is a cross-sectional view showing a condition in which the connector is ejected in the second embodiment.
Figure 16:
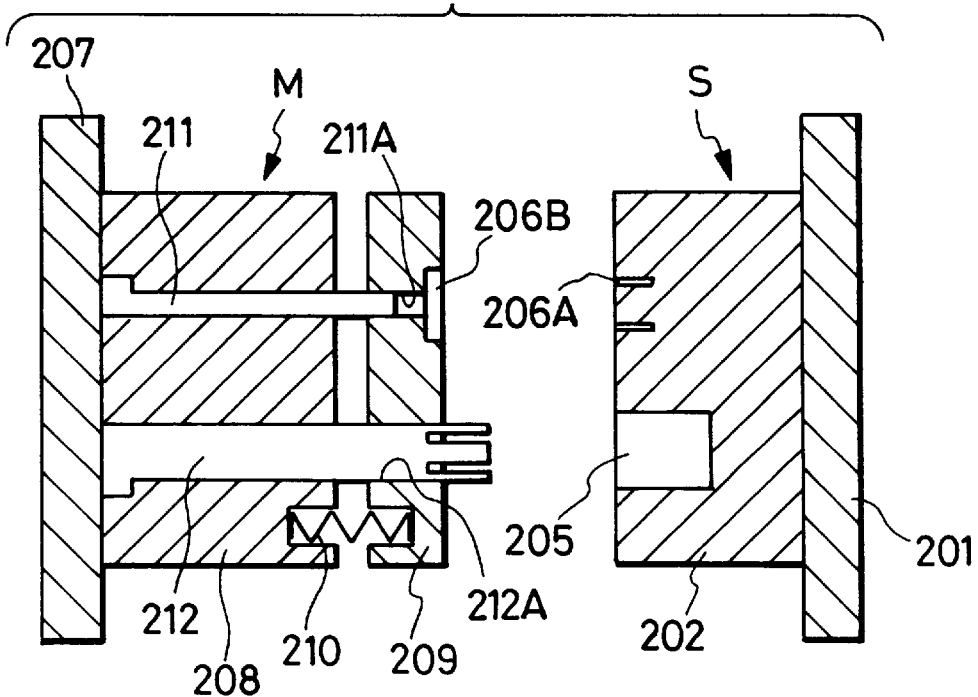
FIG. 16 is a cross-sectional view showing a third embodiment of a mold of the invention in its open condition.
Figure 17:
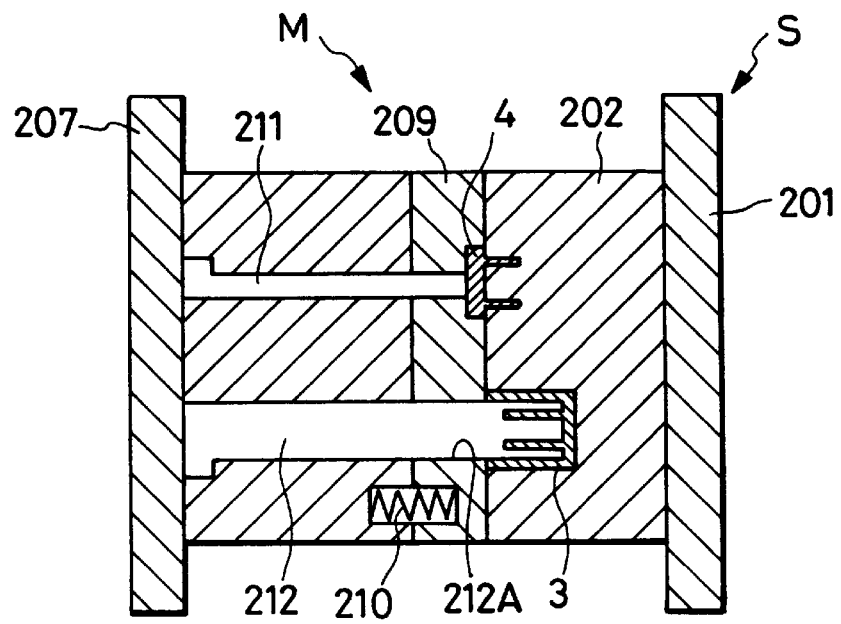
FIG. 17 is a cross-sectional view showing a molding condition in the third embodiment.

An ejector plate 110 is provided between the fixed-side mold plate 105 and the fixed-side mounting plate 103. This ejector plate 110 is connected to a drive mechanism (not shown), and is reciprocally movable between the fixed-side mounting plate 103 and the fixed-side mold plate 105. Push pins 111, which serve to mold the retainer 171 and also to push the retainer, are mounted on the ejector plate 110. The push pins 111 slidably extend through the fixed-side mold plate 105, and their distal end portions are held against the intermediate plate 132 when the mold is closed, and normally form part of the fixed-side retainer-molding recess 108. Namely, these push pins can form part of the outer portion of the retainer 171, and also can engage the molded retainer 171 to push out when the ejector plate 110 is moved as shown in FIG. 13.

A relief hole 136 is formed through the intermediate plate 132 in opposed relation to the fixed-side retainer-molding recess 108, and an intermediate core 133 is provided in this relief hole 136. The core-side retainer-molding recess 135 is formed in that surface of the intermediate core 133 facing the fixed-side mold plate 105, and cooperates with the fixed-side retainer-molding recess 108 to form a molding cavity for molding the retainer 171 when the intermediate core 133 and the fixed-side mold plate 105 are held in intimate contact with each other. That surface of the intermediate core 133 facing a movable-side mold plate 113 cooperates with a housing-molding recess 115 (described later) to form a molding cavity for molding the housing 170 when the intermediate core 133 and the movable-side mold plate 113 are held in intimate contact with each other.

The intermediate core 133 is connected to a slide mechanism (not shown), and is movable or displaceable between the following two positions in the relief hole 136. The intermediate core 133 is movable between the molding position (FIGS. 9 to 11) where the intermediate core 133 is coaxial with the fixed-side retainer-molding recess 108 and the retracted position (FIGS. 12 to 15) where the intermediate core 133 is spaced perpendicularly from the axis of the fixed-side retainer-molding recess 108.

The movable-side mold 102 is arranged coaxially with the fixed-side mold 101, and includes a movable-side mounting plate 112 as in the fixed mold 101. Movable-side mold plates 113 and 140, separated from each other in a forward-backward direction, are supported on the left side (in the drawings) of the mounting plate 112 through a spacer block 137. A spring 134 is provided between the two movable-side mold plates 113 and 140, and urges the front movable-side mold plate 113 away from the mold plate 140. The movable mold 102 is connected to a drive mechanism (not shown), and is movable a predetermined stroke in right and left directions (in the drawings).

Guide bushings 114 for respectively receiving the two guide posts 106 in the mold-closed condition are embedded respectively in end portions of the front movable-side mold plate 113, and extend parallel to the axis. Although not shown in the drawings, guide pins and guide bushings for guiding the movement of the two movable-side mold plates 113 and 140 are provided between the two mold plates 113 and 140. The housing-molding recess 115 is formed in that surface of the front movable-side mold plate 113 facing the intermediate core 133. This housing-molding recess 115 is coaxial with the fixed-side retainer-molding recess 108, and is also coaxial with the intermediate core 133 located in the molding position. Gates (not shown) are open to the housing-molding recess 115 and the fixed-side retainer-molding recess 108, and a molten resin is filled in these molding recesses through the respective gates.

In the movable mold 102, a pin plate 129 is provided between the rear movable-side mold plate 140 and the movable-side mounting plate 112. This pin plate 129 is connected to a drive mechanism (not shown), and movable forward and backward in a direction parallel to the axis.

Figure 11:
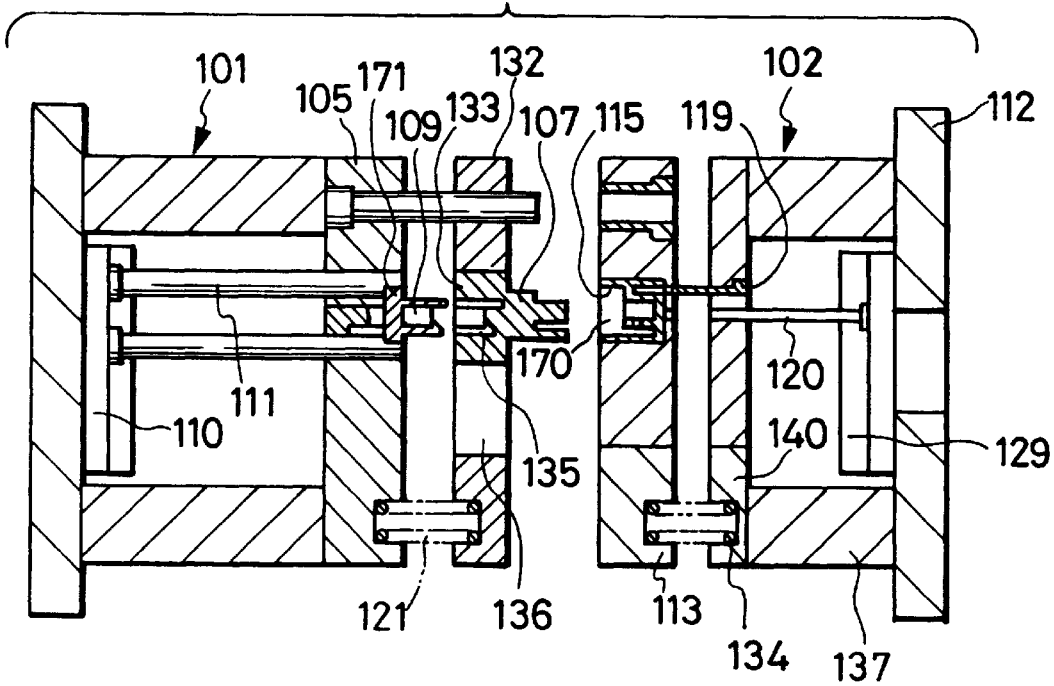
FIG. 11 is a cross-sectional view showing the mold of the second embodiment in its open condition.

A sub-core pin 119 for molding the housing 170 is mounted on the rear movable-side mold plate 140 in parallel relation to the axis, and a distal end portion of this sub-core pin 119 is slidably incorporated in the front movable-side mold plate 113. When molding the housing 170, the sub-core pin 119 projects into the housing-molding recess 115 so as to mold the retaining step 182 and so on, but when the mold is opened before the retainer 171 and the housing 170 are connected together, so that the front and rear movable-side mold plates 113 and 140 are spaced apart from each other as shown in FIG. 11, the sub-core pin 119 is withdrawn from the housing-molding recess 115 and hence from the molded housing 170.

An ejector pin 120 for ejecting the connector having the housing 170 and the retainer 171 connected together is mounted on the pin plate 129, and extends parallel to the axis. A distal end of the ejector pin 120 is normally disposed substantially flush with an inner surface of the housing-molding recess 115. However, when the pin plate 129 advances independently of the movable mold 102 after the retainer 171 and the housing 170 are connected together, the ejector pin 120 is inserted into the housing-molding recess 115 to eject the connector therefrom.

The process of molding the housing 170 and the retainer 171 using the mold of this embodiment, as well as the assembling step of connecting them together, will now be described.

Figure 9:
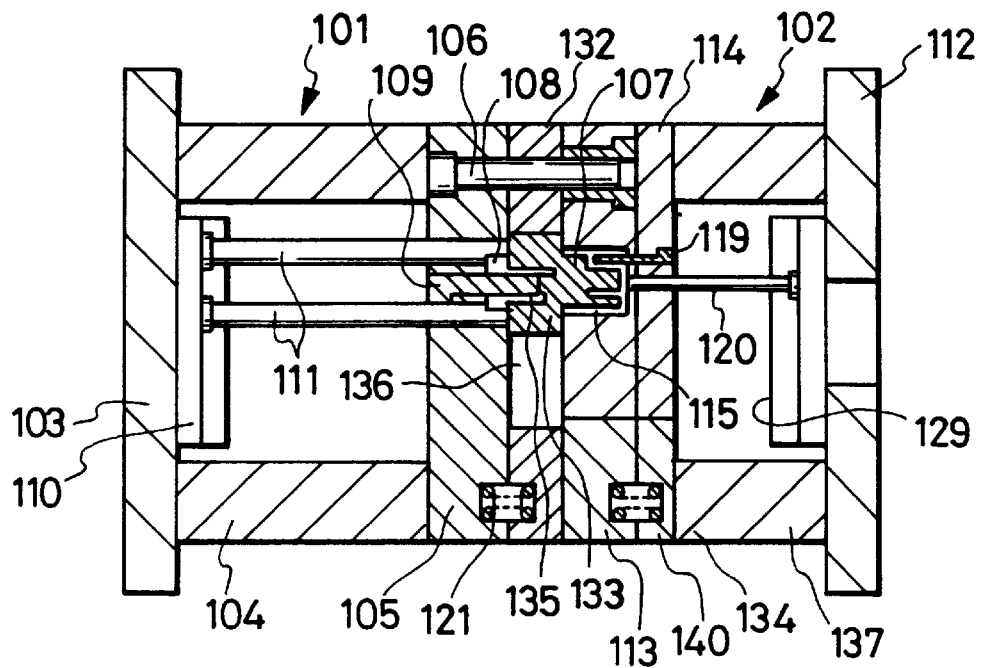
FIG. 9 is a cross-sectional view showing a mold of the second embodiment in its closed condition.

In the mold-closed condition of FIG. 9 in which the front movable-side mold plate 113 is held in intimate contact with the fixed-side mold plate 105, the housing-molding recess 115 is closed by the intermediate core 133 to form a sealed space, and also a main core pin 107 and the sub-core pin 119 are inserted in the housing-molding recess 115, thereby forming a cavity for molding the housing 170.

At the other side of the intermediate core 133, the core-side retainer-molding recess 135 and the fixed-side retainer-molding recess 108 jointly form a sealed space, and the core pin 109 is inserted in this sealed space, thereby forming a cavity for molding the retainer 171.

Figure 10:
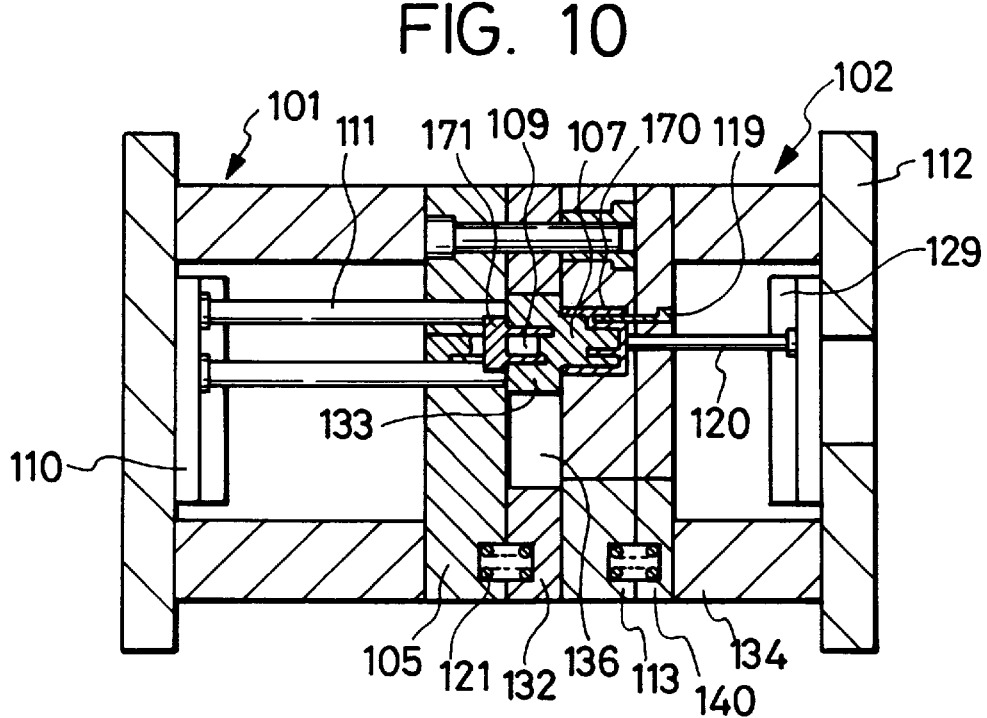
FIG. 10 is a cross-sectional view showing a condition in which a molten resin is filled in the second embodiment.

In this mold-closed condition, the molten resin is filled in the housing-molding cavity and the retainer-molding cavity through the gates (not shown) (see FIG. 10). Then, when the resin is solidified upon lapse of a predetermined period of time, the movable mold 102 is moved back to open the mold. As a result, the retainer 171 is retained in the fixed-side retainer-molding recess 108 while the housing 170 is retained in the housing-molding recess 115 in the movable mold in such a manner that the retainer 171 and the housing 170 are spaced apart from each other, as shown in FIG. 11. When the mold is thus opened, the intermediate core 133 is spaced apart from the fixed-side mold plate 105 under the influence of the spring 121, so that the molded retainer 171 is withdrawn from the core-side retainer-molding recess 135 in the intermediate core 133. At the same time, the front movable-side mold plate 113 is spaced apart from the rear movable-side mold plate 140 under the influence of the spring 134, so that the sub-core pin 119 is withdrawn from the molded housing 170.

Figure 12:
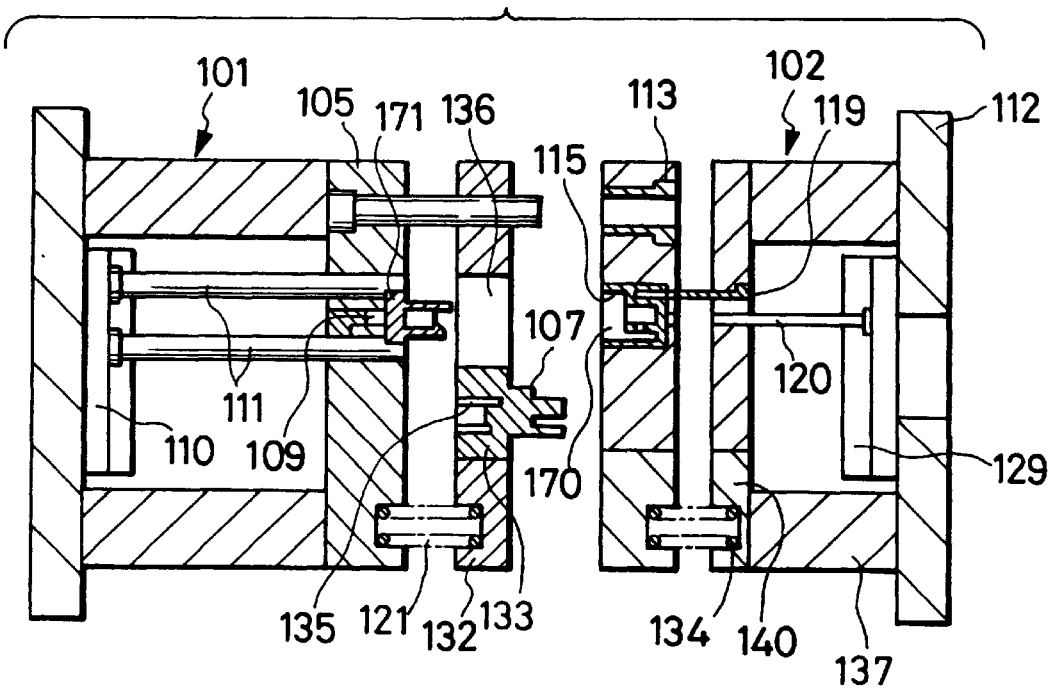
FIG. 12 is a cross-sectional view showing a condition in which an intermediate core is moved to a retracted position in the second embodiment.

Then, the slide mechanism (not shown) is driven to move the intermediate core 133 into the retracted position (see FIG. 12). As a result, the obstructing member (the intermediate core 133) is not interposed between the molded retainer 171 and the molded housing 170, so that the two molded parts is opposed coaxially with each other. Then, when the ejector plate 110 is moved forward by the drive mechanism (not shown), the retainer 171 is pushed by the push pins 111 engaged at their distal ends with the retainer 171, and is withdrawn from the fixed-side retainer-molding recess 108. Then, the retainer 171 is fitted into the hood portion 173 of the housing 170. When the retainer 171 is thus pushed forward, the core pin 109 is also withdrawn from the molded retainer 171, and the sub-core pin 119 has already been withdrawn from the molded housing 170, and therefore when the retainer 171 is to be connected to the housing 170, the engagement of the provisionally-retaining pawl 183 with the retaining step 183 will not be affected at all. Thus, the retainer 171 is connected to the housing 170 in the provisionally-retained condition. When the above assembling operation is completed, the ejector plate 110 is returned to the initial position (see FIG. 13).

Then, when the pin plate 129 is advanced by the drive mechanism (not shown), the ejector pin 120 ejects the connector from the housing-molding recess 115 to be discharged from the mold. When the connector is thus taken out, the pin plate 129 and the intermediate core 133 are returned to their respective initial positions, so that the mold is ready for a subsequent molding operation.

As described above, in this embodiment, the step of molding the housing 170 and the retainer 171 and the assembling step of connecting them together can be carried out at the same time, and therefore independent conveyance and assembling steps as required in the conventional method are not needed, and therefore the lead time for the finished product is shortened by the shortened process, and the manufacturing cost can be reduced.

In this embodiment, the housing 170 and the retainer 171 can be connected together merely by operating the push pins 111, and the connector can be discharged merely by operating the ejector pin 120. It may be proposed to effect such assembling and discharge operations utilizing the overall mold-closing operation. In this case, however, those portions to be moved are large, and also the required energy is large. On the other hand, in this embodiment, those portions to be moved are kept to a minimum, and the construction is simple, and the energy required for the operation is small.

Different kinds of molded products, that is, the housing 170 and the retainer 171, can be formed in one mold, and this is advantageous from the viewpoint of management of the mold. In this embodiment, the molding core pins 119 and 109 are withdrawn respectively from the housing 170 and the retainer 171 before the assembling operation is effected, and therefore there is achieved an advantage that the two can be connected together smoothly.

Various modifications can be made in the present invention, and the following modifications fall within the scope of the invention:

In the first embodiment, although the intermediate core 7 is moved to close and open the relief window 14, there may be used an arrangement in which the intermediate core 7 is spaced from the relief window 14, and the whole of the intermediate plate 11 is moved between a position where the intermediate core 7 is in registry with the two mold plates and a position where the intermediate core is in registry with the relief window 14.

In the first embodiment, the assembling operation of connecting the molded retainer 4 and the molded housing 3 together is effected in accordance with the mold re-closing operation, However, instead of this, the following arrangement may be used. For example, a knockout pin (not shown) is provided in the movable-side mold plate 2. After the molding is completed as shown in FIG. 3, the knockout pin is driven to push the molded housing 3 toward the retainer 4, thereby connecting the retainer and the housing together. The thus-assembled connector is disengaged from the housing-molding recess because of its own weight (An ejector pin for this purpose may be provided), and is discharged from the mold.

In the second embodiment, although the arrangement in which the housing and the retainer of the connector are connected together has been shown and described, the present invention can be applied to other various resin-molded products, and the number of the molded products is not limited to two, but the invention can be applied to an arrangement in which more than two parts are to be connected together.

In the second embodiment, although only the movable mold is displaced or moved in the axial direction, both of the two molds may be movable.

In the second embodiment, although the intermediate core 33 is moved alone, the intermediate core 133 may be fixed while the whole of the intermediate plate 132 is moved.

Furthermore, according to the invention, when forming of the connector housing and the retainer, different resins in material or color may be filled in the connector forming mold and the retainer forming mold, so that the connector housing and the retainer can be made different in material or color.

Third Embodiment

A third preferred embodiment of the present invention will now be described with reference to FIGS. 16 to 20. Although this embodiment is directed to a front retainer-type connector as described above, the invention can be applied to a rear retainer-type connector. A mold for performing the method of this invention is incorporated in an injection molding system, and important portions thereof are generally as described below, but FIGS. 16 to 20 are simplified for explanation purposes, and the mold does not strictly correspond to the connector shown in FIG. 6.

The mold of this embodiment comprises a movable mold, and a fixed mold, and the movable mold S comprises a movable-side mold plate 202 secured to a die plate 201. A housing-molding recess 205 for forming a housing 3 of the connector is formed in a molding surface of the movable-side mold plate 202, and a retainer-molding reception portion 206A is formed in this molding surface in vertically-spaced relation (in the drawings) to the housing-molding recess 205.

The fixed mold M comprises a receiving plate 208 which is normally disposed coaxially with the movable mold S, and is fixedly mounted on a mounting plate 207, and a fixed-side mold plate 209 provided forwardly of the receiving plate 208.

A spring 210 is provided between the fixed-side mold plate 209 and the receiving plate 208, and urges the fixed-side mold plate 209 away from the receiving plate 208. Although not shown, stopper means is provided between the fixed-side mold plate 209 and the receiving plate 208 so as to prevent the distance between the two from exceeding a predetermined value. A proximal portion of a retainer-molding core pin 211 is mounted in the receiving plate 208, and a distal end portion of this retainer-molding core pin 211 is slidably inserted into a pin insertion hole 211A formed horizontally (in the drawings) in the fixed-side mold plate 209. This pin insertion hole 211A is continuous with a retainer-molding recess 206B formed in the fixed-side mold plate 209 in coaxial relation to the retainer-molding reception portion 206A. The distal end of the retainer-molding core pin 211 is normally (i.e., in a mold-open condition shown in FIG. 16) is spaced rearwardly from the retainer-molding recess 206B, but in a mold-closed condition (FIG. 17), this distal end lies flush with an inner surface of the retainer-molding recess 206B, and therefore forms, together with the retainer-molding recess 206B and the retainer-molding reception portion 206A, a retainer-molding cavity.

A proximal portion of a housing-molding core pin 212 is mounted in the receiving plate 208 in parallel relation to the retainer-molding core pin 211, and is disposed in vertical registry with the retainer-molding core 211. A distal end portion of the housing-molding core pin 212 is slidably extended through a through hole 212A formed horizontally (in the drawings) through the fixed-side mold plate 209, and this core pin 212 is normally disposed coaxially with the housing-molding recess 205 in the movable-side mold plate 202. When the mold is closed, the distal end portion of the core pin 212 is inserted into the housing-molding recess 205 to cooperate therewith to form a molding cavity for molding the housing 3.

When the molded retainer 4 and the molded housing 3 are retained respectively in the molding recesses 206B and 205 after the mold is opened, those surfaces of the molded retainer and the molded housing which are to be connected together are exposed and opposed to each other. Gates (not shown) are open respectively to the two molding recesses 205 and 206, and a molten resin is filled in these molding recesses through the respective gates. The movable mold S of the above construction is connected to a drive mechanism (not shown), and is reciprocally movable right and left between a mold-open position where the fixed-side mold plate 209 and the movable-side mold plate 202 are held in intimate contact with each other and a mold-open position (FIG. 16) where the two mold plates 202 and 209 are spaced a predetermined distance from each other. The movable mold S is also connected to a drive mechanism independent of the above drive mechanism (or may be connected to this common drive source), and is movable upward and downward (in the drawings) in the above mold-opened position. Therefore, the movable mold S is reciprocally movable between a molding position where the retainer 4 and the housing 3 can be molded and an assembling position where the molded retainer 4 and the molded housing 3 are aligned with each other.

The molding of the housing 3 and the retainer 4 using the molding mold of the above construction, as well as the assembling procedure, will now be described.

When the whole of the movable mold S is moved from the mold-open position (FIG. 16) is moved toward the fixed mold, the movable-side mold plate 202 first abuts against the fixed-side mold plate 209. As a result, the distal end portion of the housing-molding core pin 212 is inserted into the housing-molding recess 205. Then, when the movable mold S further advances, the fixed-side mold plate 209 is brought int contact with the receiving plate 208 while compressing the spring 210, so that the two molds are closed together. At this time, the retainer-molding core pin 211 and the housing-molding core pin 212 are disposed in their respective normal positions, and therefore the cavity for molding the retainer 4 is formed by the retainer-molding reception portion 206A and the retainer-molding recess 206B whereas the cavity for molding the housing 3 is formed by the housing-molding recess 205. Then, the molten resin is filled in the two molding cavities.

Then, when the resin is solidified upon lapse of a predetermined period of time, the movable mold is moved back into the mold-open position, so that the fixed-side mold plate 209 is spaced apart from the receiving plate 208 under the influence of the spring 210. At this time, the retainer 4 is retained in the retainer-molding recess 206B, and the core pin 211 is retracted from the retainer 4. Although the retainer 4 and the housing are shown as being spaced from each other in the upward-downward direction (in the drawings), the two are held on a common vertical plane.

Figure 18:
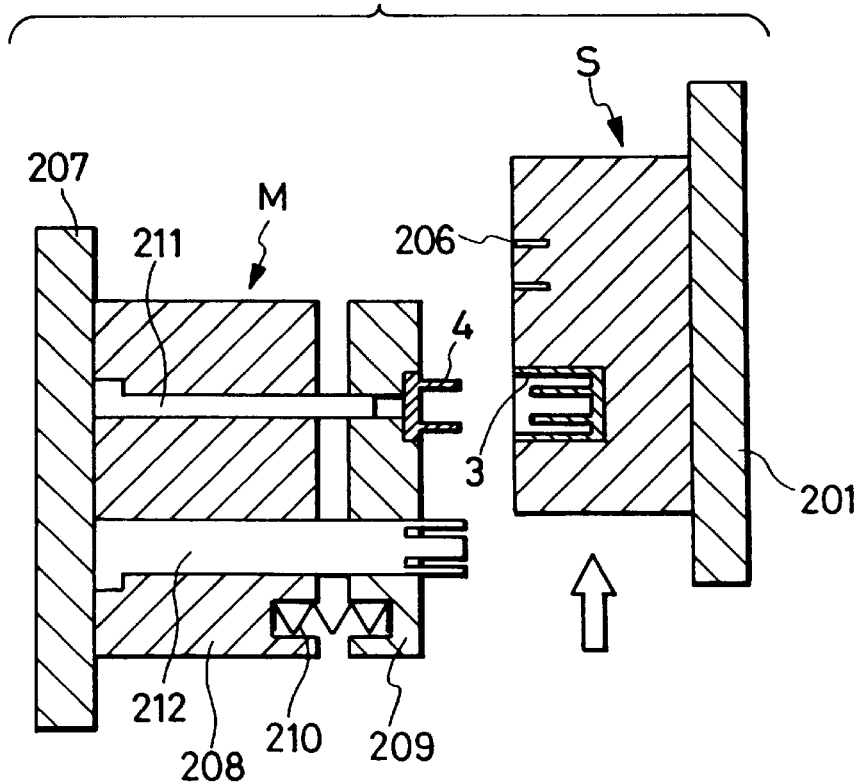
FIG. 18 a cross-sectional view showing an alignment or registration operation in a mold-open condition after the molding in the third embodiment.
Figure 19:
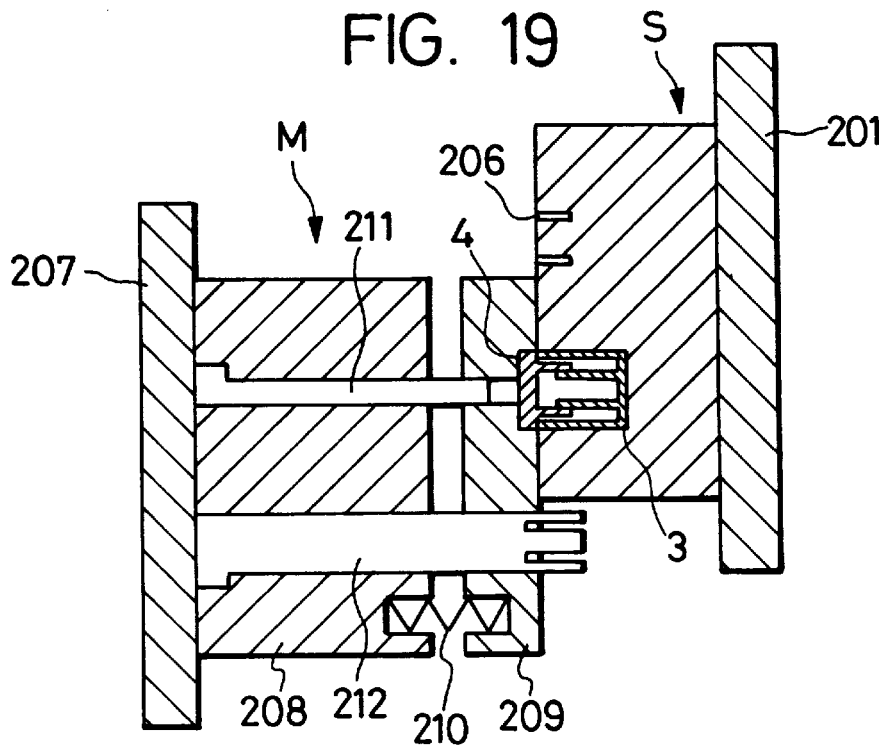
FIG. 19 is a cross-sectional view showing a condition in which a housing is connected to a retainer in the third embodiment.
Figure 20:
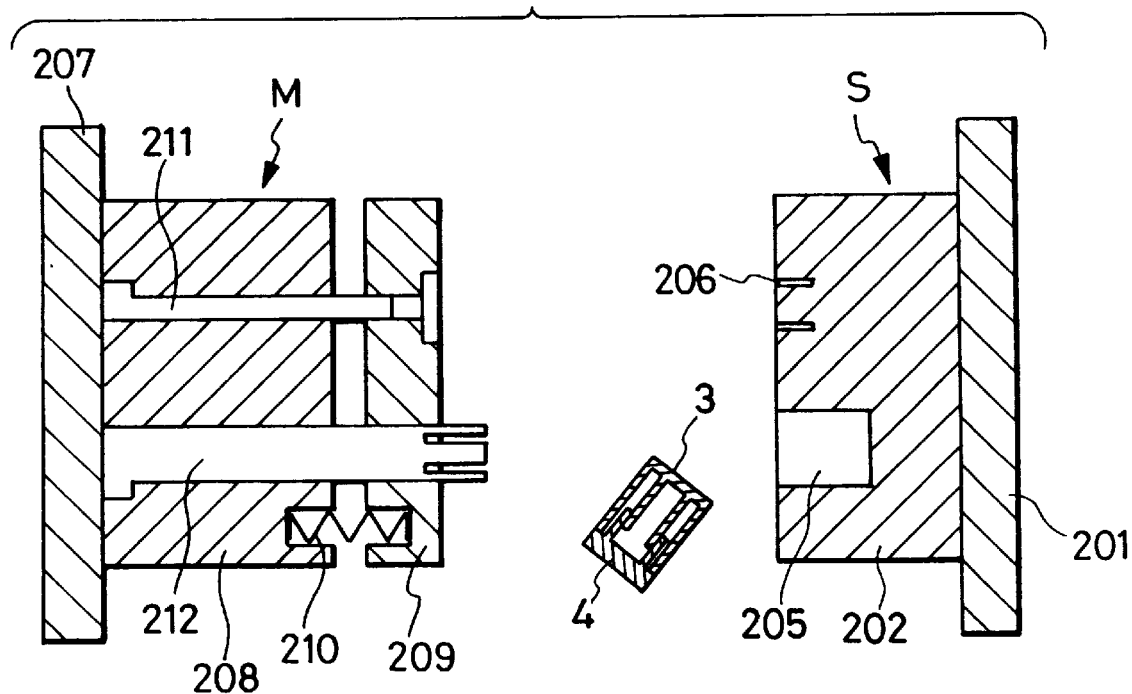
FIG. 20 is a cross-sectional view showing a condition in which the finished product is taken out in the third embodiment.
Figure 21:
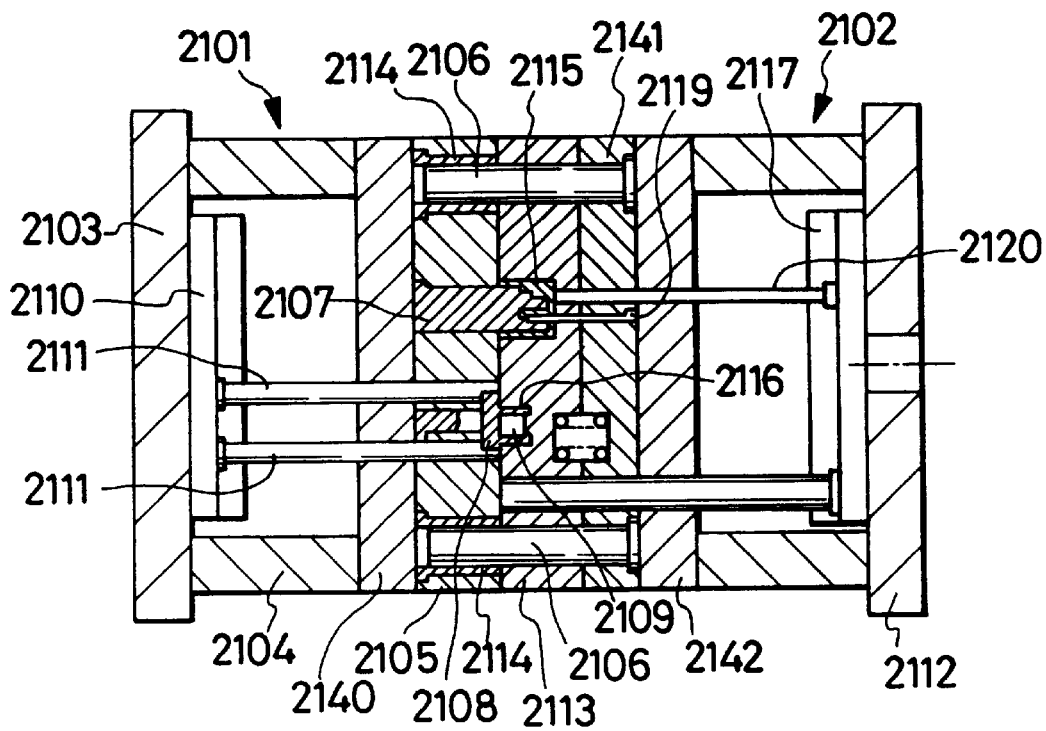
FIG. 21 is a cross-sectional view showing a condition in which a molten resin is filled in the fourth embodiment.

Then, the movable mold S is moved upward by the drive mechanism (not shown) as indicated by an arrow in FIG. 18. Namely, the movable-side mold plate 202 is displaced upwardly with respect to the fixed-side mold plate 209 into the assembling position where the housing 3 is aligned with the retainer 4. In this assembling position, the movable mold S is again advanced left (in the drawings) to hold the two mold plates 202 and 209 in intimate contact with each other.

The housing-molding core pin 212 has already been located at the position where it will not interfere with the movable-side mold plate 202, and therefore when the two mold plates 202 and 209 are brought into intimate contact with each other, the housing-molding core pin 212 will not interfere with the movable-side mold plate 202. In the drawings, although the housing-molding core pin 212 is disposed exteriorly of the movable-side mold plate 202, the movable-side mold plate 202 may have a relief hole for receiving the core pin 212.

When the two mold plates 202 and 209 are thus held in intimate contact with each other, the retainer 4 is connected to the front side portion of the housing 3 in a provisionally-retained condition. Although not shown, the molded retainer 4 is retained at its proximal portion in the retainer-molding recess 206B, and therefore even when the retainer is pressed by the housing 3 during the connection of the retainer to the housing 3, the retainer will not be moved back during this assembling operation. The connection between the housing 3 and the retainer 4 is effected with the fixed-side mold plate 209 kept spaced from the receiving plate 208, and the spring 10 has a sufficient spring force to resist this pressure.

When the assembling operation is thus completed, the movable mold S is again moved back to the mold-open position, and the connector, having the housing 3 and the retainer 4 connected together, remains in the housing-molding recess 205, and the connector is ejected by an ejector pin (not shown) to be discharged from the mold. Then, the movable mold S is moved downward to the initial position (the molding position; the mold-open position), so that the two molds are ready for a subsequent molding operation.

As described above, in this embodiment, the step of molding the housing 3 and the retainer 4 and the assembling step of connecting them together can be carried out at the same time, and therefore the conveyance and the assembling operation as required in the conventional method are not necessary, and the lead time for the finished product is shortened by the shortened process, and the manufacturing cost can be reduced. And besides, since different kinds of molded products, that is, the housing 3 and the retainer 4, can be molded in one mold, this is advantageous from the viewpoint of management of the mold.

Fourth Embodiment

A fourth embodiment of the present invention will now be described. First, a connector to be molded has been described with respect to FIGS. 21–26 with reference to FIG. 8. As same with the second embodiment, although the connector to be described here is a so-called front retainer-type connector, the invention can be applied to a rear retainer-type connector.

The construction of a mold for producing the connector of the above construction will now be described. In this embodiment, the mold is incorporated in an injection molding system. In the drawings, important portions are shown merely broadly, and details thereof are omitted for the sake of simplicity of the description. Therefore, details of the above construction of the connector are not shown, and for example the number and shape of core pins (described later) are merely broadly shown in the drawings.

The mold of this embodiment comprises a movable mold and a fixed mold. The fixed mold 2101, shown at a left side in the drawings, includes a fixed-side mounting plate 2103, and a fixed-side mold plate 2105 (at a right side in the drawings) is mounted on the plate 2103 through a spacer block 2104. Two guide bushings 3114 for respectively receiving guide posts 2106 when the mold is closed are embedded in opposite end portions of the fixed-side mold plate 2105, respectively, and extend parallel to the axis of the mold. A main core pin 2107 for mainly molding part (part of the retraction space 176, the retaining projection 177 and so on) of the internal structure of the housing 170 is mounted on a fixed-side backing plate 2140, and extends through the fixed-side mold plate 2105, and is directed toward the movable mold 2102.

A retainer-molding recess 2108 for mainly molding the outer frame portion of the retainer 171 is formed on that surface of the fixed-side mold plate 2105 facing the movable mold, and is spaced slightly from the main core pin 2107. A core pin 2109 for molding part (part of the provisionally-retaining pawl 183, part of the hook 186 of the connection arm 179, and so on) of the internal structure of the retainer 171 is mounted on the fixed-side backing plate 2140, and extends in parallel relation to the main core pin 2107. A distal end portion of the core pin 2109 can project into the retainer-molding recess 2108, and can further project outwardly from the fixed mold 2101.

Figure 24:
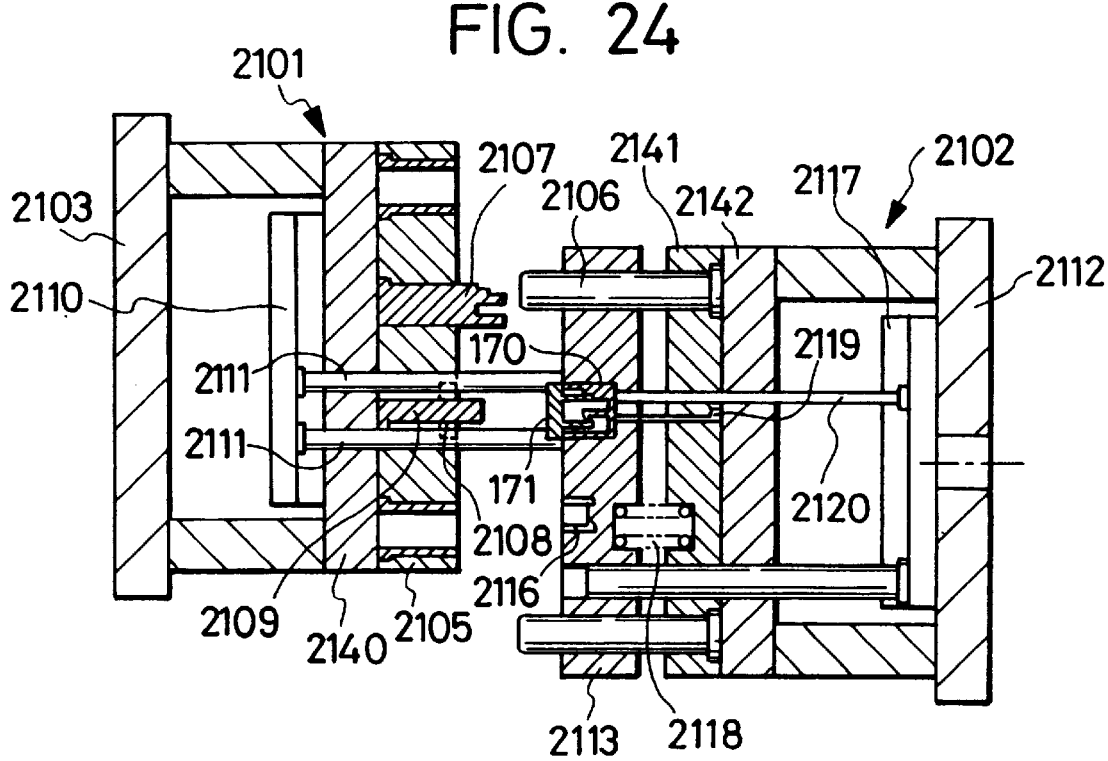
FIG. 24 is a cross-sectional view showing an assembling operation in the fourth embodiment.

A fixed-side ejecting plate 2110 is provided between the fixed-side mold plate 2105 and the fixed-side mounting plate 2103. This fixed-side ejecting plate 2110 is connected to a drive mechanism (not shown), and is reciprocally movable between the fixed-side mounting plate 2103 and the fixed-side backing plate 2140. A pair of push pins 2111 are mounted on the fixed-side ejecting plate 2110, and these push pins 2111 serve to mold the retainer 171 and also serve to eject the molded retainer. The push pins 2111 slidably extend through the fixed-side backing plate 2140 and the fixed-side mold plate 2105, with the core pin 2109 disposed therebetween. The distal ends of the push pins 2111 normally form part of the retainer-molding recess 2108, and more specifically can form part of the outer portion of the retainer 171, and when the fixed-side ejecting plate 2110 is moved as shown in FIG. 24, these distal ends, engaged with the molded retainer 171, eject it.

The fixed mold 2101 is connected to a drive mechanism (not shown), and is movable in an upward-downward direction (in the drawings) perpendicular to the axis in the mold-open condition. Thus, the fixed mold 2101 is reciprocally movable between a molding position where the retainer 171 and the housing 170 can be molded and an assembling position (spaced vertically from the molding position) where the molded retainer 171 is aligned with the molded housing 170.

The movable mold 2102 is normally disposed coaxially with the fixed mold 2101, and includes a movable-side mounting plate 2112 as in the fixed mold. Movable-side mold plates 2113 and 2141, separated from each other in a forward-backward direction, are provided on the left side of a movable-side backing plate 2142. A spring 2118 is provided between the two movable-side mold plates 2113 and 2141, and urges the front movable-side mold plate 2113 forwardly.

The movable mold 2102 is connected to a drive mechanism (not shown), and is movable in right and left directions (in the drawings) between a mold-closed position where the fixed-side mold plate 2105 and the front movable-side mold plate 2113 are held in intimate contact with each other and a mold-open position where the two mold plates are spaced a predetermined distance from each other.

The two guide posts 2106 are mounted on the movable-side backing plate 2142, and extend through the two movable-side mold plates 2113 and 2141 in parallel relation to the axis. The distal end portions of the two guide posts 2106 can be inserted into the guide bushings 2114, respectively. A housing-molding recess 2115 and a retainer-molding recess 2116 are formed in that surface of the front movable-side mold plate 2113 facing the fixed mold, and the molding recess 2115 is normally in registry with the main core pin 2107, and the molding recess 2116 is normally in registry with the core pin 2109 and the two push pins 2111 for molding the retainer 171. Gates (not shown) are open respectively to the two molding recesses 2115 and 2116, and a molten resin is filled in these recesses through the respective gates.

In the movable mold 2102, a pin plate 2117 for ejecting the molded product is provided between the movable-side backing plate 2142 and the movable-side mounting plate 2112. This pin plate 2117 is connected to a drive mechanism (not shown), and is movable forward and backward in the axial direction.

A sub-core pin 2119 for molding the housing 170 is mounted on the rear movable-side mold plate 2141, and extends parallel to the axis. The sub-core pin 2119 is projected into the housing-molding recess 2115 during the molding of the housing 170 (that is, when the front and rear movable-side mold plates 2113 and 2141 are held in intimate contact with each other) so as to mold the retaining step 182 and so on. However, when the two movable-side mold plates 2113 and 2141 are moved apart from each other (that is, after the molding), the sub-core pin 2119 is withdrawn from the housing-molding recess 2115, and hence is withdrawn from the molded housing 170.

An ejector pin 2120 for ejecting the connector having the housing 170 and the retainer 171 connected together is mounted on the pin plate 2117, and extends parallel to the axis. A distal end of the ejector pin 2120 is normally disposed flush with an inner surface of the housing-molding recess 2115. However, when the front pin plate 2117 advances after the housing 170 and the retainer 171 are connected together, the distal end of the ejector pin 2120 is projected into the housing-molding recess 2115 to eject the assembled connector.

The step of molding the housing 170 and the retainer 171 using the above mold of the fourth embodiment, as well as the assembling step of connecting them together, will now be described.

In the mold-closed condition (FIG. 21) in which the front movable-side mold plate 2113 and the fixed-side mold plate 2105 are held in intimate contact with each other, the housing-molding recess 2115 is closed to provide a sealed space or cavity, and also a sealed space, defined by the two retainer-molding recesses 2108 and 2116 formed respectively in the fixed mold and the movable mold, serves as a cavity for molding the retainer 171. In this condition, the molten resin is filled in the two sealed cavities through the respective gates (not shown). Since the main core pin 2107 and the sub-core pin 2119 are projected into the housing-molding recess 2115, the outer shape of the housing and its internal structure (the retraction space 176, the retaining projection 177 and so on) are formed. The cavity for molding the retainer 171 is defined by the two molding recesses 2108 and 2116 mated with each other, and the core pin 2109 is projected into this molding cavity, and therefore the outer shape of the retainer 171 and its internal structure (the provisionally-retaining pawl 183, the connection arm 179 and so on) are formed.

Figure 22:
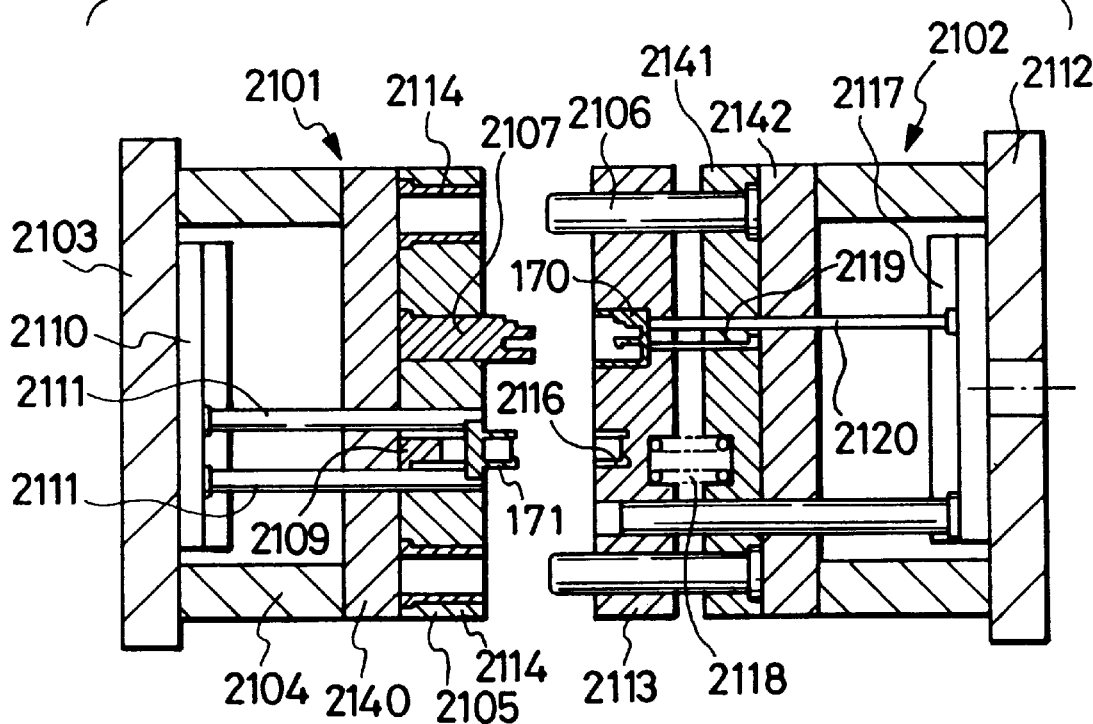
FIG. 22 is a cross-sectional view showing a mold-open condition in the fourth embodiment.

The molten resin is thus filled, and when the resin is solidified upon lapse of a predetermined time period, the movable mold 2102 is moved back to open the mold as shown in FIG. 22. When the mold is thus opened, the housing 170 is retained in the housing-molding recess 2115 while the retainer 171 is retained in the retainer-molding recess 2108 in the fixed mold. During this mold-opening operation, the two movable-side mold plates 2113 and 2141 are moved apart from each other under the influence of the spring 2118, so that the sub-core pin 2119 is withdrawn from the molded housing 170 as described above. The sub-core pin 2119 serves to mold the retaining step 182 and so on as described above, and if the sub-core pin 2119 is not withdrawn from the housing 170 before the retainer 171 and the housing 170 are connected together at the later assembling step, the assembling operation is adversely affected. Therefore, this withdrawing operation is necessary.

Figure 23:
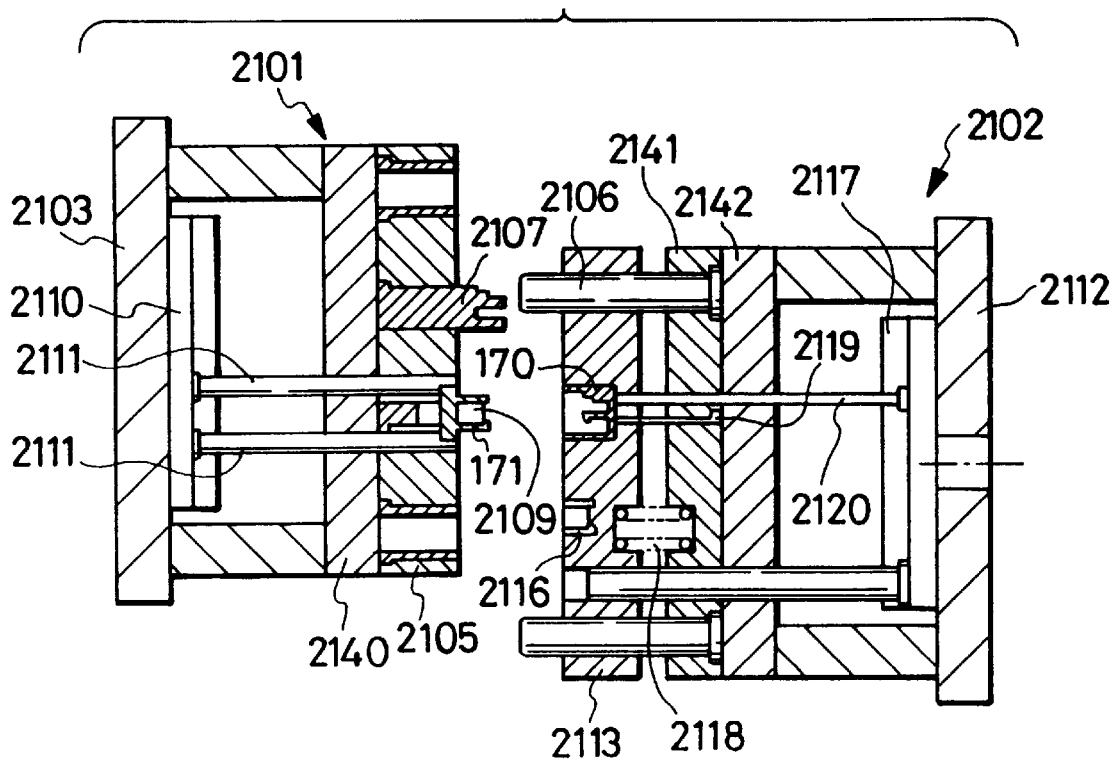
FIG. 23 is a cross-sectional view showing a condition in which a housing and a retainer are aligned with each other in the fourth embodiment.

Then, the fixed-side mold 2101 is moved upward (in the drawings) by the drive mechanism (not shown). Namely, the fixed-side mold plate 2105 is displaced with respect to the front movable-side mold plate 2113 into the assembling position, so that the retainer 171 is disposed coaxially with the housing 170, as shown in FIG. 23.

Then, the fixed-side ejecting plate 2110 is moved forward, so that the molded retainer 171 is pushed out of the retainer-molding recess 2108 (formed in the fixed mold) by the push pins 2111, and is moved toward the housing 170. At this time, the core pin 2109 is withdrawn from the retainer 171. The core pin 2109 serves to form the provisionally-retaining pawl 183 and so on, and if the core pin 2109 is not withdrawn from the retainer 171 before the retainer 171 is connected to the housing 170, the assembling operation is adversely affected. Before the retainer 171 is fitted into the housing 170 by the push pins 2111, the core pins 2109 and 2119 are thus withdrawn, and therefore the engagement of the provisionally-retaining pawl 183 with the retaining step 182 is not affected at all. Thus, the retainer 171 and the housing 170 are connected together.

Figure 25:
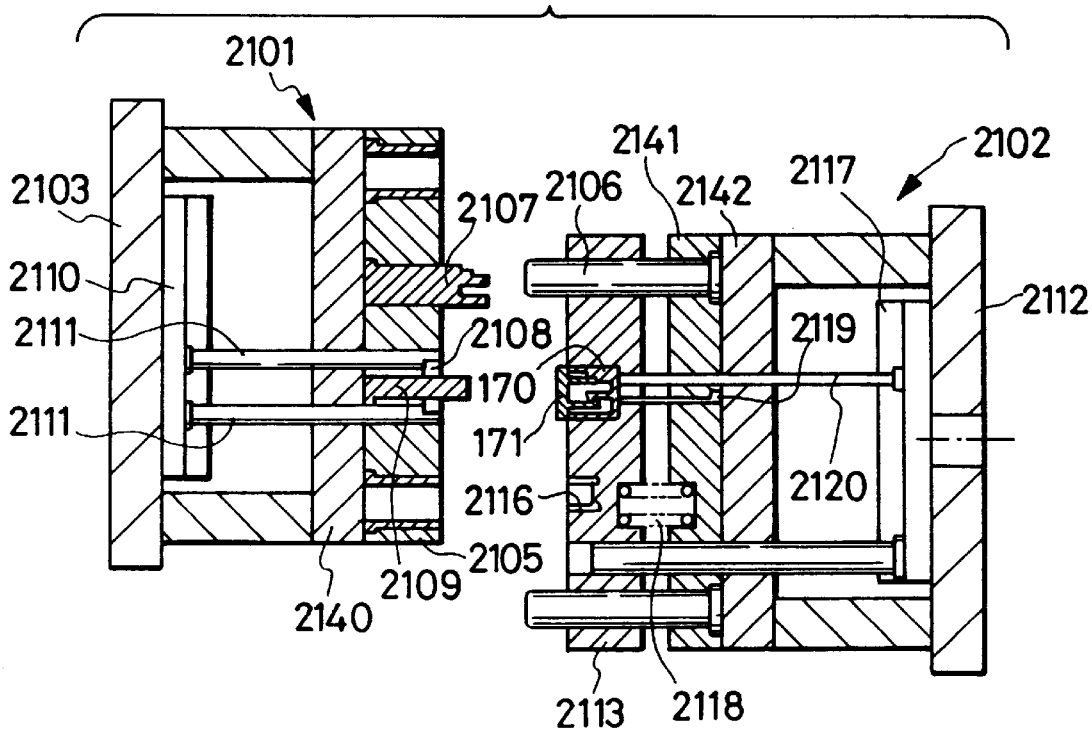
FIG. 25 is a cross-sectional view showing a condition in which a fixed-side ejecting plate is returned to its initial position in the fourth embodiment.
Figure 26:
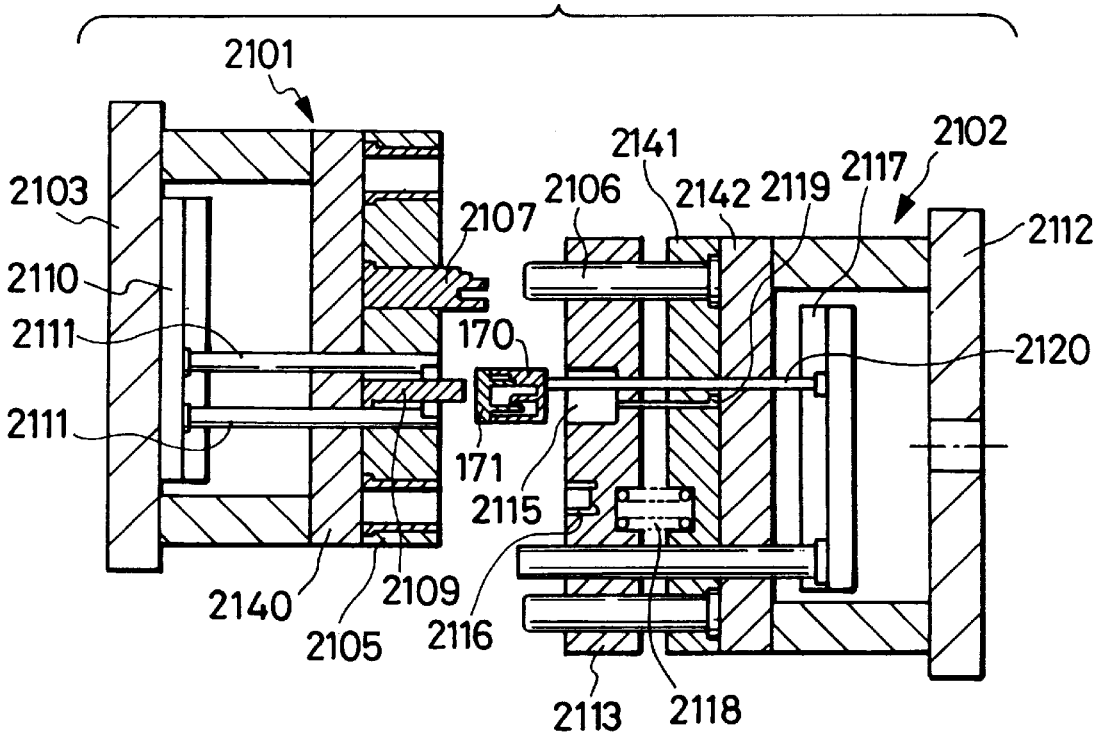
FIG. 26 is a cross-sectional view showing a discharging operation in the fourth embodiment.

Then, when the fixed-side ejecting plate 2110 is returned to the initial position, the connector, having the housing 170 and the retainer 171 connected together, remains in the movable mold as shown in FIG. 25. Then, when the pin plate 2117 is moved forward, the ejector pin 2120 pushes the housing 170, so that the connector in the assembled condition (provisionally-retained condition) is forced out of the housing-molding recess 2115 to be discharged from the mold. After the connector is thus taken out, the pin plate 2117 is returned to the initial position, and the movable mold 2102 is returned to the initial position. The two molds 2101 and 2102 are returned to their respective initial positions, and are ready for a subsequent molding operation.

As described above, in this embodiment, the step of molding the housing 170 and the retainer 171 and the assembling step of connecting them together can be carried out at the same time, and therefore separate conveyance and assembling steps as required in the conventional method are not necessary, and the lead time for the finished product is shortened because of the shortened process, and the manufacturing cost can be reduced.

And besides, in this embodiment, the housing 170 and the retainer 171 can be connected together merely by operating the push pins. It may be proposed to effect such assembling operation utilizing the mold-closing operation. However, in this case those portions to be moved are large, and also the required energy is large. On the other hand, in this embodiment, those portions to be moved are kept to a minimum, and the construction is simple, and the energy required for the operation is small.

Since different kinds of molded products, that is, the housing 170 and the retainer 171, can be molded in one mold, this is advantageous from the viewpoint of management of the mold. Furthermore, in this embodiment, the molding core pins 2109 and 2119 are withdrawn respectively from the retainer 171 and the housing 170 before the assembling operation is effected, and therefore this achieves an advantage that the two can be smoothly connected together.

Fifth Embodiment

FIGS. 27 to 32 show a fifth embodiment of a mold of the invention. A connector to be molded here is the same as the connector described in the second and fourth embodiments. Referring first to a fixed mold 2101, a fixed-side mold plate 2105 is movable into and out of intimate contact with an end-drawing plate 2104. A spring 2121 is provided between the two plates 2104 and 2105, and urges the fixed-side mold plate 2105 away from the end-drawing plate 104 in a right direction (in the drawings). Stopper means (not shown) is provided for preventing the distance between the two from exceeding a predetermined value. In order to enable the fixed-side mold plate 2105 to be smoothly moved toward and away from the end-drawing plate 2104, guide posts 106 extend from a fixed-side mounting plate 2103, and pass through the end-drawing plate 2104, and slidably extend through the fixed-side mold plate 2105, and can be inserted respectively into guide bushings 2114 provided in a movable-side mold plate 2113.

A main core pin 2107 extends from the fixed-side mounting plate 2103, and its distal end portion is slidably inserted into an insertion hole 2122 which is formed through the fixed-side mold plate 2105, and extends parallel to the axis. When the fixed-side mold plate 2105 is held in intimate contact with the end-drawing plate 2104 (that is, in a mold-closed condition shown in FIG. 27), that portion of the main core pin 2107 directly relevant to the molding of a housing 170 is exposed through the insertion hole 2122, and is projected into a housing-molding recess 2115 in the movable mold. When the two plates 2104 and 2105 are spaced apart from each other, this portion of the main core pin 2107 is retracted from the housing-molding recess 2115, and is completely received in the insertion hole 2122.

A core pin 109 for molding a retainer 171 extends from the fixed-side mounting plate 2103, and is inserted into a slide hole 2123 which is formed through the fixed-side mold plate 2105, and extends parallel to the axis. In the mold-closed condition in which the fixed-side mold plate 2105 is held in intimate contact with the end-drawing plate 2104, a distal end of the core pin 2109 relevant to the molding of the retainer 171 is exposed from the slide hole 2123, and is projected into a retainer-molding recess 2116 in the movable mold. When the two plates 2104 and 2105 are spaced apart from each other, the distal end of the core pin 2109 is retracted from the retainer-molding recess 2116, and is completely received in the slide hole 2123.

Figure 32:
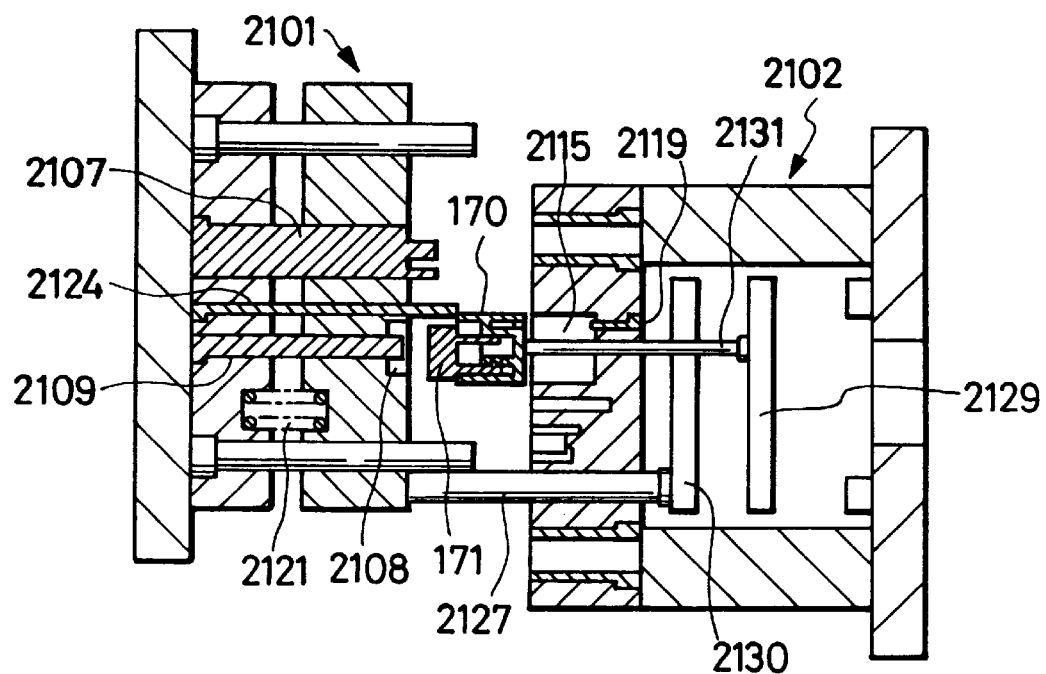
FIG. 32 is a cross-sectional view showing a condition in which the connector is discharged in the fifth embodiment.

A fixed-side ejector pin 2124 is mounted on the fixed-side mounting plate 2103, and disposed between the main core pin 2107 and the core pin 2109. This ejector pin 2124 is slidably inserted into the fixed-side mold plate 2105. When the two molds 2101 and 2102 are closed together, the fixed-side ejector pin 2124 is inserted into a relief hole 2125 formed in the movable-side mold plate 2113. When the fixed-side mold plate 2105 is spaced apart from the end-drawing plate 2104, the distal end of the ejector pin 2124 is disposed substantially flush with the surface of the fixed-side mold plate 2105. When the fixed-side mold plate 2105 is slightly retracted by a movable-side return pin 2127 as shown in FIG. 32, the ejector pin 2124 projects from the fixed-side mold plate 2105 to contact the housing of the assembled connector, thereby ejecting the connector from the mold.

Figure 31:
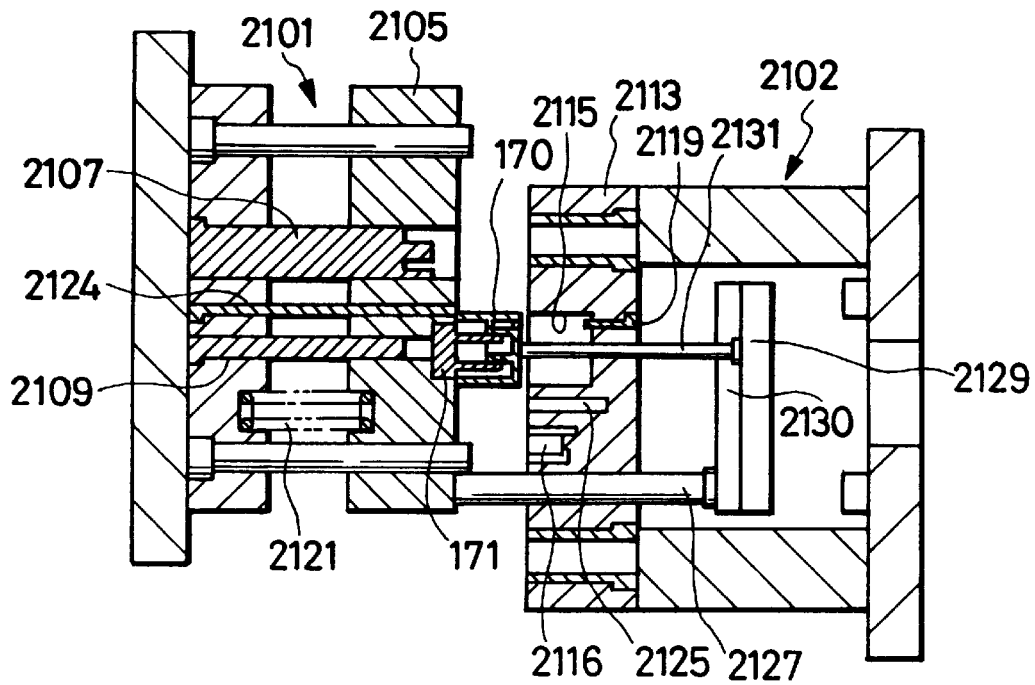
FIG. 31 is a cross-sectional view showing an assembling operation in the fifth embodiment.

With respect to the movable mold 2102, this fifth embodiment is different in that the retainer 171 is not ejected to be connected to the housing 170, but the housing 170 is ejected to be connected to the retainer. More specifically, two pin plates 2129 and 2130 are coaxially provided between the movable-side mold plate 2113 and a movable-side mounting plate 2112 through a spacer member 2128. An ejector pin 2131 is mounted on the first pin plate 2129 in parallel relation to the axis, and is connected to a drive mechanism (not shown) so as to move forward and backward along the axis. A distal end of the ejector pin 2131 is normally disposed substantially flush with a surface of the housing-molding recess 2115. When the first pin plate 2129 advances a predetermined stroke together with the second pin plate 130, the ejector pin 2131 ejects the molded housing 170 from the housing-molding recess 2115 to connect the same to the retainer 171 in a provisionally-retained condition, as shown in FIG. 31. A sub-core pin 2119 relevant to the molding of the housing is embedded in the movable-side mold plate 2113, and its distal end portion is projected into the housing-molding recess 2115.

The second pin plate 2130 is also connected to a drive mechanism (which may also serve as the drive mechanism for the first pin plate 2129 or a separate drive mechanism), and is movable forward and backward along the axis. The return pin 2127 is mounted on the second pin plate 2130 in parallel relation to the axis, and the distal end of the return pin 2127 is normally disposed substantially flush with the surface of the movable-side mold plate 2113. When the second pin plate 2130 advances together with the first pin plate 2129 as shown in FIG. 31, the return pin 2127 contacts the fixed-side mold plate 2105. Then, when the return pin 2127 is further advanced a predetermined stroke, the return pin 2127 retracts the fixed-side mold plate 2105 against the bias of the spring 2121, so that the connector, having the parts connected together in the provisionally-retained condition, is ejected by the fixed-side ejector pin 2124.

Figure 27:
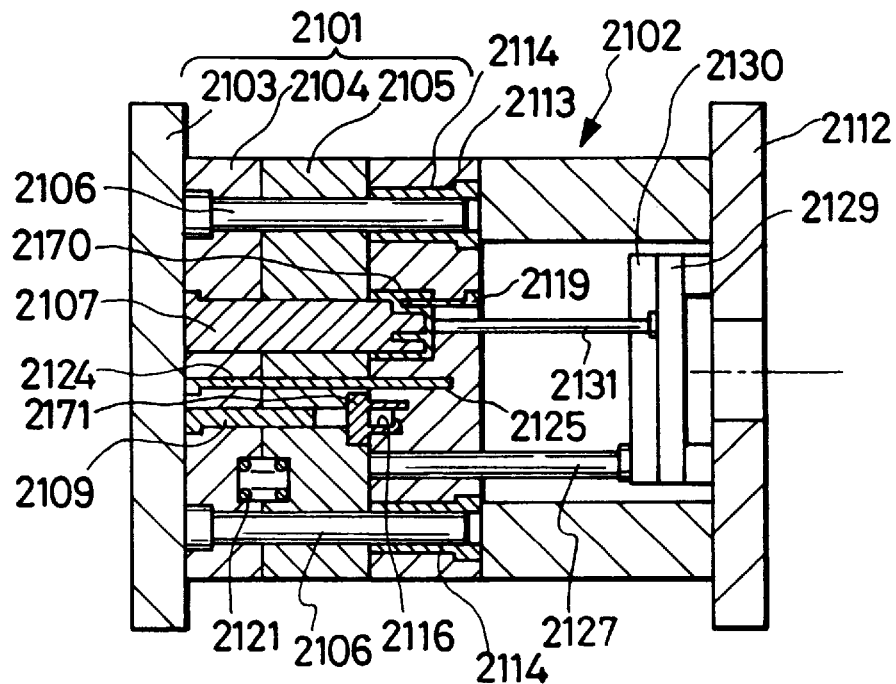
FIG. 27 is a cross-sectional view of a fifth embodiment of a mold, showing a condition in which a molten resin is filled.
Figure 28:
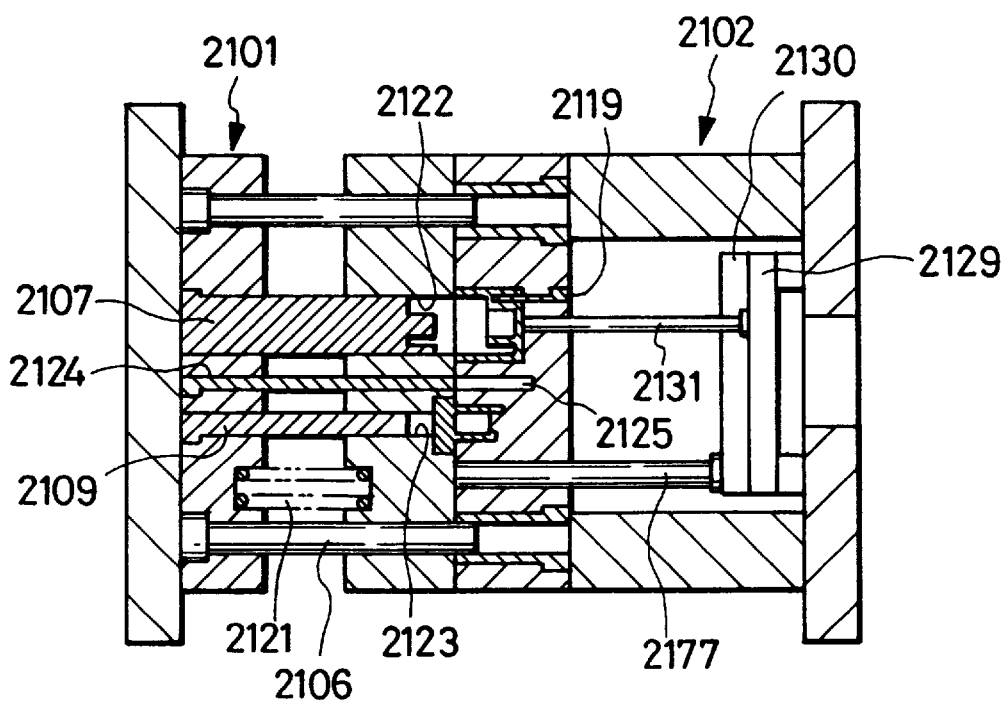
FIG. 28 is a cross-sectional view showing a condition in which core pins are withdrawn in the fifth embodiment.
Figure 29:
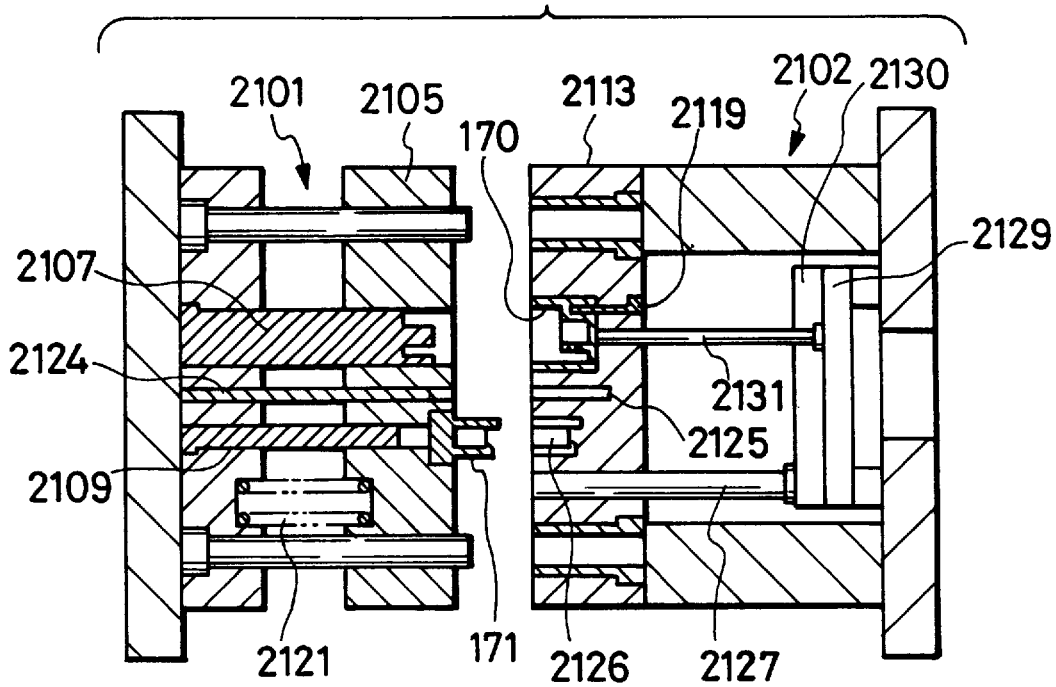
FIG. 29 is a cross-sectional view showing a mold-open condition in the fifth embodiment.

The mold of the third embodiment is of the above construction, and in the mold-closed condition shown in FIG. 27, a molten resin is filled in the molding cavities formed between the two mold plates 2105 and 2113, thereby molding the housing 170 and the retainer 171. Then, when the molten resin is solidified, the movable mold 2102 is moved back. In accordance with this backward movement of the movable mold 2102, the fixed-side mold plate 2105 is spaced apart from the end-drawing plate 2104 under the influence of the spring 2121, and as a result the main core pin 2107 is withdrawn from the molded housing 170 while the core pin 2109 is withdrawn from the retainer 171 (see FIG. 28). When the movable mold 2102 further moves back, there is achieved the mold-open condition in which the movable-side mold plate 2113 and the fixed-side mold plate 105 are spaced apart from each other, as shown in FIG. 29.

Figure 30:
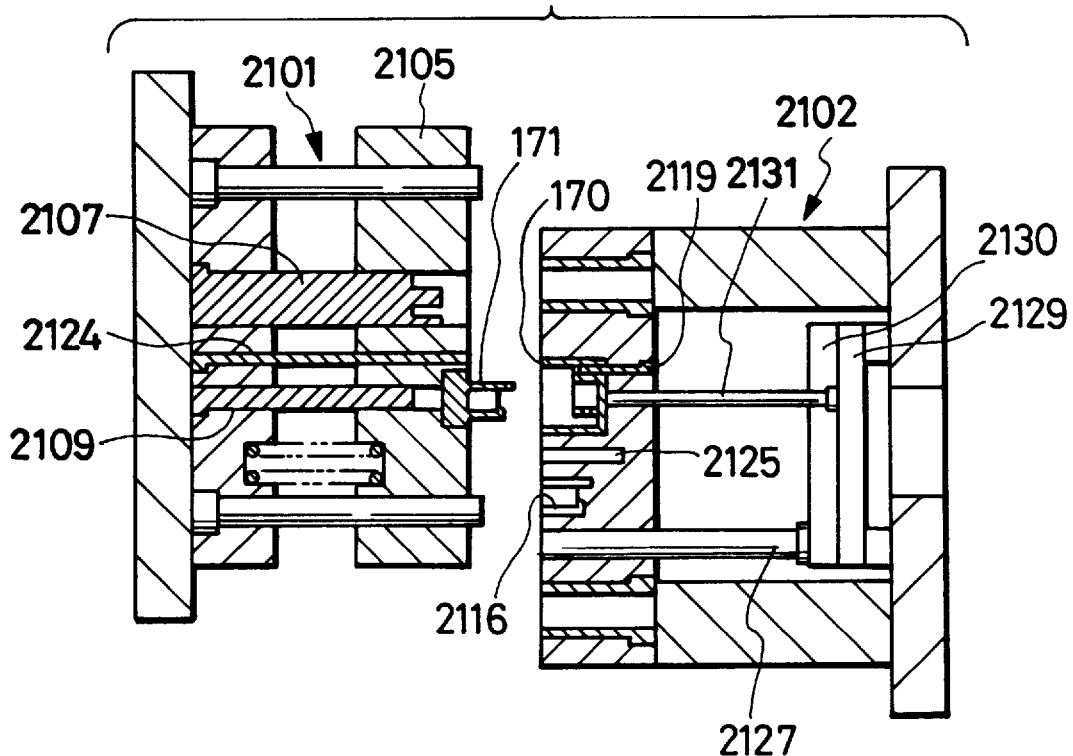
FIG. 30 is a cross-sectional view showing a condition in which a housing and a retainer are aligned with each other in the fifth embodiment.

Then, the fixed-side mold 2101 is moved upward (in the drawings) by the drive mechanism (not shown) to displace the fixed-side mold plate 2105 with respect to the movable-side mold plate 2113, that is, into an assembling position where the retainer 171 is disposed coaxially with the housing 170 (see FIG. 30).

When the fixed mold is thus moved into the above assembling position, the first and second pin plates 2129 and 2130 are moved forward as shown in FIG. 31. As a result, the ejector pin 2131 forces the housing 170 out of the housing-molding recess 2115, and fits the housing 170 on the retainer 171 held on the fixed mold. The sub-core pin 2119 is withdrawn from the housing 170 simultaneously when the housing 170 is ejected from the housing-molding recess 2115, and therefore the sub-core pin 2119 will not affect the connection of the housing to the retainer 171 (e.g. the engagement between the provisionally-retaining pawl 183 and the retaining step 182), and the housing and the retainer are connected together in the provisionally-retained condition. At this time, the distal end of the return pin 2127 is held in slight contact with the surface of the fixed-side mold plate 2105, and the front end of the housing 170 is held in contact with the distal end of the fixed-side ejector pin 2124.

Then, when only the second pin plate 2130 is moved forward as shown in FIG. 32, the movable-side return pin 2127 retracts the fixed-side mold plate 2105 against the bias of the spring 2121. As a result, the fixed-side ejector pin 2124 ejects the housing 170, so that the connector, having the housing 170 and the retainer 171 connected together, is forced out of the retainer-molding recess 2108 in the fixed mold, and is discharged from the mold. Thus, the connector is taken out, and then the first and second pin plates 2129 and 2130 are returned to their respective initial positions, and the whole of the fixed mold 2101 is returned to the initial position, so that the mold is ready for a subsequent molding operation.

As described above, in the fifth embodiment as in the fourth embodiment, the production and assembling of the connector can be easily carried out at low costs.

The other construction of this embodiment is similar to that of the fourth embodiment, and similar effects are achieved.

Various modifications can be made in the present invention, and the following modifications fall within the scope of the invention:

In the third embodiment, although only the movable mold S is moved in the upward-downward direction and the right-left direction, both molds may be movable.

In the third embodiment, the assembling operation of connecting the molded retainer 4 and the molded housing 3 together is effected in accordance with the mold re-closing operation. However, instead of this, the following arrangement may be used:

For example, a knockout pin (not shown) is provided in the movable-side mold plate 202. When the molding is completed as shown in FIG. 18, the knockout pin is driven to push the molded housing 3 toward the retainer 4, thereby connecting the retainer and the housing together. The thus assembled connector is disengaged from the housing-molding recess because of its own weight (An ejector pin for this purpose may be provided), and is discharged from the mold.

In the fourth and fifth embodiments, although the arrangement in which the housing and the retainer of the connector are connected together has been shown and described, the present invention can be applied to other various resin-molded products, and the number of the molded products is not limited to two, but the invention can be applied to an arrangement in which more than two parts are to be connected together.

In the fourth and fifth embodiments, although only the fixed mold is displaced or moved, the movable mold may be moved, or both molds may be moved.

Furthermore, according to the invention, when forming of the connector housing and the retainer, different resins in material or color may be filled in the connector forming mold and the retainer forming mold, so that the connector housing and the retainer can be made different in material or color.

Sixth Embodiment

A sixth preferred embodiment of the present invention will now be described with reference to FIGS. 33 to 39. Although this embodiment is directed to a front retainer-type connector as described above with reference to FIG. 6, the invention can be applied to a rear retainer-type connector. A mold for performing the method of this invention is incorporated in an injection molding system, and important portions thereof are generally as described below, but the drawings are simplified for explanation purposes, and the mold does not strictly correspond to the connector shown in FIG. 6.

The mold of this embodiment comprises a movable mold, and a fixed mold, and the movable mold S comprises a movable-side mold plate 302 secured to a movable-side die plate 301. A housing-molding recess 305 for forming a housing 3 of the connector is formed in a molding surface of the movable-side mold plate 302, and a retainer-molding reception portion 306 for forming a retainer 4 is formed in that portion of this molding surface disposed just above the recess 305 (see the drawings). A relief hole 307 is open to that portion of the molding surface disposed just below the housing-molding recess 305. The movable mold S is connected to a drive mechanism (not shown), and is movable a predetermined stroke in right and left directions (in the drawings).

The fixed mold R comprises a press block 310 mounted on a fixed-side die plate R1 through a mounting plate 309, and an intermediate plate 311 disposed forwardly of the movable-side mold plate 302 in opposed relation thereto.

A spring SP is provided between the intermediate plate 311 and the mounting plate 309, and urges the intermediate plate 311 in a direction away from the mounting plate 309. Stopper means (not shown) is provided between the two plates so as to prevent the distance between the intermediate plate 311 and the mounting plate 309 from exceeding a predetermined value. A retainer-molding recess 312 is formed in that side or surface of the intermediate plate 311 facing the movable-side mold plate 302. This retainer-molding recess 312 is provided at a position in registry with the retainer-molding reception portion 306, and when the mold is closed, a mold cavity for the retainer 4 is formed by a space defined by the recess 312, the retainer-molding reception portion 306 and a shutter portion 313 (described later).

A slide pin 314, constituting a moving mechanism in the present invention, is incorporated in the intermediate plate 311 for sliding movement in an upward-downward direction (in the drawings). A distal end of the slide pin 314 is normally disposed flush with an inner surface of the retainer-molding recess 312, and when the molding is completed, this distal end can eject and move the molded retainer 4 into an insertion hole 315 (described later). This movement of the retainer 4 is guided, for example, by concave-convex fitting (Although not shown in the drawings, for example, projections are formed on the outer surface of the retainer 4 while recesses for respectively fitting on these projections are formed in the inner surface of the retainer-molding recess 312), and therefore the retainer 4 can be moved while maintaining its posture obtained when it is molded.

The insertion hole 315 is formed through that portion of the intermediate plate 311 disposed in registry with the housing-molding recess 305, and extends in the right-left direction (in the drawings). A core pin 316 is mounted on that surface of the intermediate plate 311 (facing the housing-molding recess 305) to which the insertion hole 315 is open. This core pin 316 is disposed coaxially with the housing-molding recess 315, and has an extension portion 316A at its outer peripheral edge. When the mold is closed, the core pin 316 enters the housing-molding recess 305, and forms a mold cavity for molding the housing 3 which mold cavity extends from a region, disposed slightly inwardly of an open end of the recess 305, to the inner or closed end of the recess 305. The core pin 316 is connected to a slide mechanism (not shown), and is reciprocally movable along the surface of the intermediate plate 311 in the upward-downward direction (in the drawings) between a position where the core pin 316 is coaxial with the housing-molding recess 305 and a position where the core pin 316 is coaxial with the relief hole 307.

When the molded retainer 4 and the molded housing 3 are retained respectively in the molding recesses 312 and 305 after the mold is opened, those surfaces of the molded retainer 4 and housing 3 which are to be connected together are exposed in respective directions toward each other. Gates (not shown) are open respectively to the two molding recesses 305 and 312, and a molten resin is filled in these molding recesses 305 and 312 through the respective gates.

The press block 310, mounted on the mounting plate 309, can be inserted into the insertion hole 315, and a forwardly-projecting extension portion is formed on the press block 310 in flush relation to the upper surface (in the drawings) thereof. When the mold is closed, this extension portion abuts against the front surface of the movable-side mold plate 302, and thus serves as the shutter portion 313 to close the retainer-molding recess 312. A press surface 317 of a stepped configuration is formed on that portion of the press block 310 disposed below the shutter portion 313 (in the drawings). When the mold is closed, this press surface 317 forms a space 10A which is slightly larger in height than the retainer 4, and is slightly smaller in thickness than the retainer 4 (see FIG. 35). With this construction, the molded retainer 4, moved into the insertion hole 315 after the molding, can be pressed or pushed forwardly from the rear side to be connected to the molded housing 3 disposed in the housing-molding recess 305 in slightly-retracted relation to the open end of this recess 305.

The molding of the housing 3 and retainer 4 using the mold of the above construction, as well as the assembling procedure, will now be described.

Figure 33:
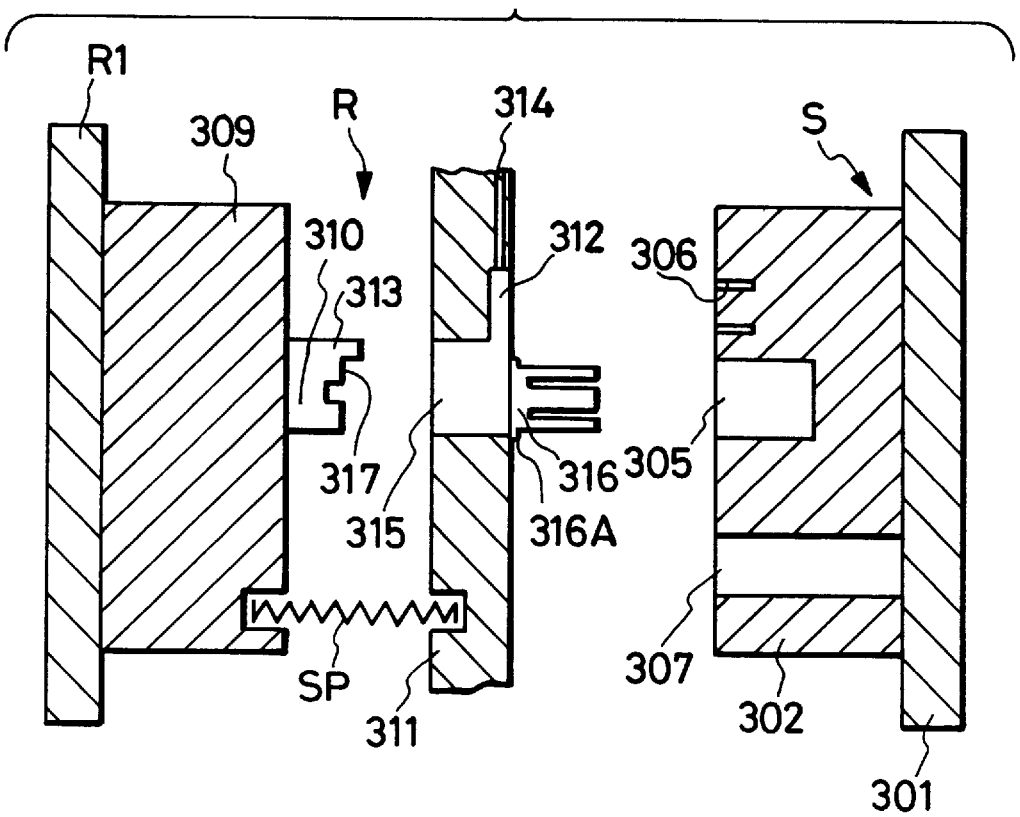
FIG. 33 is a cross-sectional view showing a sixth embodiment of a mold of the invention in its open condition.
Figure 34:
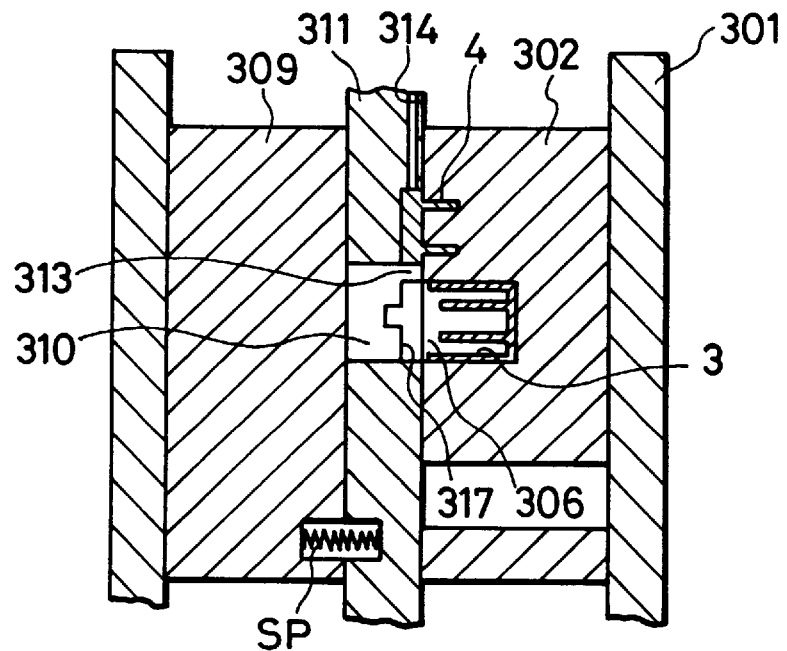
FIG. 34 is a cross-sectional view showing a molding condition in the sixth embodiment.
Figure 35:
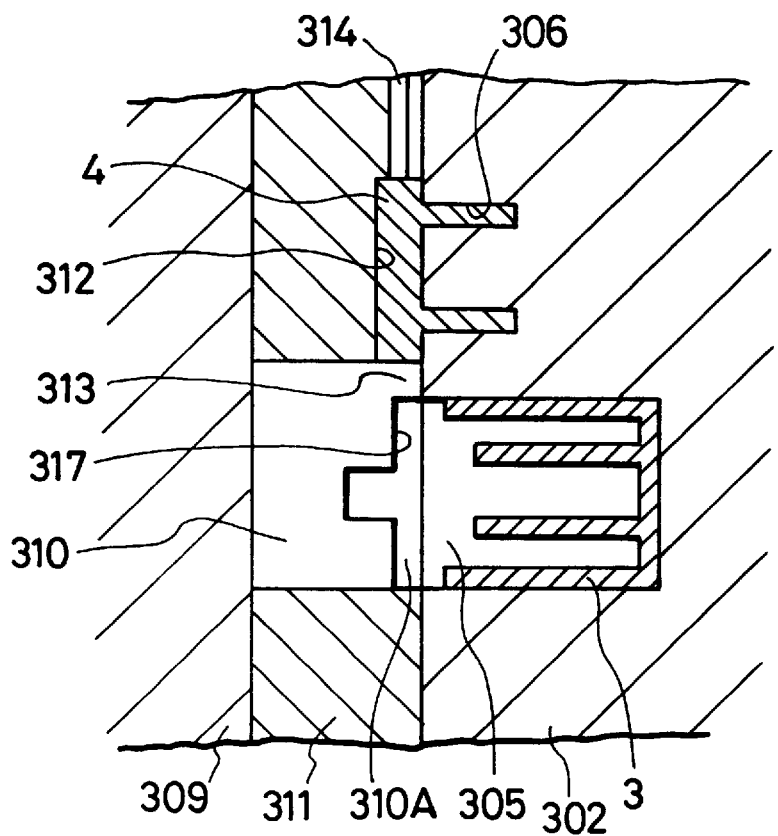
FIG. 35 is an enlarged, cross-sectional view showing an important portion in the molding condition in the sixth embodiment.
Figure 36:
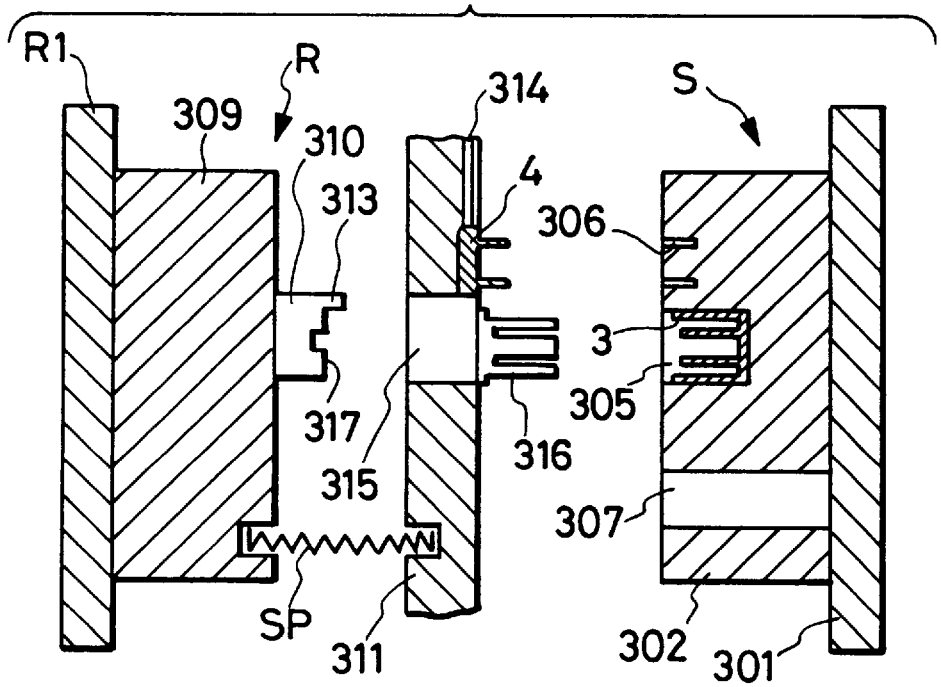
FIG. 36 is a cross-sectional view showing the mold in its open condition after the molding is effected.

In the mold-open condition of FIG. 33, when the movable mold S is moved toward the fixed mold R, the movable-side mold plate 302 first abuts against the intermediate plate 311. When the movable mold S further advances, the intermediate plate 311 is retracted while compressing the spring SP, and is brought into intimate contact with the mounting plate 309. During this time, the core pin 316 is inserted into the housing-molding recess 305 to form the housing-molding cavity therein. Also, the retainer-molding recess 312 is mated with the retainer-molding reception portion 306, and the press block 310 is inserted into the insertion hole 315, so that the shutter portion 313 abuts against the movable-side mold plate 302 to close the retainer-molding recess 312. As a result, the cavity for molding the retainer 4 is formed by the retainer-molding recess 312, the retainer-molding reception portion 306 and the shutter portion 313. In this condition, the molten resin is filled in the two molding recesses (see FIGS. 34 and 35).

Then, when the resin is solidified upon lapse of a predetermined period of time, the movable mold S is moved back to open the mold. When the press block 310 is withdrawn from the insertion hole 315, and is returned to its initial position, the retainer 4 remains in the retainer-molding recess 312 in the fixed-side mold plate, and the housing 3 remains in the housing-molding recess 305 in the movable-side mold plate 302 (see FIG. 36). Thereafter, the core pin 316 is moved downward (in the drawings) into the position where the core 316 is coaxial with the relief hole 307 in the horizontal direction.

Then, the slide pin 314 is moved downward (in the drawings) to push the molded retained 4 out of the retainer-molding recess 312. At this time, because of the above-mentioned concave-convex fitting between the retainer 4 and the inner surface of the insertion hole 315, the movement of the retainer 4 into the insertion hole 315 is guided without changing the posture of the retainer 4 obtained when it is molded. As a result, the retainer 4 is opposed to the housing 3 on the common axis in the horizontal direction (in the drawings).

Then, after the slide pin 314 is returned to its initial position, the movable mold S is moved forward to again close the mold while compressing the spring SP. As a result, the press block is again inserted into the insertion hole 315, so that its press surface 317 pushes the rear surface of the retainer 4. As a result, the retainer 4 is fitted in the housing 3 from the front side of this housing, and is thus connected to the housing in a provisionally-retained condition. During this time, the core pin 316 is inserted into the relief hole 307, and therefore will not interfere with the movable mold S.

The assembling operation is thus completed, and then when the movable mold S is again moved back, the connector, constituted by the housing 3 and the retained 4 connected together, remains in the movable mold S, and this connector is ejected from the mold by a discharge mechanism (not shown), such as an ejector pin operatively associated with the mold-opening mechanism for the movable mold, so that the two molds are again ready for a subsequent molding operation.

As described above, in this embodiment, the step of molding the housing 3 and the retainer 4 and the assembling step of connecting them together can be carried out at the same time, and therefore the conveyance and the assembling operation as required in the conventional method are not necessary, and the lead time for the finished product is shortened by the shortened process, and the manufacturing cost can be reduced. And besides, since different kinds of molded products, that is, the housing 3 and the retainer 4, can be molded in one mold, this is advantageous from the viewpoint of management of the mold.

Seventh Embodiment

A seventh embodiment of the present invention will now be described with reference to FIGS. 40 to 45. First, a connector to be molded has been described with reference to FIG. 8. As same with the previous embodiments, although the connector to be described here is a so-called front retainer-type connector, the invention can be applied to a rear retainer-type connector.

The construction of a mold for producing the connector of the above construction will now be described. In this embodiment, the mold is incorporated in an injection molding system. In the drawings, important portions are shown merely broadly, and details thereof are omitted for the sake of simplicity of the description. Therefore, details of the above construction of the connector are not shown, and for example the number and shape of core pins (described later) are merely broadly shown in the drawings.

The mold of this embodiment comprises a movable mold and a fixed mold. The fixed mold 3101, shown at a left side in the drawings, includes a fixed-side mounting plate 3103, and a fixed-side mold plate 3105 (at a right side in the drawings) is mounted on the plate 3103 through an end-drawing plate 3104. Guide posts 3106 are provided at an end portion of the end-drawing plate 3104, and serve to guide the opening and closing movements of the two molds. A spring 3121 is provided between the end-drawing plate 3104 and the fixed-side mold plate 3105, and urges the fixed-side mold plate 3105 away from the end-drawing plate 3104. A main core pin 3107 for molding part (part of the retraction space 176 and the retaining projection 177, and so on) of the internal structure of the housing 170 is fixedly mounted on the end-drawing plate 3104 in parallel relation to the axis, and slidably extends through the fixed-side mold plate 3105. Core pin 3109 for molding part (part of the provisionally-retaining pawl 183, part of the hook 186 of the connection arm 179, and so on) of the internal structure of the retainer 171 is mounted on the end-drawing plate 3104 in parallel relation to the axis, and is spaced a predetermined distance from the main core pin 3107.

Figure 40:
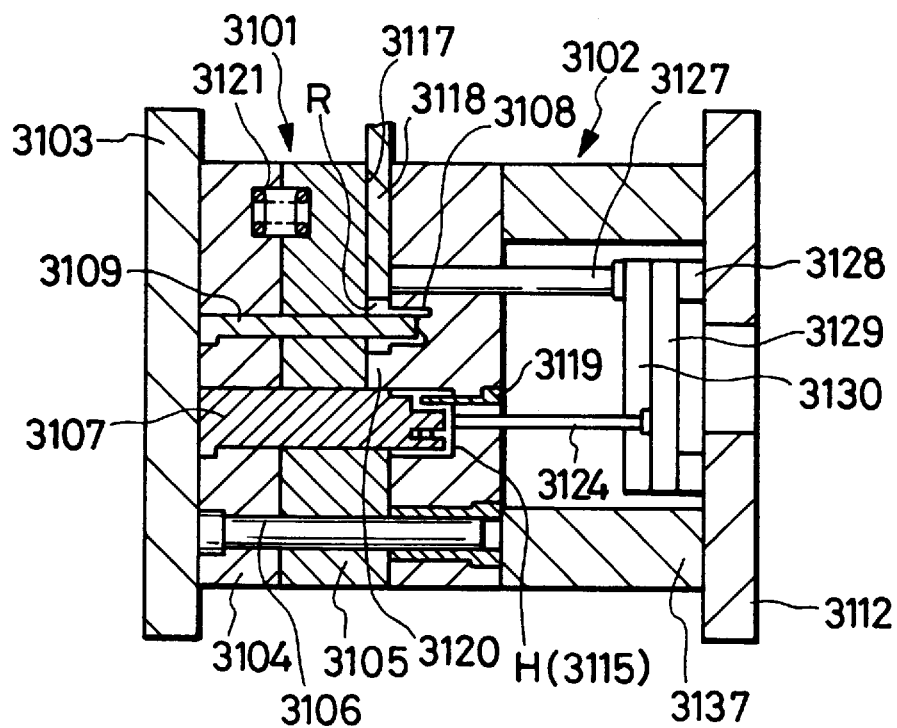
FIG. 40 is a cross-sectional view showing a mold of the seventh embodiment in its closed condition.
Figure 41:
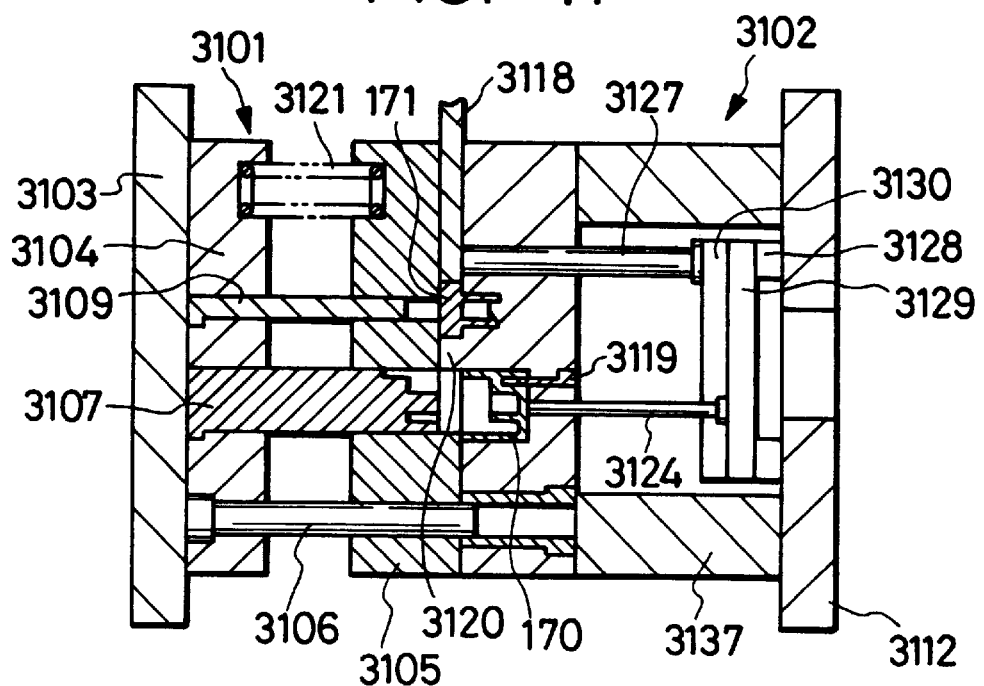
FIG. 41 is a cross-sectional view showing a primary mold-open condition in the seventh embodiment after the molding.

A guide rail 3117 in the form of a channel-shaped groove is formed in that surface of the fixed-side mold plate 3105 facing the movable mold. This guide rail 3117 extends from the upper end (in the drawings) of the fixed-side mold plate 3105 to the distal end of the main core pin 3107 in a direction perpendicular to the axis. Openings are formed in the bottom of this guide rail 3117, and the distal end portions of the core pin 3109 and the main core pin 3107 can pass respectively through these openings in a closely-fitted manner. When the fixed-side mold plate 3105 and the end-drawing plate 3104 are held in intimate contact with each other as shown in FIG. 40, the core pin 3109 and the main core pin 3107 extend through the guide rail 3117 into the movable mold. When the end-drawing plate 3104 and the fixed-side mold plate 3105 are spaced from each other as shown in FIGS. 41 to 44, the distal end of the core pin 3109 is spaced a predetermined distance from the guide rail 3117 while the distal end of the main core pin 3107 is disposed substantially flush with the guide rail 3117.

Figure 44:
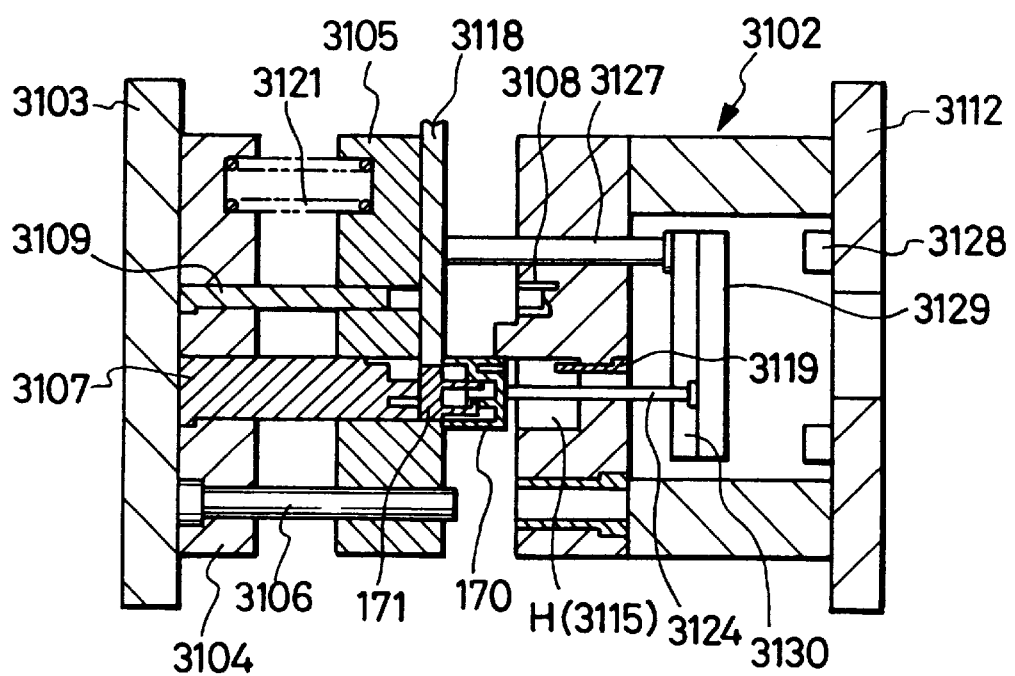
FIG. 44 is a cross-sectional view showing an assembling operation in the seventh embodiment.
Figure 45:
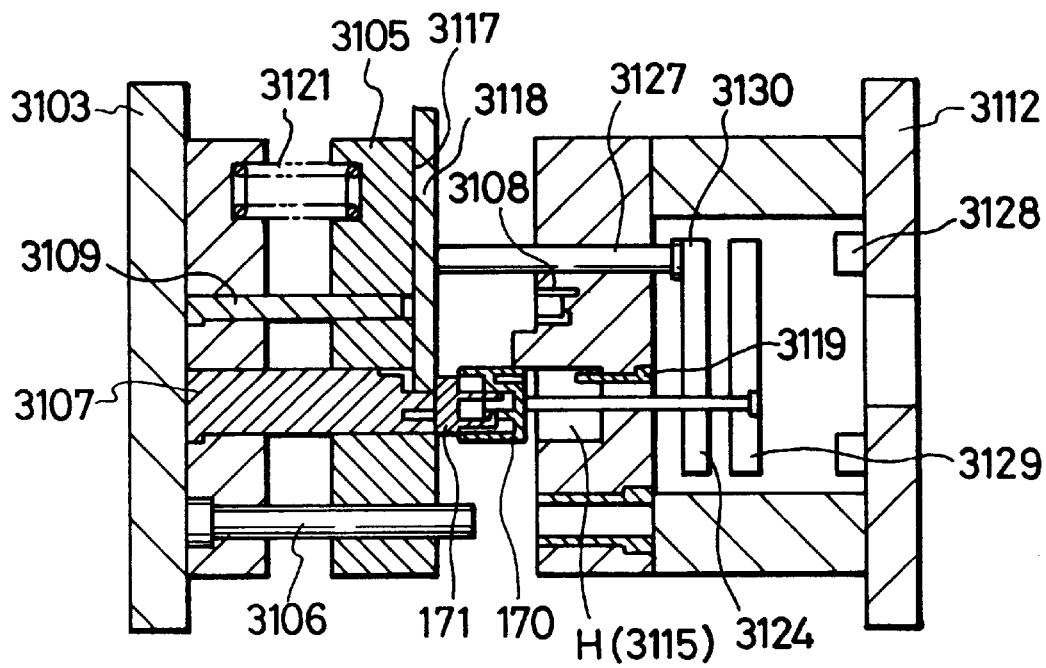
FIG. 45 is a cross-sectional view showing the ejection of the connector of the seventh embodiment.

When the mold is closed, the guide rail 3117 forms, together with a movable-side mold plate 3113, a retainer-molding cavity R, as shown in FIG. 40, and at this time the core pin 3109 is inserted into this retainer-molding cavity R as described above. A push pin 3118 is closely fitted in the guide rail 3117 for movement therealong, and a distal end of this push pin 3118 is normally exposed to the retainer-molding cavity R. The push pin 3118 is connected to a slide mechanism (not shown), and is movable in the upward-downward direction (in the drawings), and the distal end surface of this push pin 3118 defines part of the retainer-molding cavity R when the mold is closed for effecting the molding operation. The push pin 3118 also serves as a moving mechanism which pushes and moves the molded retainer 3117 to be located in front of the main core pin 3107 after the molding is finished. Further, when the housing 170 and the retainer 171 are connected together as shown in FIG. 44, the distal end of the push pin 3118 is engaged with the housing 170.

The movable mold 3102 is arranged coaxially with the fixed mold 3101, and includes a movable-side mounting plate 3112 as in the fixed mold. The movable-side mold plate 3113 is supported on the left side (in the drawings) of the mounting plate 3112 through spacer blocks 3137. The movable mold 3102 is connected to a drive mechanism (not shown), and is movable a predetermined stroke in left and right directions (in the drawings).

Guide bushes 3114 for respectively receiving the two guide posts 3106 when closing the mold are embedded in an end portion of the movable-side mold plate 3113, and extend parallel to the axis. A recess 3108 for forming the retainer-molding cavity R is formed in that side or surface of the movable-side mold plate 3113 facing the fixed-side mold plate 3105, and is disposed in opposed relation to the core pin 3109. A recess 3115 for forming a housing-molding cavity H is also formed in that portion of this surface of the movable-side mold plate 3113 disposed below the recess 3108, and is disposed in opposed relation to the main core pin 3107. A projection 3120 is formed on that surface of the movable-side mold plate 3113 facing the fixed-side mold plate, and when the mold is closed, this projection 3120 is extended into the guide rail 3117 to form the retainer-molding cavity R. A sub-core pin 3119 for molding the housing 170 is embedded in the movable-side mold plate 3113 at the backside of the recess 3115, and extends parallel to the axis, the sub-core pin 3119 being projected into the recess 3115. Although not shown, gates are open respectively to the two recesses (i.e., the retainer-molding recess and the housing-molding recess) 3108 and 3115, and a molten resin is filled in the two recesses through the respective gates.

Two pin plates 3129 and 3130 are provided between the movable-side mold plate 3113 and the movable-side mounting plate 3112 through a block 3128. The first pin plate 3129 and the second pin plate 3130 are connected to drive means (not shown) (which may be a common drive source or different drive sources), and are movable along the axis independently of each other. An ejector pin 3124 for ejecting the molded housing 170 to be connected to the retainer 171 is mounted on the first pin plate 3129 in parallel relation to the axis, and slidably extends through the second pin plate 3130 and the movable-side mold plate 3113. A return pin 3127 is mounted on the second pin plate 3130 in parallel relation to the axis, and slidably extends through the movable-side mold plate 3113.

The distal end of the return pin 3127 is normally disposed substantially flush with the surface of the movable-side mold plate 3113, and as the second pin plate 3130 advances, the return pin 3127 moves the fixed-side mold plate 105 back against the bias of the spring 3121.

The process of molding the housing 170 and the retainer 171 using the above mold of this embodiment, as well as the assembling process, will now be described.

First, the two molds 3101 and 3102 are closed together to bring the two mold plates 3105 and 3113 into intimate contact with each other. At this time, the distal end of the push pin 3118 is exposed to the retainer-molding cavity R. The housing-molding cavity H and the retainer-molding cavity R are formed between the two mold plates 3105 and 3113 held in contact with each other. At this time, the core pin 3109 is inserted into the retainer-molding cavity R, and the main core pin 3107 and the sub-core pin 3119 are inserted into the housing-molding cavity H.

In this mold-closed condition, the molten resin is filled in the housing-molding cavity H and the retainer-molding cavity R through the gates (not shown). When the resin is solidified upon lapse of a predetermined time period, the movable mold 3102 is moved back into a condition shown in FIG. 41. More specifically, as the movable mold 3102 is moved back, the fixed-side mold plate 3105 moves away from the end-drawing plate 3104 under the influence of the spring 3121, and as a result the core pin 3109 is withdrawn from the molded retainer 171, and the main core pin 3107 is withdrawn from the molded housing 170.

Figure 42:
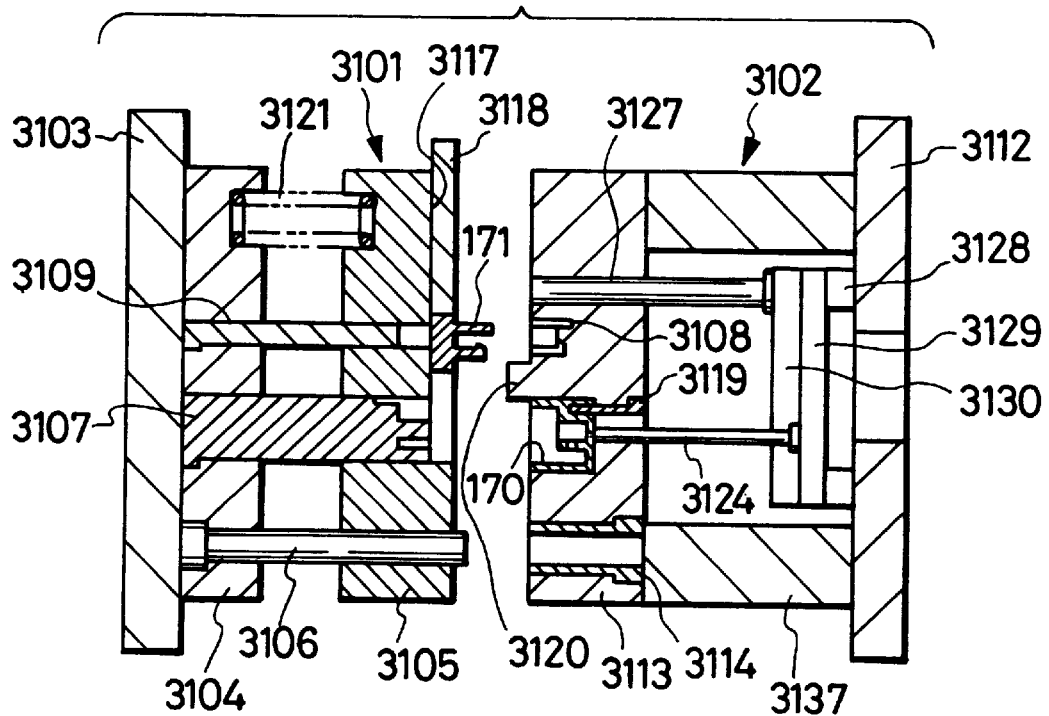
FIG. 42 is a cross-sectional view showing a final mold-open condition in the seventh embodiment.

Then, when the movable mold 3102 is further moved back, so that the two mold plates 3105 and 3113 are spaced apart from each other, the molded retainer 171 is held or retained on the fixed side (the guide rail 3117) while the molded housing 170 is held on the movable side (the housing-molding recess 3115) as shown in FIG. 42.

Figure 43:
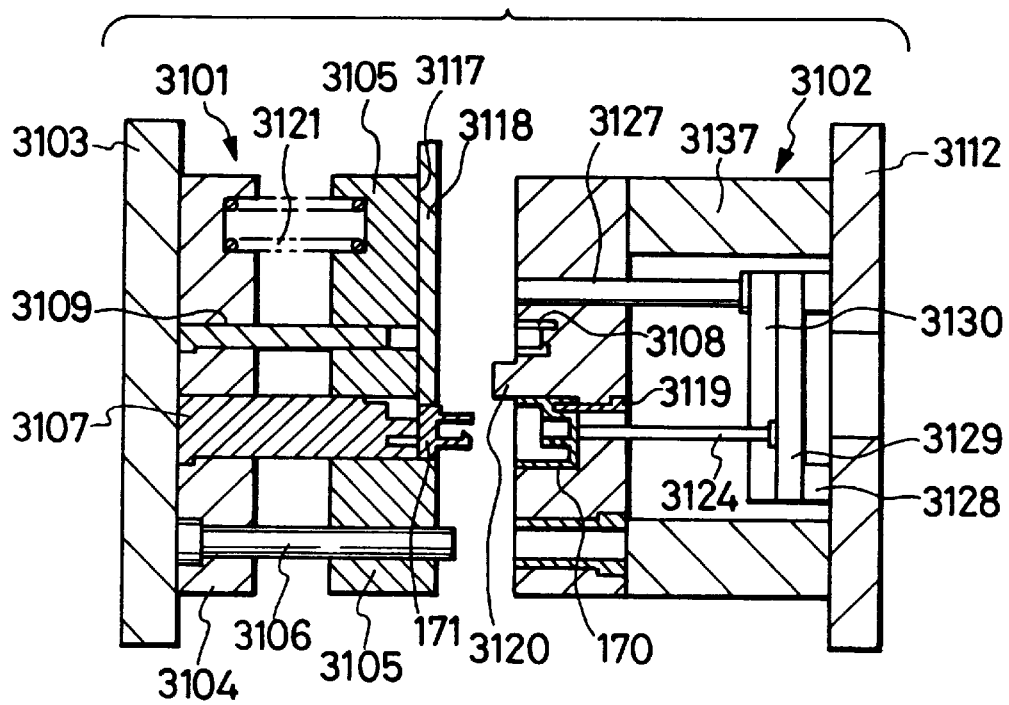
FIG. 43 is a cross-sectional view showing the movement of a push pin in the seventh embodiment.

In this mold-open condition, the slide mechanism (not shown) is driven to move the push pin 3118 downward (in the drawings) along the guide rail 3117. As a result, the push pin 3118 pushes the retainer 171 along the guide rail 3117, so that the retainer 171 is located in front of the main core pin 3107 as shown in FIG. 43. In this condition, the retainer 171 is held at its rear side against the main core pin 3107, and hence is supported by this main core pin.

Thus, the retainer 171 and the housing 170 are disposed in opposed relation to each other on a common axis, and in this condition the first and second pin plates 3129 and 3130 are moved forward by the drive mechanism (not shown). As a result, the ejector pin 3124 ejects the housing 170 from the housing molding-recess 3115, so that the retainer 171 is fitted into the hood portion 173, thus connecting the housing and the retainer together. The return pin 3127 is merely held against the fixed-side mold plate 3105, but does not effect a pushing action. Although FIG. 44 shows that the housing 170 is completely ejected from the recess 3115 when the housing 170 and the retainer 171 are connected together, it is preferred that the housing 170 is connected to the retainer 171 in such a manner that the housing 170 is slightly fitted in the open end portion of the recess 3115.

Then, when the second pin plate 3130 advances, the return pin 3127 moves the fixed-side mold plate 3105 back against the bias of the spring 3121. Therefore, the assembled connector is ejected by the main core pin 3107 from the back side, and is discharged from the mold. Thus, the connector in the provisionally-retained condition is taken out form the mold.

As described above, the step of molding the housing 170 and the retainer 171 and the assembling step of connecting them together can be carried out at the same time, and therefore independent conveyance and assembling steps as required in the conventional method are not needed, and therefore the lead time for the finished product is shortened by the shortened process, and the manufacturing cost can be reduced.

In this embodiment, the housing 170 and the retainer 171 can be connected together merely by operating the ejector pin 124, and the assembled connector can be discharged merely by operating the return pin 127. It may be proposed to effect such assembling and discharge operations utilizing the overall mold-closing operation. In this case, however, those portions to be moved are large, and also the required energy is large. On the other hand, in this embodiment, those portions to be moved are kept to a minimum, and the construction is simple, and the energy required for the operation is small.

Different kinds of molded products, that is, the housing and the retainer, can be formed in one mold, and this is advantageous from the viewpoint of management of the mold. In this embodiment, the core pins are withdrawn from the housing 170 and the retainer 171 before the assembling operation is effected, and therefore there is achieved an advantage that the two can be connected together smoothly.

Various modifications can be made in the present invention, and the following modifications fall within the scope of the invention:

In the sixth embodiment, the assembling operation of connecting the molded retainer 4 and the molded housing 3 together is effected in accordance with the mold re-closing operation, and therefore the mold closing mechanism also serves as the assembling mechanism. However, instead of this, the following assembling mechanism may be used.

For example, the core pin 316 is provided at the position where the press block 310 is provided, and when the mold is closed, the core pin 316 is passed through the insertion hole 315 to form the housing-molding cavity in the housing-molding recess 305.

Figure 37:
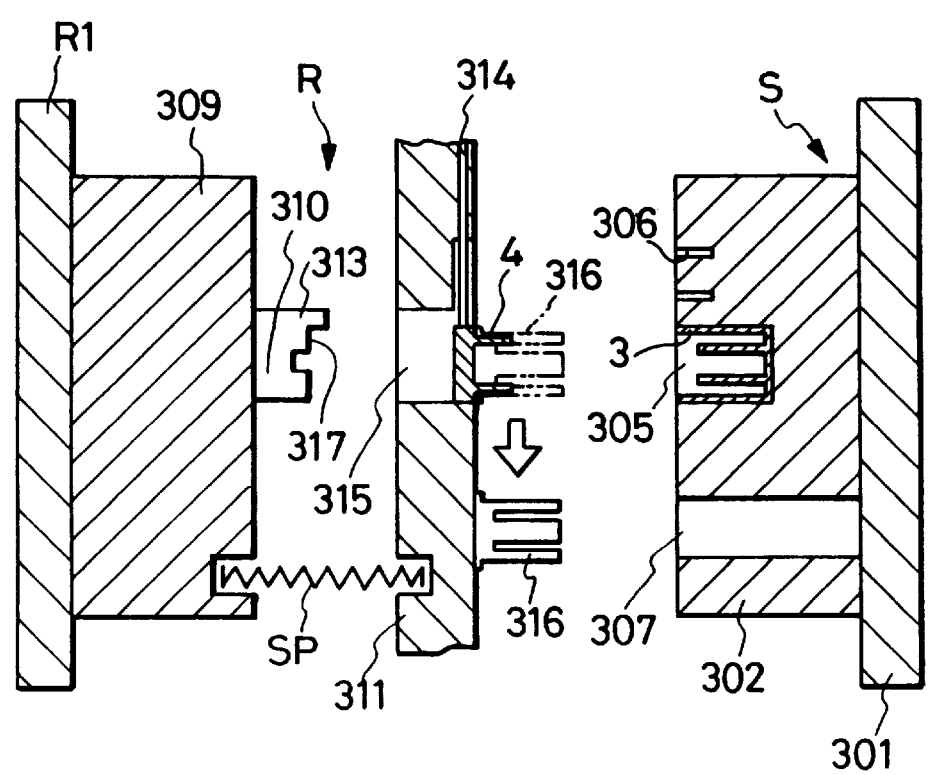
FIG. 37 is a cross-sectional view showing the movement of a retainer in the sixth embodiment.
Figure 38:
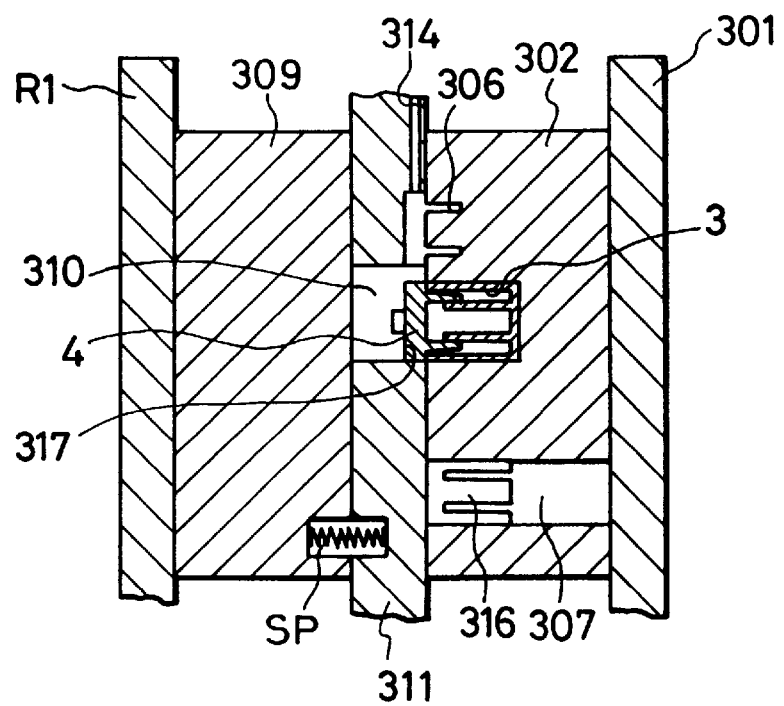
FIG. 38 is a cross-sectional view showing a condition in which a housing and the retainer in the sixth embodiment are connected together.
Figure 39:
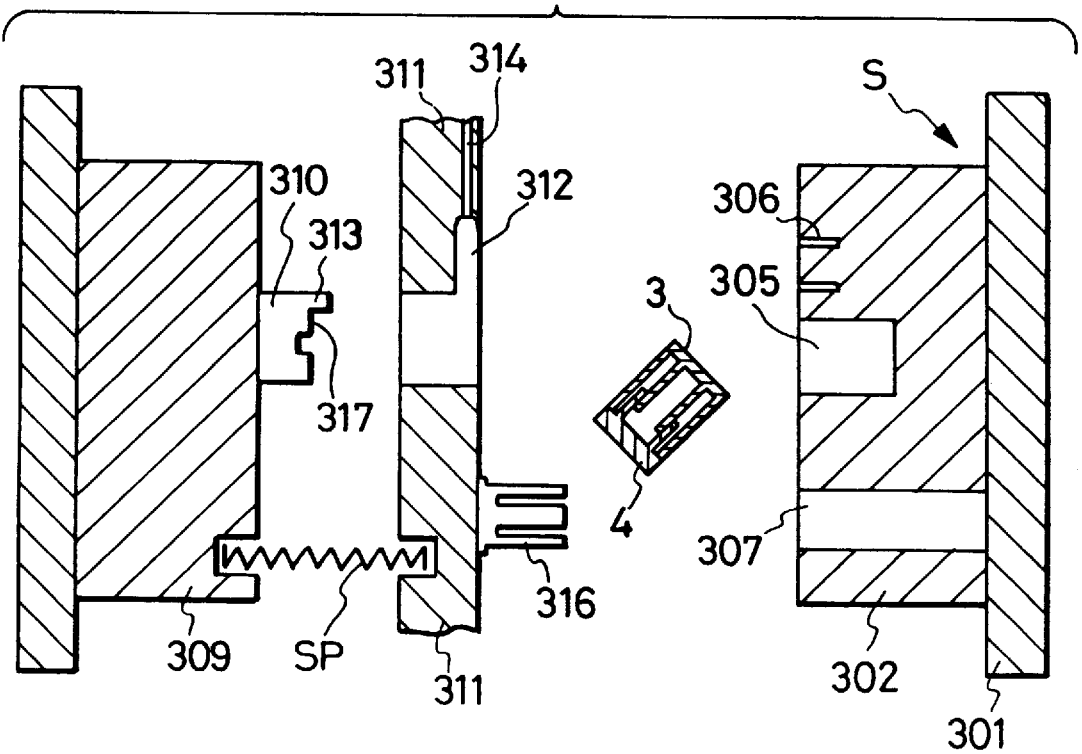
FIG. 39 is a cross-sectional view showing a condition in which the finished product in the sixth embodiment is taken out from the mold.

A knockout pin (not shown) is provided on the movable-side mold plate 302. When the pushing of the retainer 4 by the slide pin 314 as shown in FIG. 37 is completed, so that the retainer 4 is opposed to the housing 3, the knockout pin is driven to push the molded housing 3 toward the retainer 4, thereby connecting the retainer and the housing together. The thus assembled connector is disengaged from the housing-molding recess because of its own weight (An ejector pin for this purpose may be provided), and is discharged from the mold.

In the seventh embodiment, although the arrangement in which the connector housing and the retainer are connected together has been shown and described, the present invention can be applied to other various resin-molded products, and the number of the molded products is not limited to two, but the invention can be applied to an arrangement in which more than two parts are to be connected together.

In the seventh embodiment, although only the movable mold is displaced or moved in the axial direction, both of the two molds may be movable.

Furthermore, according to the invention, when forming of the connector housing and the retainer, different resins in material or color may be filled in the connector forming mold and the retainer forming mold, so that the connector housing and the retainer can be made different in material or color.

Eighth Embodiment

An eighth embodiment of the present invention will now be described with reference to FIGS. 46 to 53. Although this embodiment is directed to a front retainer-type connector as described above, the invention can be applied to a rear retainer-type connector. A mold for performing the method of this invention is incorporated in an injection molding system, and important portions thereof are generally as described below, but FIGS. 46 to 53 are simplified for explanation purposes, and the mold does not strictly correspond to the connector shown in FIG. 6. FIGS. 46 to 51 are cross-sectional views generally taken along the line P—P of FIG. 52 and the line Q—Q of FIG. 53.

Figure 53:
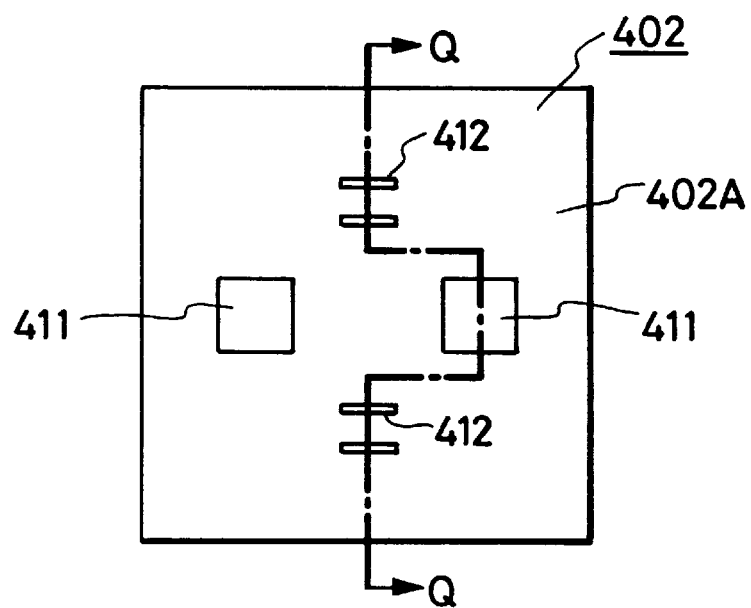
FIG. 53 is a front-elevational view of a fixed-side mold plate in the eighth embodiment.
Figure 54:
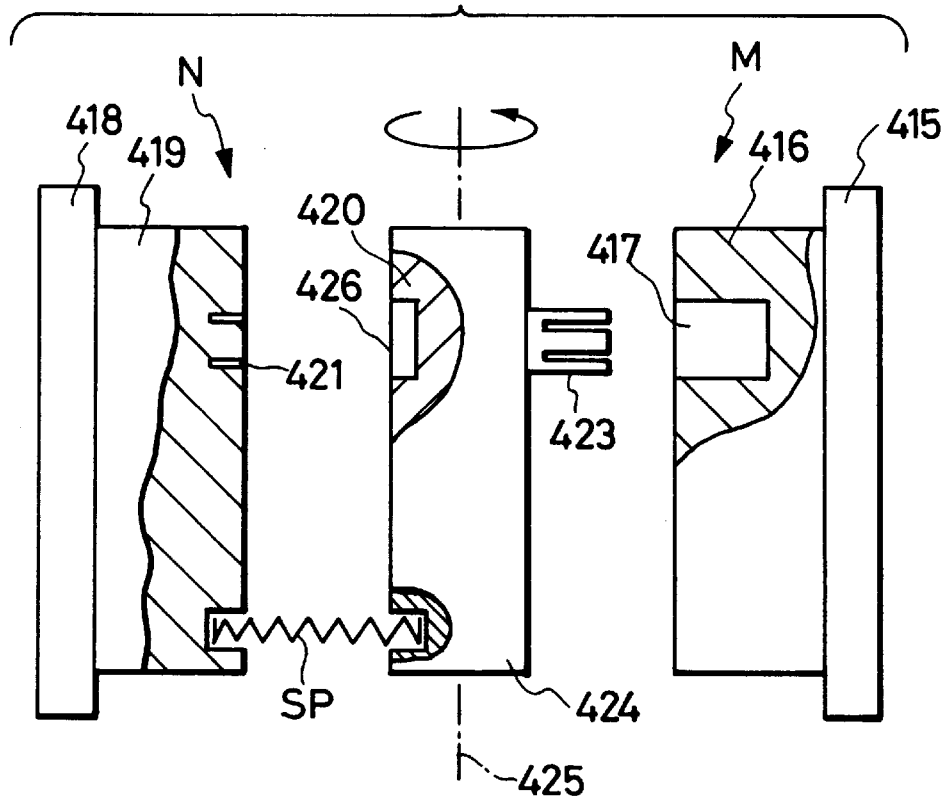
FIG. 54 is a cross-sectional view showing a mold-open condition before the molding in a ninth embodiment.
Figure 55:
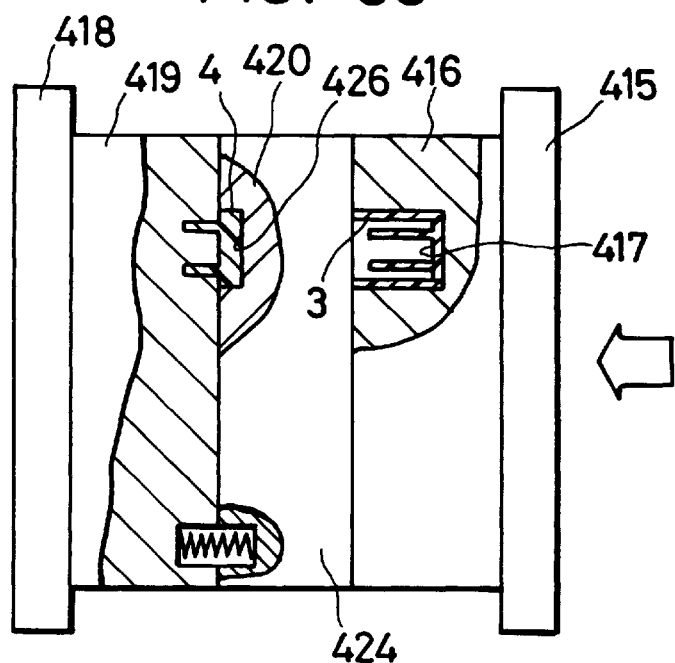
FIG. 55 is a cross-sectional view showing a molding condition in the ninth embodiment.
Figure 56:
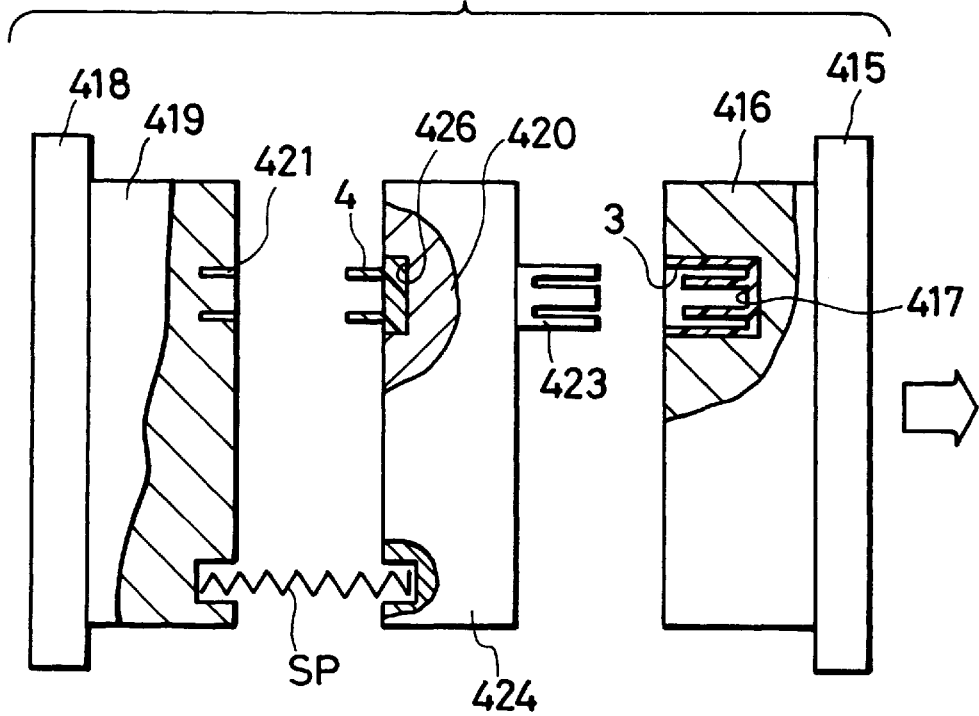
FIG. 56 is a cross-sectional view showing the mold-open condition after the molding in the ninth embodiment.

The mold of this embodiment comprises a fixed mold S and a movable mold R, and the movable mold R comprises a movable-side mold plate 402 mounted on a base plate 401 for rotation about an axis X. That surface of the movable-side mold plate 402 facing the fixed mold S serves as a molding surface 402A, and housing-molding recesses 411 and retainer-molding reception portions 412 are formed in this molding surface 402A. In this embodiment, the two housing-molding recesses 411 and the two retainer-molding reception portions 412 are formed, as shown in FIG. 53. A line on which the pair of recesses 411 are disposed is perpendicular to a line on which the pair of reception portions 412, and the pair of recesses 411 and the pair of reception portions 412 are disposed on a circle having its center lying on the axis X of rotation of the movable-side mold plate 402. The movable-side mold plate 402 is connected to a drive mechanism (not shown) having an indexing device, and is angularly movable reciprocally 90° about the rotation axis (It may be angularly movable in one direction by 90 degrees at a time).

The fixed mold S is arranged coaxially with the movable mold R, and comprises a receiving plate 406 fixedly mounted on a mounting plate 405, and a fixed-side mold plate 407 mounted forwardly of the receiving plate 406. That surface of the fixed-side mold plate 407 facing the movable-side mold plate 402 serves as a molding surface 407A. Retainer-molding recesses 407B are formed in the molding surface 407A, and are normally opposed respectively to the two retainer-molding reception portions 412 in coaxial relation thereto. A spring SP is provided between the receiving plate 406 and the fixed-side mold plate 407, and urges the fixed-side mold plate 407 away from the receiving plate 406. Suitable stopper means (not shown) is provided between the receiving plate 406 and the fixed-side mold plate 407 to prevent the distance between the two from exceeding a predetermined value.

A pair of retainer-molding core pins 409 are mounted at their proximal end portions in the receiving plate 406, and are aligned respectively with the retainer-molding recesses 407B in the fixed-side mold plate 407. The proximal end portions of the two retainer-molding core pins 409 are thus incorporated in the receiving plate 406, and their distal end portions are slidably inserted respectively into insertion holes 409A formed horizontally (in the drawings) through the fixed-side mold plate 407, the insertion holes 409A communicating with the retainer-molding recesses 407B, respectively. In a mold-open condition shown in FIG. 46, the distal end of each retainer-molding core pin 409 is retracted from the associated retainer-molding recess 407B, and when the receiving plate 406 and the fixed-side mold plate 407 are held in intimate contact with each other, the distal end of the core pin 409 is exposed to the retainer-molding recess 407B. When the two mold plates 402 and 407 are closed together, a retainer-molding cavity is formed between the retainer-molding recess 407B and the retainer-molding reception portion 412.

Figure 47:
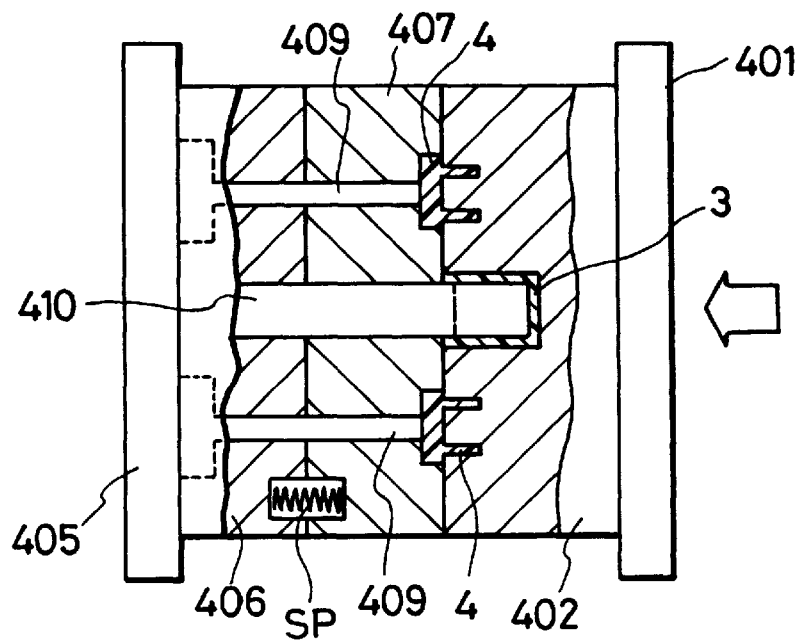
FIG. 47 is a cross-sectional view showing a molding condition in the eighth embodiment.
Figure 48:
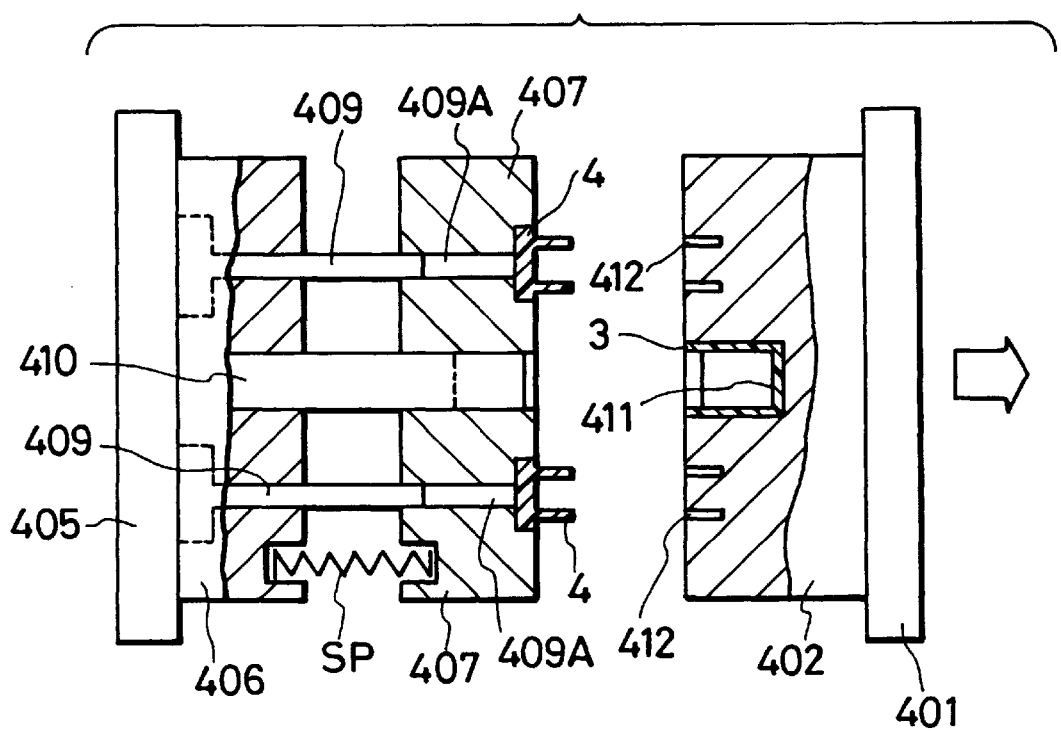
FIG. 48 a cross-sectional view showing a mold-open condition after the molding in the eighth embodiment.

A pair of housing-molding core pins 410 are also mounted on the receiving plate 406. The two housing-molding core pins 410 are arranged respectively in registry with the housing-molding recesses 411 in the movable-side mold plate 402, and a plane on which the pair of core pins 410 are disposed is perpendicular to a plane on which the retainer-molding core pins 409 are disposed. The two core pins 410 are disposed on a circle having its center on the axis of the fixed mold S, that is, on the axis (rotation axis X) of the movable mold R. The two housing-molding core pins 10 are also incorporated at their proximal end portions in the receiving plate 406, and their distal end portions are slidably inserted respectively into insertion holes 410A formed horizontally (in the drawings) through the fixed-side mold plate 407. The two housing-molding core pins 410 are normally disposed coaxially respectively with the housing-molding recesses 411 in the movable-side mold plate 402 in the horizontal direction, and their distal ends are disposed flush with or slightly retracted from the molding surface 407A. However, when the mold is closed as shown in FIG. 47, each housing-molding core pin 410 projects into the associated housing-molding recess 411 to form a housing-molding cavity therebetween.

When the molded retainers 4 and the molded housings 3 are retained respectively in the molding recesses 407B and 411 after the mold is opened, those surfaces of the associated molded housing 3 and retainer 4 which are to be connected together exposed in respective directions toward each other. Gates (not shown) are open respectively to the molding recesses 407B and 411, and a molten resin is filled in these recesses through the respective gates.

The movable mold R is connected to a drive mechanism (not shown), and is reciprocally movable in right and left directions (in the drawings), and therefore the movable mold is movable between a position where the movable-side mold plate 402 is held in intimate contact with the fixed-side mold plate 407, a position where the fixed-side mold plate 407, held against the movable-side mold plate 402, is held in intimate contact with the receiving plate 406, and a position where the movable-side mold plate 402 is spaced apart from the fixed-side mold plate 407.

The molding of the housings 3 and the retainers 4 using the mold of the above construction, as well as the assembling procedure, will now be described.

Figure 46:
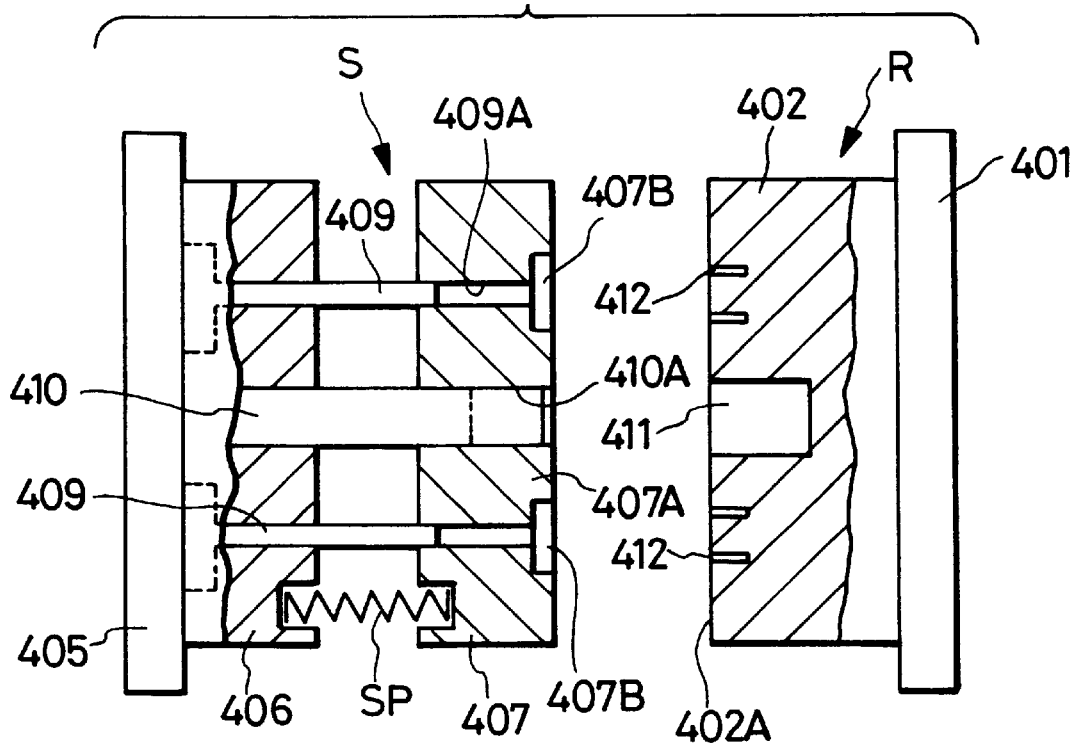
FIG. 46 is a cross-sectional view showing an eighth embodiment of a mold of the invention in its open condition.

In the mold-open condition shown in FIG. 46, when the movable mold R is moved toward the fixed mold S, the movable-side mold plate 402 first abuts against the fixed-side mold plate 407. When the movable mold R further advances, the fixed-side mold plate 407 comes into intimate contact with the receiving plate 406 while compressing the spring. As a result, the two retainer-molding core pins 409 advance along the respective insertion holes 409A, and reach he retainer-molding recesses 407B, respectively, so that each core pin 409, the associated retainer-molding recess 407b and the associated retainer-molding reception portion 412 jointly form the retainer-molding cavity. Also, the two housing-molding core pins 410 are projected respectively into the housing-molding recesses 411, so that the housing-molding cavity is formed between each core pin 410 and the associated molding recess 411. In this condition, the molten resin is filled in each of the molding recesses.

Then, when the resin is solidified upon lapse of a predetermined time period, the movable mold R is moved back to open the mold. As a result, the housings 3 remain in the housing-molding recesses 411, respectively, and the retainers 4 remain in the retainer-molding recesses 407B, respectively. When the mold is opened, the fixed-side mold plate 407 is moved away from the receiving plate 406, so that the core pins 409 and 410 are returned to their respective initial positions.

Thus, the molding process is effected, and the mold is opened, and thereafter movable-side mold plate 402 is rotated 90° about the rotation axis X (the axis of the movable mold) by the rotation drive mechanism (not shown). As a result, the two housings 3 are brought into opposed, coaxial relation to the two retainers 4, respectively, in the horizontal direction (in the drawings). Then, the movable mold R is again advanced to bring the movable-side mold plate 402 into contact with the fixed-side mold plate 407 (The mold plate 402 may be brought to a position near to the mold plate 407), so that the retainers 4 are connected to the front end portions of the housings 3, respectively, in a provisionally-retained condition. The base portion of each retainer 4 is supported by the inner surface of the retainer-molding recess 407B, and therefore the retainer 4 will not be moved back during the fitting of the retainer 4 into the housing 3.

The assembling operation is thus completed, and when the fixed mold S is again retracted, the connectors each having the housing 3 and the retainer 4 connected together remain in the housing-molding recesses 411, respectively, and each of the connectors is ejected by an ejector pin (not shown) to be discharged from the mold. Then, the movable-side mold plate 402 is rotated 90° in a reverse direction into the initial position, so that the two molds S and R are ready for a subsequent molding operation.

As described above, in this embodiment, the step of molding the housings 3 and the retainers 4 and the assembling step of connecting them together can be carried out at the same time, and therefore the conveyance and the assembling operation as required in the conventional method are not necessary, and the lead time for the finished product is shortened because of the shortened process, and the manufacturing cost can be reduced. And besides, since different kinds of molded products, that is, the housings 3 and the retainers 4, can be molded in one mold, this is advantageous from the viewpoint of management of the mold.

Ninth Embodiment

FIGS. 54 to 61 show a ninth embodiment of the invention. In this embodiment, a mold comprises a movable mold M and a fixed mold N. The movable mold M comprises a movable mold plate 416 mounted on a die plate 415. A housing-molding recess 417 for molding a housing is formed in a molding surface of the movable mold plate 416. The movable mold M is connected to a drive mechanism (not shown), and the whole of the movable mold M is reciprocally movable in right an left directions (in the drawings).

The fixed mold N comprises a fixed mold plate 419 fixedly mounted on a mounting plate 418, and an intermediate plate 420 which is connected to the mounting plate 418, and is arranged between the fixed mold plate 419 and the movable mold plate 416. A retainer-molding reception portion 421 for molding a retainer 4 is formed in a molding surface of the fixed mold plate 419. The retainer-molding reception portion 421 is disposed at the same level as that of the housing-molding recess 417, but is not aligned with the housing-molding recess 417 in the horizontal direction (in the drawings).

Figure 60:
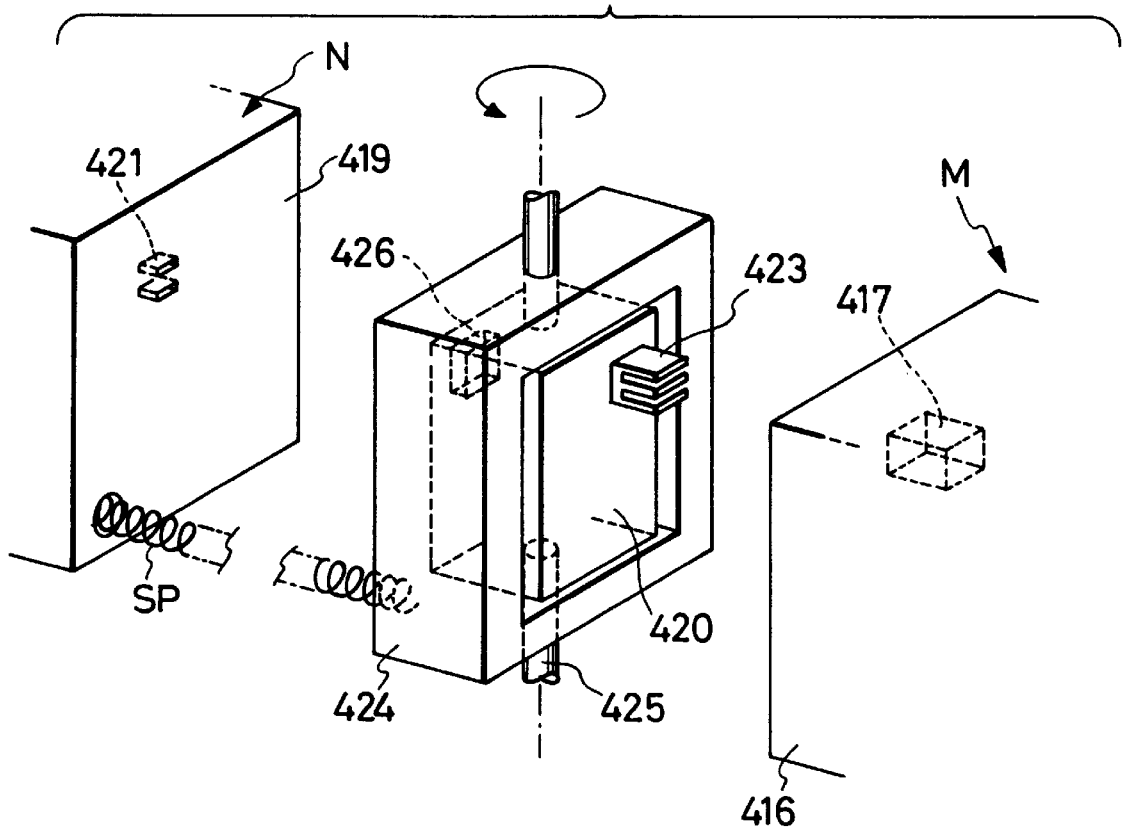
FIG. 60 is a perspective view showing the intermediate plate in the ninth embodiment.
Figure 61:
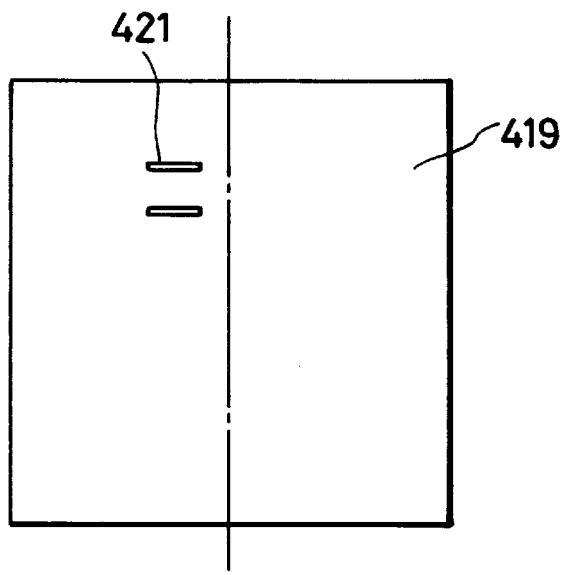
FIG. 61 is a front-elevational view of a fixed mold in the ninth embodiment.
Figure 62:
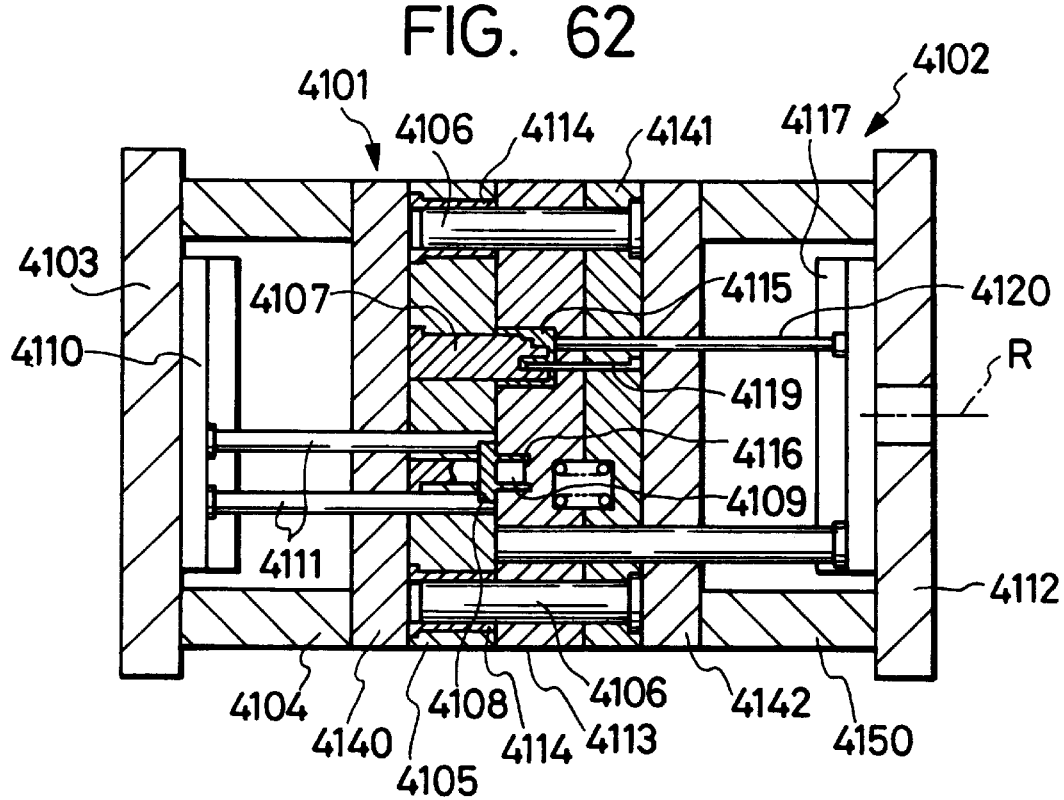
FIG. 62 is a cross-sectional view showing a condition in which a molten resin is filled in a tenth embodiment.

As shown in FIG. 60, the intermediate plate 420 is surrounded by an outer frame 424, and is rotatably supported at its upper and lower ends on the outer frame 424 by pin shafts 425. In this embodiment, the intermediate plate 420 is connected to a rotation mechanism (not shown), and can be angularly moved 180° at a time. A retainer-molding recess 426 is formed in that surface of the intermediate plate 420 which faces the fixed mold plate 419 in the normal condition (shown in FIG. 54), and when the mold is closed (see FIG. 55), the retainer-molding recess 426 cooperates with the retainer-molding reception portion 421 to form a molding cavity for molding the retainer 4. A housing-molding core pin 423 is mounted on that surface of the intermediate plate 420 which faces the movable mold plate 416 in the normal condition, and the core pin 423 and the retainer-molding recess 426 are disposed symmetrically with respect to the axis of rotation of the intermediate plate 420 (that is, the axes of the pin shafts 425). When the mold is closed, a mold cavity for molding the housing 3 is formed between the core pin 423 and the housing-molding recess 417.

A spring SP extends between the fixed mold plate 419 and the outer frame 424, and urges the outer frame 424 away from the fixed mold plate 419. Stopper means (not shown) is provided between the fixed mold plate 419 and the outer frame 424 to prevent the distance between the two from exceeding a predetermined value.

The mold of the ninth embodiment is of the above construction, and is used in the following manner. The whole of the movable mold M is moved toward the fixed mold N by the drive mechanism (not shown). As a result, the movable mold plate 416 first abuts against the intermediate plate 420 and the outer frame 424, and then when the movable mold further advances, the intermediate plate 420 and the outer frame 424 come into intimate contact with the fixed mold plate 419 while compressing the spring SP. Thus, the two molds M and N are closed together, and at this time the housing-molding core pin 423 is inserted in the housing-molding recess 417, so that the cavity for molding the housing 3 is formed therebetween. Also, the retainer-molding recess 426 is brought into registry with the retainer-molding reception portion 421, so that the cavity for molding the retainer 4 is formed therebetween. In this condition, a molten resin is filled in the two cavities.

Then, when the resin is solidified upon lapse of a predetermined time period, the movable mold M is moved back to open the mold. As a result, the housing 3 remains in the movable mold plate 416, and the retainer 4 remains in the retainer-molding recess 426 in the intermediate plate 420 (see FIG. 56).

Then, the intermediate plate 420 is rotated 180° about the pin shafts 425 by the rotation mechanism (not shown). As a result, the intermediate plate 420 is inverted, and the retainer 4 is aligned with the housing 3 in the horizontal direction (in the drawings). Then, the movable mold M is again advanced to be brought into intimate contact with the intermediate plate 420 without compressing the spring SP. As a result, the retainer 4 is connected to the front end portion of the housing 3 in a provisionally-retained condition.

The assembling operation is thus completed, and when the movable mold M is again moved back, the connector having the housing 3 and the retainer 4 connected together remains in the housing-molding recess 417, and this connector is ejected by an ejector pin (not shown) to be discharged from the mold. Then, the housing-molding core pin 423 is returned to the initial position, and the intermediate plate 420 is again inverted, so that the two molds are returned to their initial condition, and therefore are ready for a subsequent molding operation.

This ninth embodiment achieves similar effects as obtained in the eighth embodiment, and can be applied to a rear retainer-type connector.

Tenth Embodiment

A tenth embodiment of the present invention will now be described with reference to FIGS. 62 to 67. First, a connector to be molded has been described with reference to FIG. 8. As same with the previous embodiments, although the connector to be described here is a so-called front retainer-type connector, the invention can be applied to a rear retainer-type connector.

The construction of a mold for producing the connector of the above construction will now be described. In this embodiment, the mold is incorporated in an injection molding system. In the drawings, important portions are shown merely broadly, and details thereof are omitted for the sake of simplicity of the description. Therefore, details of the above construction of the connector are not shown, and for example the number and shape of core pins (described later) are merely broadly shown in the drawings.

The mold of this embodiment comprises a movable mold and a fixed mold. The fixed mold 4101, shown at a left side in the drawings, includes a fixed-side mounting plate 4103, and a fixed-side mold plate 4105 (at a right side in the drawings) is mounted on the plate 4103 through a spacer block 4104. Two guide bushings 4114 are embedded in opposite end portions of the fixed-side mold plate 4105, respectively, and extend parallel to the axis of the mold. A main core pin 4107 for mainly molding part (part of the retraction space 176, the retaining projection 177 and so on) of the internal structure of the housing 170 is mounted in the fixed-side mold plate 4105, and is directed toward the movable mold 4102 in parallel relation to the axis.

A retainer-molding recess 4108 for mainly molding the outer frame portion of the retainer 171 is formed on that surface of the fixed-side mold plate 4105 facing the movable mold, and is spaced slightly from the main core pin 4107. A core pin 4109 for molding part (part of the provisionally-retaining pawl 183, part of the hook 186 of the connection arm 179, and so on) of the internal structure of the retainer 171 is mounted in the fixed-side mold plate 4105, and extends in parallel relation to the main core pin 4107. A distal end portion of the core pin 4109 can project into the retainer-molding recess 4108, and can further project outwardly from the fixed mold 4101.

Figure 65:
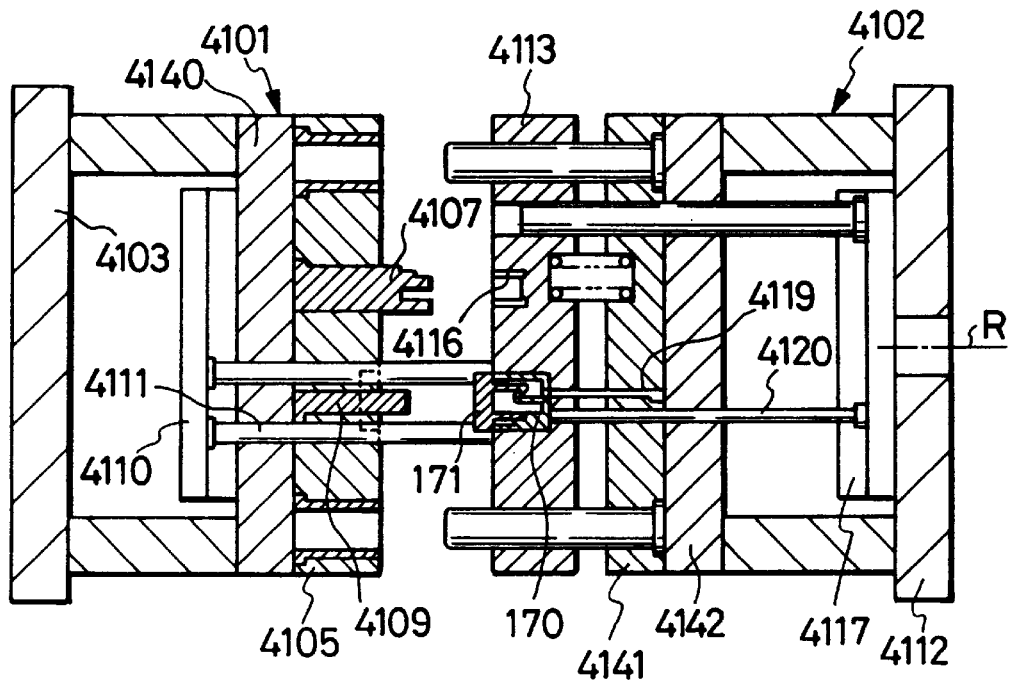
FIG. 65 is a cross-sectional view showing an assembling operation in the tenth embodiment.

A fixed-side ejecting plate 4110 is provided between the fixed-side mold plate 4105 and the fixed-side mounting plate 4103. This fixed-side ejecting plate 4110 is connected to a drive mechanism (not shown), and is reciprocally movable between the fixed-side mounting plate 4103 and a fixed-side backing plate 4140. A pair of push pins 4111 are mounted on the fixed-side ejecting plate 4110, and these push pins 4111 serve to mold the retainer 171 and also serve to eject the molded retainer. The push pins 4111 slidably extend through the fixed-side backing plate 4140 and the fixed-side mold plate 4105, with the core pin 4109 disposed therebetween. The distal ends of the push pins 4111 normally form part of the retainer-molding recess 4108, and more specifically can form part of the outer portion of the retainer 171, and when the fixed-side ejecting plate 4110 is moved as shown in FIG. 65, these distal ends, engaged with the molded retainer 171, eject it.

The movable mold 4102 is normally disposed coaxially with the fixed mold 4101, and is connected to a drive mechanism (not shown) so that the whole of the movable mold can be reciprocally moved in right and left directions (in the drawings) between a mold-closed position where the movable mold is held against the fixed mold 4101 and a mold-open position where the two mold are spaced apart from each other. The movable mold 4102 is supported for rotation a predetermined angle about its axis (axis R of rotation). More specifically, the movable mold 4102 is rotatable between a molding position where the housing 170 and the retainer 171 can be molded and an assembling position (angularly spaced 180° from this molding position) where the housing 170 and the retainer 171 are disposed in opposed, coaxial relation to each other, as will more fully be described later.

The movable mold 4102 includes a movable-side mounting plate 4112 as in the fixed mold. A movable-side backing plate 4142 is mounted on the movable-side mounting plate 4112 through spacer blocks 4150. Movable-side mold plates 4113 and 4141, separated from each other in a forward-backward direction, are supported on the front side of the movable-side backing plate 4142. A spring 4118 is provided between the two movable-side mold plates 4113 and 4141, and urges the front movable-side mold plate 4113 forwardly.

Two guide pins 4106 are mounted respectively on opposite end portions of the movable-side backing plate 4142, and extend through the two movable-side mold plates 4113 and 4141, and are projected toward the fixed mold in the axial direction. When the mold is closed and opened, the guide pins 4106 are inserted into the guide bushings 4114, respectively, thereby guiding the mold-opening and closing movements. A housing-molding recess 4115 and a retainer-molding recess 4116 are formed in that surface of the front movable-side mold plate 4113 facing the fixed mold, and the molding recess 4115 is normally in registry with the main core pin 4107, and the molding recess 4116 is normally in registry with the core pin 4109 and the two push pins 4111 for molding the retainer 171. Gates (not shown) are open respectively to the two molding recesses 4115 and 4116, and a molten resin is filled in these recesses through the respective gates.

In this embodiment, a cavity for molding the retainer 171 and a cavity for molding the housing 170, which cavities are formed when the two molds 4101 and 4102 are closed together, are disposed respectively on circles having their centers disposed on the rotation axis R (the axis of the mold), and are spaced equidistant from the rotation axis R, and are angularly spaced 180° from each other.

In the movable mold 4102, a pin plate 4117 is provided between the movable-side backing plate 4142 and the movable-side mounting plate 4112. This pin plate 4117 is connected to a drive mechanism (not shown), and is movable forward and backward in the axial direction. An ejector pin 4120 for ejecting the connector having the housing 170 and the retainer 171 connected together is mounted on the pin plate 4117, and extends parallel to the axis. A distal end of the ejector pin 4120 is normally disposed flush with an inner surface of the housing-molding recess 4115. However, when the front pin plate 4117 advances after the housing 170 and the retainer 171 are connected together, the distal end of the ejector pin 4120 is projected into the housing-molding recess 4115 to eject the assembled connector.

A sub-core pin 4119 for molding the housing 170 is mounted on the rear movable-side mold plate 4141, and extends parallel to the axis. The sub-core pin 4119 is projected into the housing-molding recess 4115 during a predetermined operation (shown in FIGS. 62 to 64) from the molding of the housing 170 so as to mold the retaining step 182. However, when the two movable-side mold plates 4113 and 4141 are moved apart from each other as shown in FIG. 63, the sub-core pin 4119 is withdrawn from the housing-molding recess 4115, and hence is withdrawn from the molded housing 170.

The step of molding the housing 170 and the retainer 171 using the above mold of the tenth embodiment, as well as the assembling step of connecting them together, will now be described.

In the mold-closed condition (FIG. 62) in which the front movable-side mold plate 4113 and the fixed-side mold plate 4105 are held in intimate contact with each other, the housing-molding recess 4115 is closed to provide a sealed space or cavity, and also a sealed space, defined by the two retainer-molding recesses 4108 and 4116 formed respectively in the fixed mold and the movable mold, serves as a cavity for molding the retainer 171. In this condition, the molten resin is filled in the two sealed cavities through the respective gates (not shown). Since the main core pin 4119 and the sub-core pin 4119 are projected into the housing-molding recess 4115, the outer shape of the housing and its internal structure (the retraction space 176, the retaining projection 177 and so on) are formed. The cavity for molding the retainer 171 is defined by the two molding recesses 4108 and 4116 mated with each other, and the core pin 4109 is projected into this molding cavity, and therefore the outer shape of the retainer 171 and its internal structure (the provisionally-retaining pawl 183, the connection arm 179 and so on) are formed.

Figure 63:
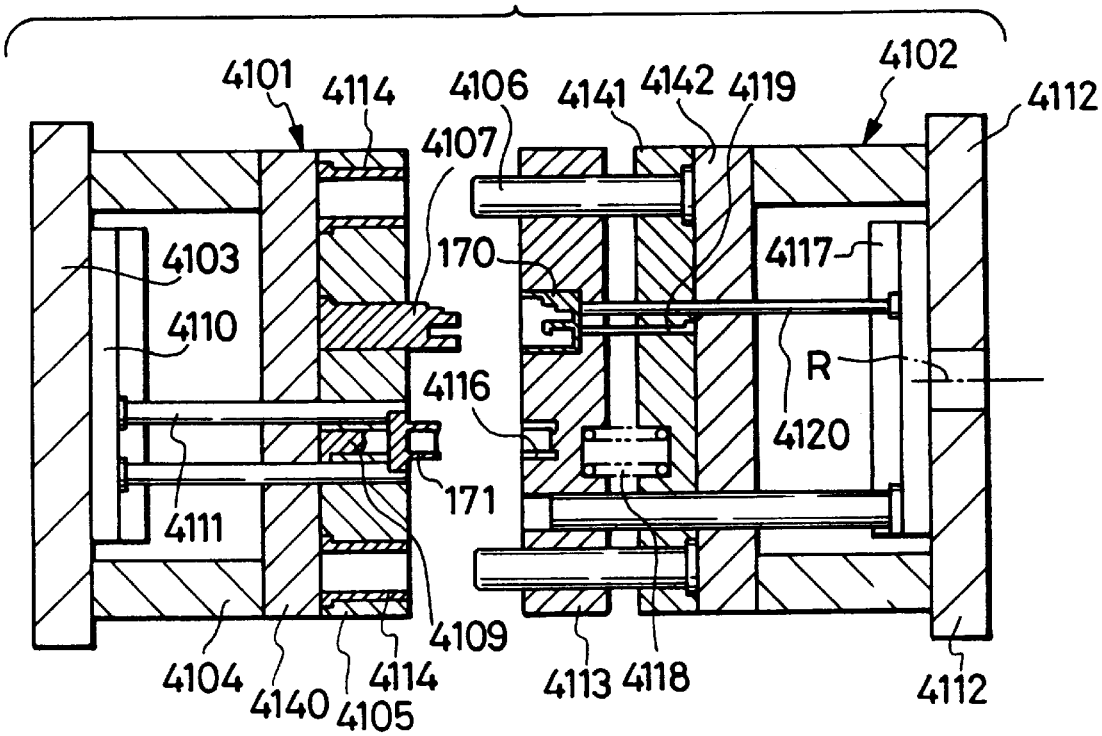
FIG. 63 is a cross-sectional view showing a mold-open condition in the tenth embodiment.
Figure 64:
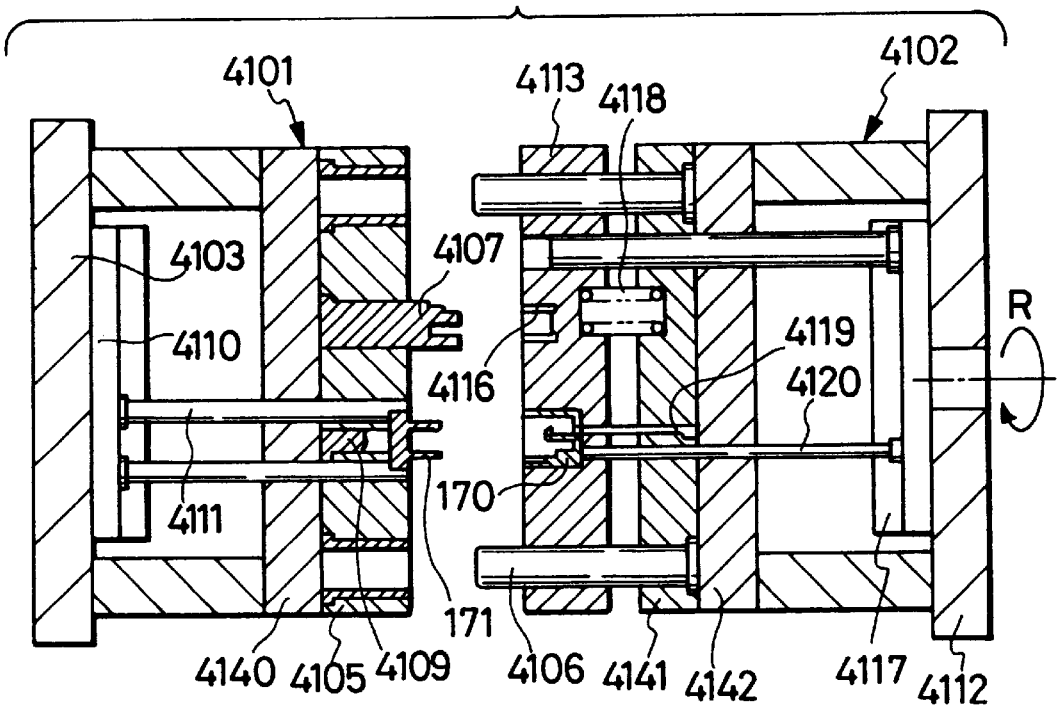
FIG. 64 is a cross-sectional view showing a condition in which a housing and a retainer are aligned with each other in the tenth embodiment.

The molten resin is thus filled, and when the resin is solidified upon lapse of a predetermined time period, the movable mold 4102 is moved back to open the mold as shown in FIG. 63. When the mold is thus opened, the housing 170 is retained in the housing-molding recess 4115 while the retainer 171 is retained in the retainer-molding recess 4108 in the fixed mold. During this mold-opening operation, the two movable-side mold plates 4113 and 4141 are moved apart from each other under the influence of the spring 4118, so that the sub-core pin 4119 is withdrawn from the housing 170 as described above. The sub-core pin 4119 serves to mold the retaining step 182 and so on as described above, and if the sub-core pin 4119 is not withdrawn from the housing 170 before the retainer 171 and the housing 170 are connected together at the later assembling step, the assembling operation is adversely affected. Therefore, this withdrawing operation is necessary.

Then, the whole of the movable mold 4102 is rotated 180° about the rotation axis R from the molding position to the assembling position as shown in FIG. 63. As described above, the housing 170 and the retainer 171 are held respectively on circles having their centers disposed on the rotation axis R, and are angularly spaced 180° from each other, and therefore when the movable mold 4102 is thus rotated, the molded housing 170 is brought into opposed, coaxial relation to the molded retainer 171.

Then, in the fixed mold 4101, the fixed-side ejecting plate 4110 is moved forward (see FIG. 65), so that the molded retainer 171 is pushed out of the retainer-molding recess 4108 (formed in the fixed mold) by the push pins 4111, and is moved toward the housing 170. At this time, the core pin 4109 is withdrawn from the retainer 171. The core pin 4109 serves to form the provisionally-retaining pawl 183 and so on, and if the core pin 4109 is not withdrawn from the retainer 171 before the retainer 171 is connected to the housing 170, the assembling operation is adversely affected. Before the retainer 171 is fitted into the housing 170 by the push pins 4111, the core pins 4109 and 4119 are thus withdrawn, and therefore the engagement of the provisionally-retaining pawl 183 with the retaining step 182 is not affected at all. Thus, the retainer 171 and the housing 170 are connected together.

Figure 66:
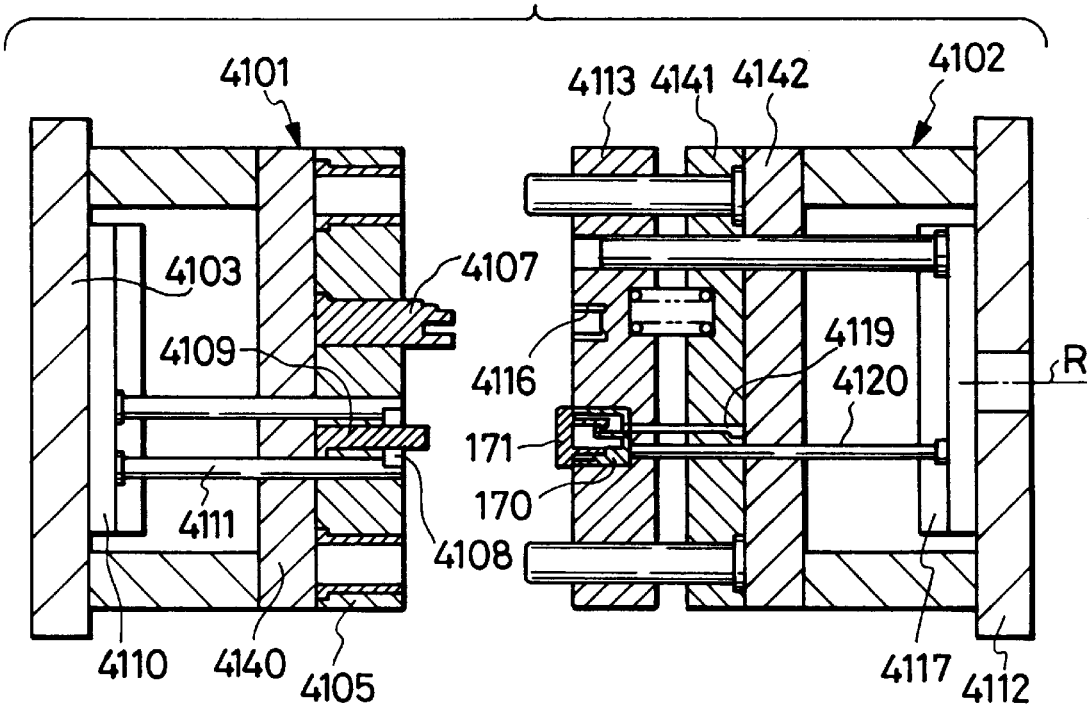
FIG. 66 is a cross-sectional view showing a condition in which a fixed-side ejecting plate is returned to its initial position in the tenth embodiment.
Figure 67:
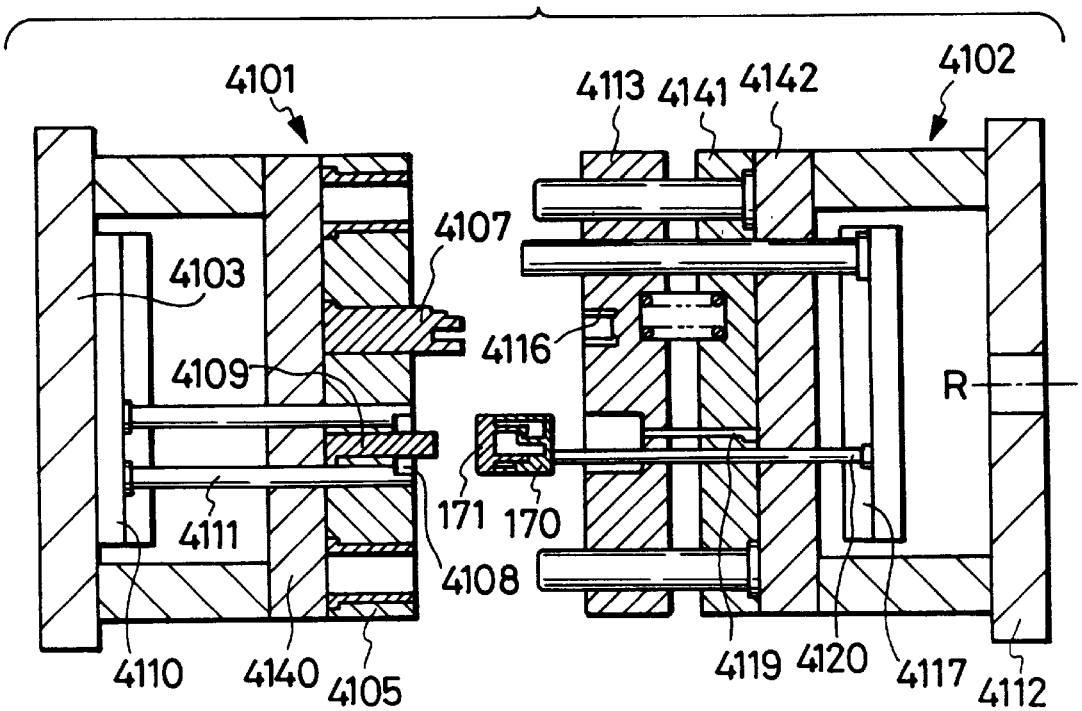
FIG. 67 is a cross-sectional view showing a discharging operation in the tenth embodiment.

Then, when the fixed-side ejecting plate 4110 is returned to the initial position, the connector, having the housing 170 and the retainer 171 connected together, remains in the movable mold as shown in FIG. 66. Then, when the pin plate 4117 is moved forward, the ejector pin 4120 pushes the housing 170, so that the connector in the assembled condition (provisionally-retained condition) is forced out of the housing-molding recess 4115 to be discharged from the mold. After the connector is thus taken out, the pin plate 4117 is returned to the initial position, and the movable mold 4102 is rotated in a direction reserve to the above-mentioned direction, and hence is returned to the initial position. The two molds 4101 and 4102 are returned to their respective initial positions, and are ready for a subsequent molding operation.

As described above, in this embodiment, the step of molding the housing 170 and the retainer 171 and the assembling step of connecting them together can be carried out at the same time, and therefore separate conveyance and assembling steps as required in the conventional method are not necessary, and the lead time for the finished product is shortened because of the shortened process, and the manufacturing cost can be reduced.

And besides, in this embodiment, the housing 170 and the retainer 171 can be connected together merely by operating the push pins. It may be proposed to effect such assembling operation utilizing the mold-closing operation. However, in this case those portions to be moved are large, and also the required energy is large. On the other hand, in this embodiment, those portions to be moved are kept to a minimum, and the construction is simple, and the energy required for the operation is small.

Since different kinds of molded products, that is, the housing 170 and the retainer 171, can be molded in one mold, this is advantageous from the viewpoint of management of the mold. Furthermore, in this embodiment, the molding core pins 4109 and 4119 are withdrawn respectively from the retainer 171 and the housing 170 before the assembling operation is effected, and therefore this achieves an advantage that the two can be smoothly connected together.

Eleventh Embodiment

FIGS. 68 to 74 show an eleventh embodiment of a mold of the invention. Referring first to a fixed mold 4101, a fixed-side mold plate 4105 is movable into and out of intimate contact with an end-drawing plate 4104. A spring 4121 is provided between the two plates 4104 and 4105, and urges the fixed-side mold plate 4105 away from the end-drawing plate 4104 in a right direction (in the drawings). Stopper means (not shown) is provided for preventing the distance between the two from exceeding a predetermined value. In order to enable the fixed-side mold plate 4105 to be smoothly moved toward and away from the end-drawing plate 4104, guide posts 4106 extend from a fixed-side mounting plate 4103, and pass through the end-drawing plate 4104, and slidably extend through the fixed-side mold plate 4105, and can be inserted respectively into guide bushings 4114 provided in a movable-side mold plate 4113.

A main core pin 4107 extends from the fixed-side mounting plate 4103, and its distal end portion is inserted into an insertion hole 4122 which is formed through the fixed-side mold plate 4105, and extends parallel to the axis. When the fixed-side mold plate 4105 is held in intimate contact with the end-drawing plate 4104 (that is, in a mold-closed condition shown in FIG. 68), that portion of the main core pin 4107 directly relevant to the molding of a housing 170 is exposed through the insertion hole 4122, and is projected into a housing-molding recess 4115 in the movable mold. When the two plates 4104 and 4105 are spaced apart from each other, this portion of the main core pin 4107 is retracted from the housing-molding recess 4115, and is completely received in the insertion hole 4122.

A core pin 4109 for molding a retainer 171 extends from the fixed-side mounting plate 4103, and is inserted into a slide hole 4123 which is formed through the fixed-side mold plate 4105, and extends parallel to the axis. In the mold-closed condition in which the fixed-side mold plate 4105 is held in intimate contact with the end-drawing plate 4104, a distal end of the core pin 4109 relevant to the molding of the retainer 171 is exposed from the slide hole 4123, and is projected into a retainer-molding recess 4116 in the movable mold. When the two plates 4104 and 4105 are spaced apart from each other, the distal end of the core pin 4109 is retracted from the retainer-molding recess 4116, and is completely received in the slide hole 4123.

Figure 73:
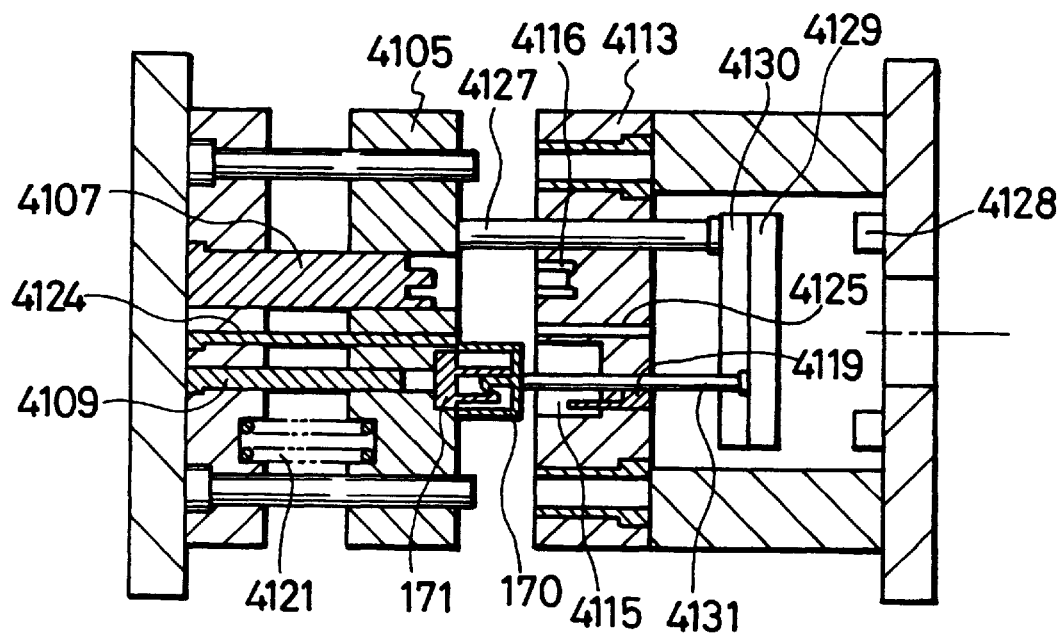
FIG. 73 is a cross-sectional view showing a condition in which the assembling operation is completed in the eleventh embodiment.
Figure 74:
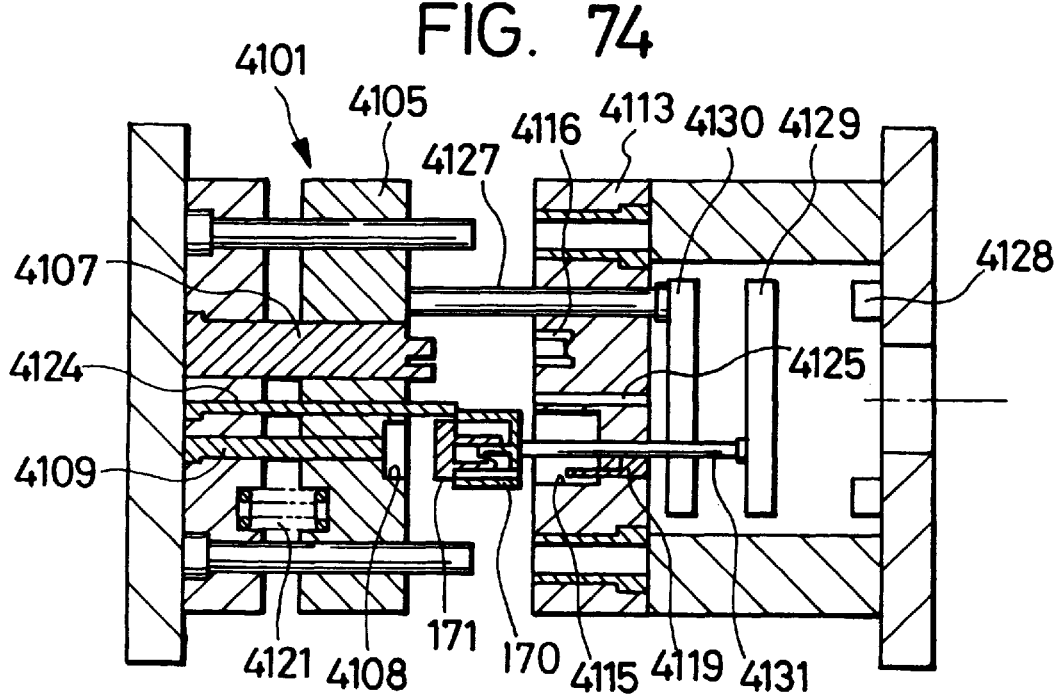
FIG. 74 is a cross-sectional view showing a condition in which the connector is discharged in the eleventh embodiment.

A fixed-side ejector pin 4124 is mounted on the fixed-side mounting plate 4103, and disposed between the main core pin 4107 and the core pin 4109. This ejector pin 4124 is slidably inserted into the fixed-side mold plate 4105. When the fixed mold 4101 and the movable mold 4102 are closed together, the fixed-side ejector pin 4124 is inserted into a relief hole 4125 formed through the movable-side mold plate 4113. In the mold-open condition, the distal end of the ejector pin 4124 is disposed substantially flush with the surface of the fixed-side mold plate 4105. When the fixed-side mold plate 4105 is slightly retracted by a return pin 4127 as shown in FIG. 73, the ejector pin 4124 projects from the fixed-side mold plate 4105 to contact the housing of the assembled connector, thereby ejecting the connector from the mold.

With respect to the movable mold 4102, this fourth embodiment is different in that the retainer 171 is not ejected to be connected to the housing 170, but the housing 170 is ejected to be connected to the retainer. More specifically, first and second pin plates are coaxially provided between the movable-side mold plate 4113 and a movable-side mounting plate 4112 through a spacer member 4128.

Figure 72:
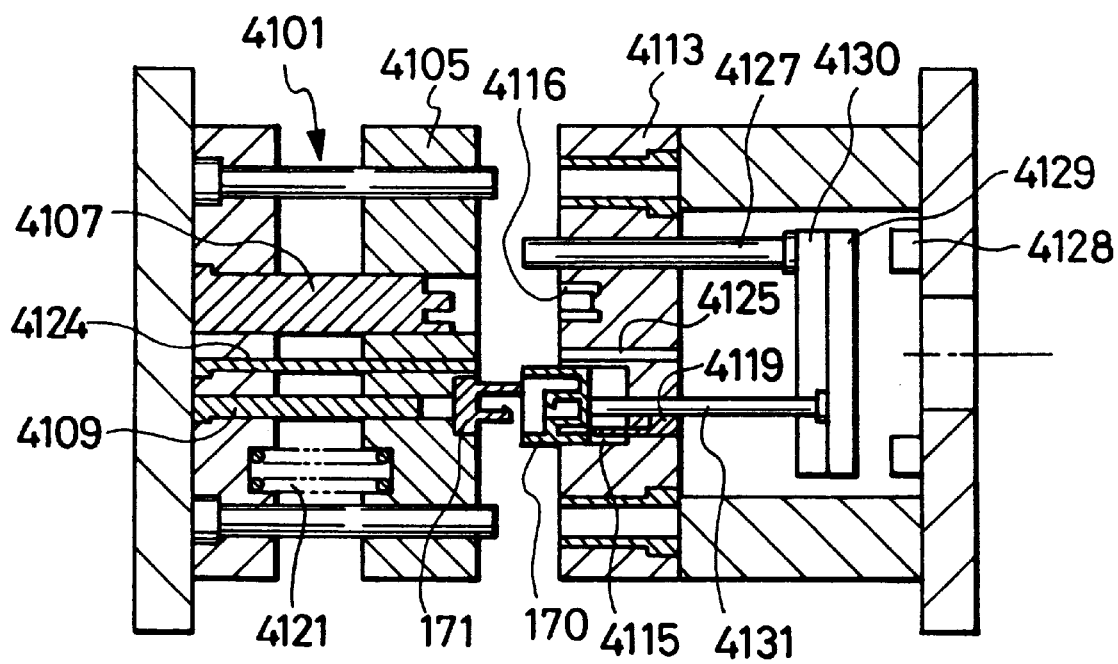
FIG. 72 is a cross-sectional view showing an initial stage of an assembling operation in the eleventh embodiment.

An ejector pin 4131 is mounted on the first pin plate 4129 in parallel relation to the axis, and is connected to a drive mechanism (not shown) so as to move forward and backward along the axis. A distal end of the ejector pin 4131 is normally disposed substantially flush with a surface of the housing-molding recess 4115. When the first pin plate 4129 advances a predetermined stroke together with the second pin plate 4130, the ejector pin 4131 ejects the molded housing 170 from the housing-molding recess 4115 to connect the same to the retainer 171 in a provisionally-retained condition, as shown in FIG. 72.

The second pin plate 4130 is also connected to a drive mechanism (not shown) (which may also serve as the drive mechanism for the first pin plate 4129 or a separate drive mechanism), and is movable forward and backward along the axis. The return pin 4127 is mounted on the second pin plate 4130 in parallel relation to the axis, and the distal end of the return pin 4127 is normally disposed substantially flush with the surface of the movable-side mold plate 4113. When the second pin plate 4130 advances together with the first pin plate 4129 as shown in FIG. 72, the return pin 4127 contacts the fixed-side mold plate 4105. Then, when the return pin 4127 is further advanced a predetermined stroke, the return pin 4127 retracts the fixed-side mold plate 4105 against the bias of the spring 4121, so that the connector, having the parts connected together in the provisionally-retained condition, is ejected by the fixed-side ejector pin 124.

As in the tenth embodiment, the whole of the movable mold can be rotated about the rotation axis R between a molding position and an assembling position, and a retainer-molding cavity and a housing-molding cavity, which are formed between the two molds in the mold-closed condition, are disposed respectively on circles having their centers disposed on the rotation axis R, and are angularly spaced 180° from each other.

A sub-core pin 4119 relevant to the molding of the housing 170 is embedded in the movable-side mold plate 4113.

Figure 68:
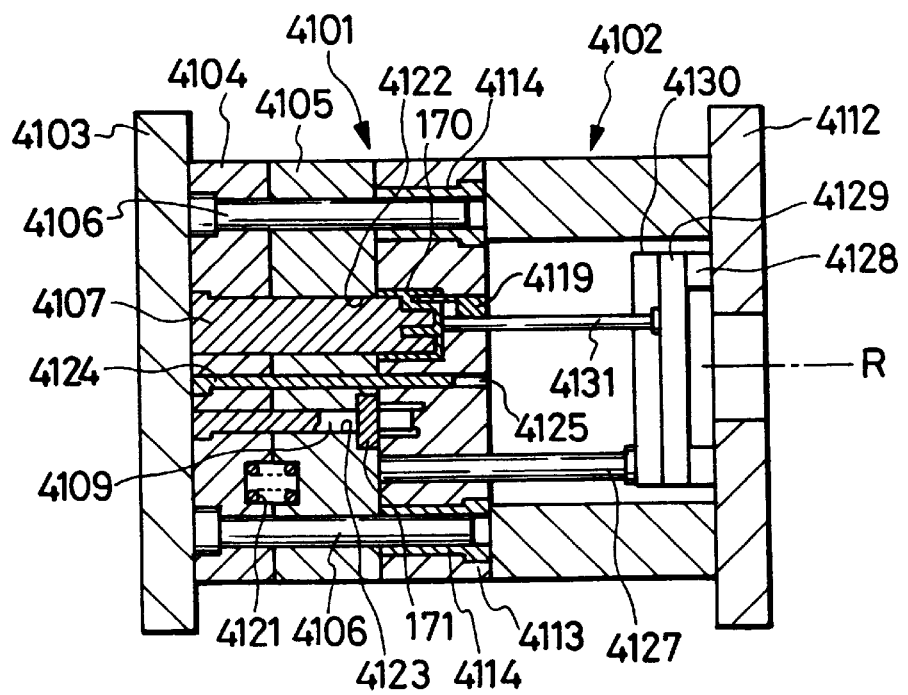
FIG. 68 is a cross-sectional view of a eleventh embodiment of a mold, showing a condition in which a molten resin is filled.
Figure 69:
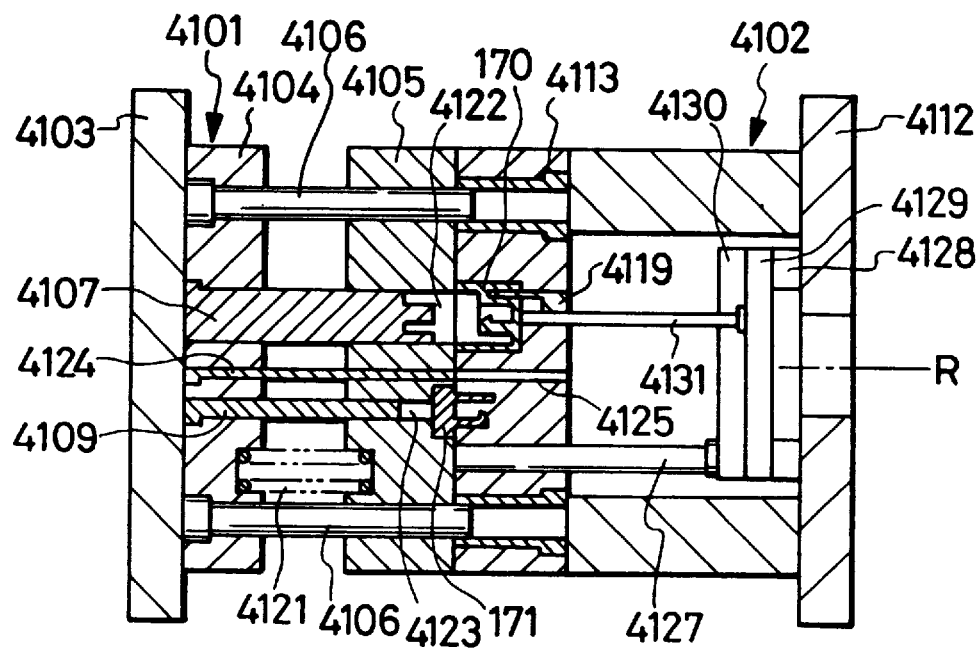
FIG. 69 is a cross-sectional view showing a condition in which core pins are withdrawn in the eleventh embodiment.
Figure 70:
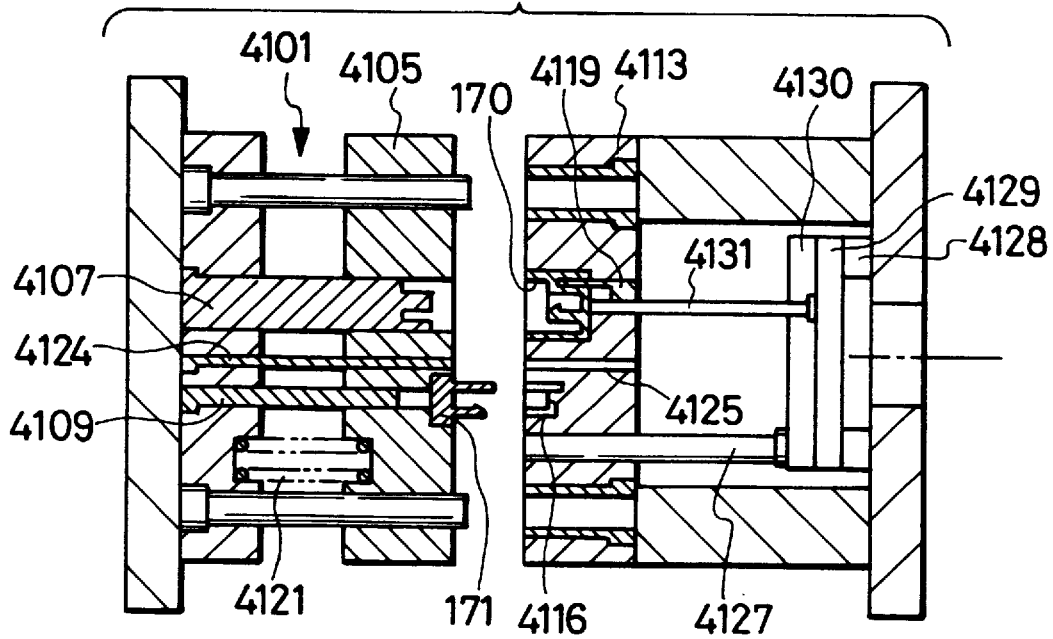
FIG. 70 is a cross-sectional view showing a mold-open condition in the eleventh embodiment.
Figure 71:
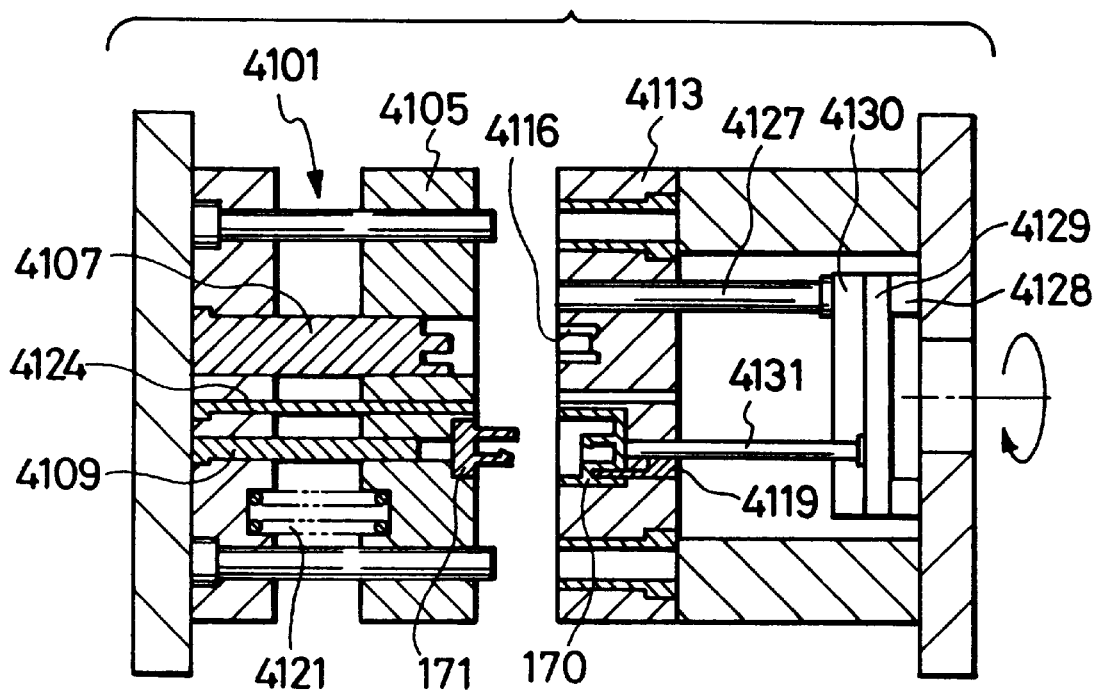
FIG. 71 is a cross-sectional view showing a condition in which a housing and a retainer are aligned with each other in the eleventh embodiment.

The mold of the eleventh embodiment is of the above construction, and in the mold-closed condition shown in FIG. 68, a molten resin is filled in the molding cavities formed between the two mold plates 4105 and 4113, thereby molding the housing 170 and the retainer 171. Then, when the molten resin is solidified, the movable mold 4102 is moved back. In accordance with this backward movement of the movable mold 4102, the fixed-side mold plate 4105 is spaced apart from the end-drawing plate 4104 under the influence of the spring 4121, and as a result the main core pin 4107 is withdrawn from the molded housing 170 while the core pin 4109 is withdrawn from the retainer 171 (see FIG. 69). When the movable mold 102 further moves back, there is achieved the mold-open condition in which the movable-side mold plate 4113 and the fixed-side mold plate 4105 are spaced apart from each other, as shown in FIG. 70.

Then, the whole of the movable mold 4102 is rotated 180° about the rotation axis R from the molding position to the assembling position. As a result, the molded housing 170 is brought into opposed, coaxial relation to the molded retainer 171 (see FIG. 71).

When the movable mold is thus rotated into the assembling position, the first and second pin plates 4129 and 4130 are moved forward as shown in FIG. 72. As a result, the ejector pin 4131 forces the housing 170 out of the housing-molding recess 4115, and fits the housing 170 on the retainer 171 held on the fixed mold. The sub-core pin 4119 is withdrawn from the housing 170 simultaneously when the housing 170 is ejected from the housing-molding recess 4115, and therefore the sub-core pin 4119 will not affect the connection of the housing to the retainer 171 (e.g. the engagement between the provisionally-retaining pawl 183 and the retaining step 182), and the housing and the retainer are connected together in the provisionally-retained condition. At this time, the distal end of the return pin 4127 is held in slight contact with the surface of the fixed-side mold plate 4105, and the front end of the housing 4170 is held in contact with the distal end of the fixed-side ejector pin 4124.

Then, when only the second pin plate 4130 is moved forward as shown in FIG. 73, the return pin 4127 retracts the fixed-side mold plate 4105 against the bias of the spring 4121. As a result, the fixed-side ejector pin 4124 ejects the housing 170, so that the connector, having the housing 170 and the retainer 171 connected together, is forced out of the retainer-molding recess 4108 in the fixed mold, and is discharged from the mold. Thus, the connector is taken out, and then the first and second pin plates 4129 and 4130 are returned to their respective initial positions, and the whole of the movable mold is returned to the initial position, so that the mold is ready for a subsequent molding operation.

As described above, in the eleventh embodiment as in the tenth embodiment, the production and assembling of the connector can be easily carried out at low costs.

The other construction of this embodiment is similar to that of the tenth embodiment, and similar effects are achieved.

Figure 49:
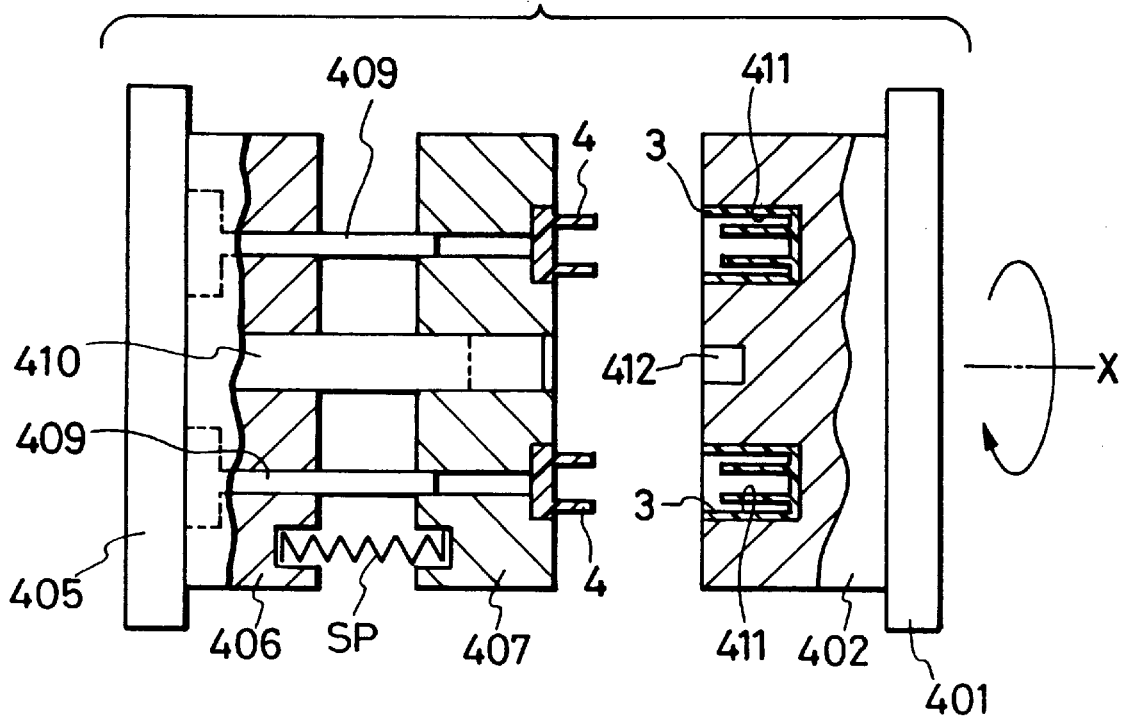
FIG. 49 a cross-sectional view showing a registration operation in the eighth embodiment.
Figure 50:
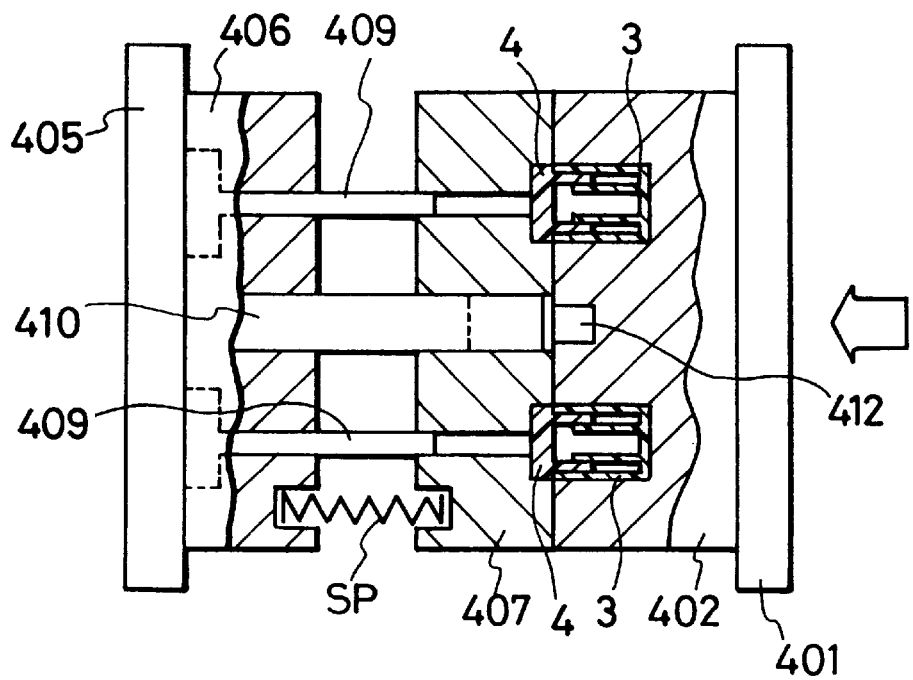
FIG. 50 is a cross-sectional view showing a condition in which housings are connected respectively to retainers in the eighth embodiment.
Figure 51:
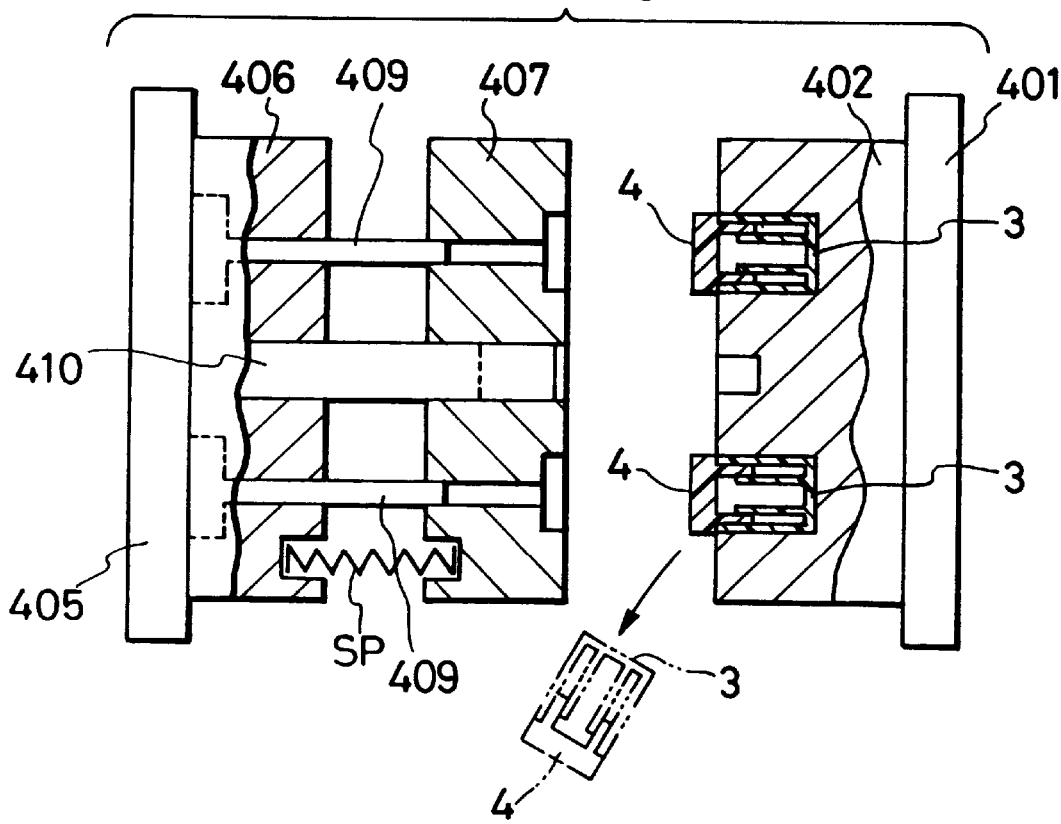
FIG. 51 is a cross-sectional view showing a condition in which the finished products are taken out in the eighth embodiment.
Figure 52:
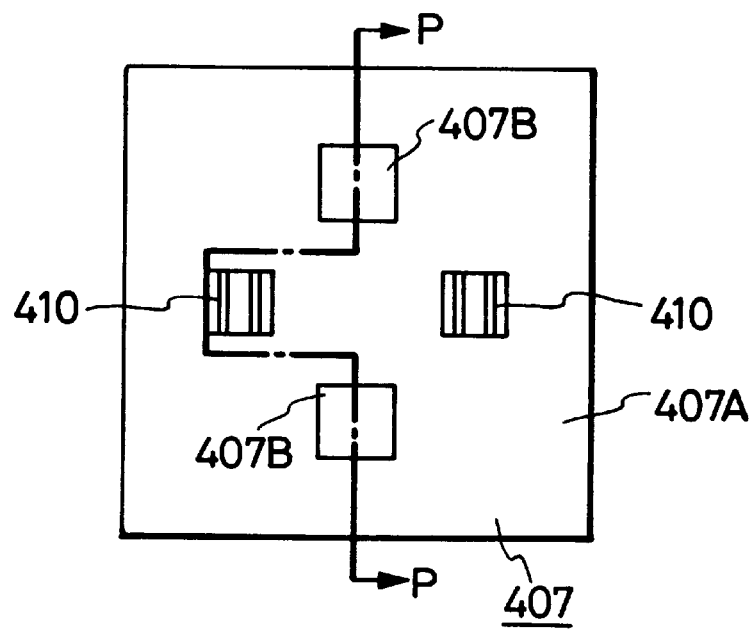
FIG. 52 is a front-elevational view of a movable-side mold plate in the eighth embodiment.
Figure 57:
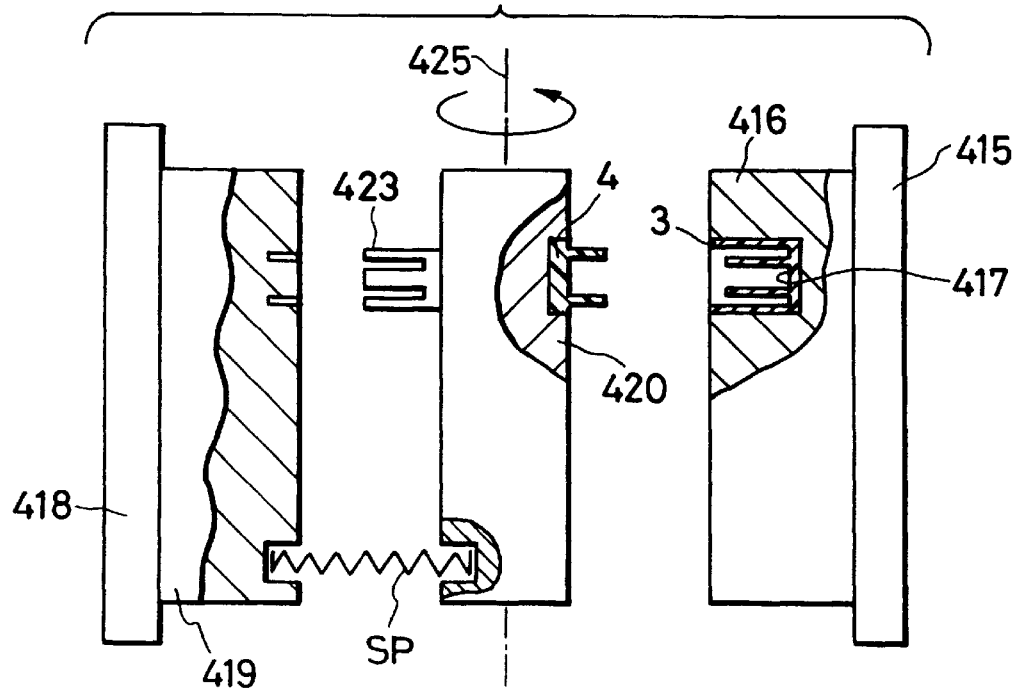
FIG. 57 is a cross-sectional view showing a condition in which an intermediate plate is inverted in the ninth embodiment.
Figure 58:
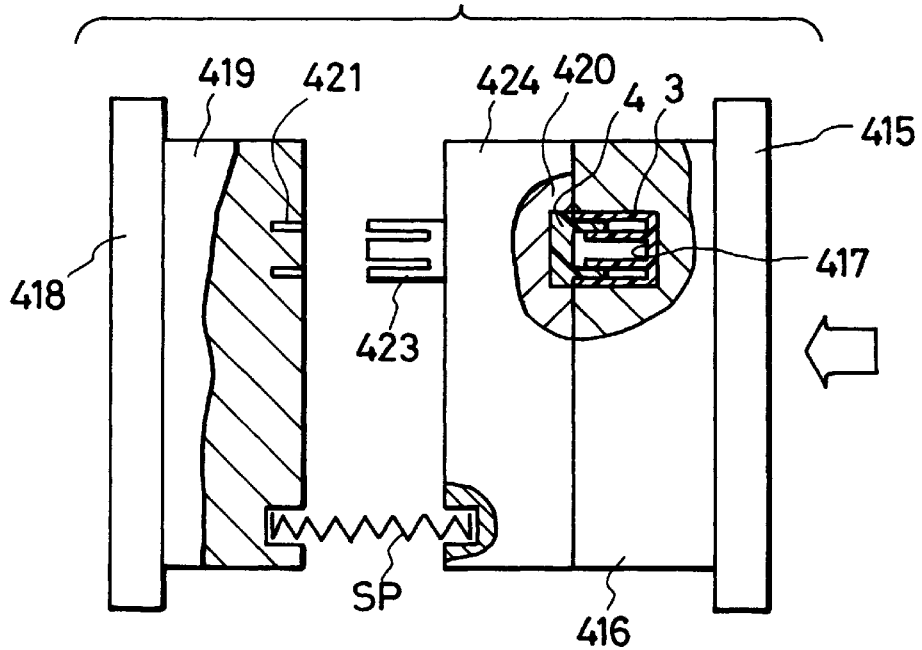
FIG. 58 is a cross-sectional view showing a condition in which a housing and a retainer are connected together in the ninth embodiment.
Figure 59:
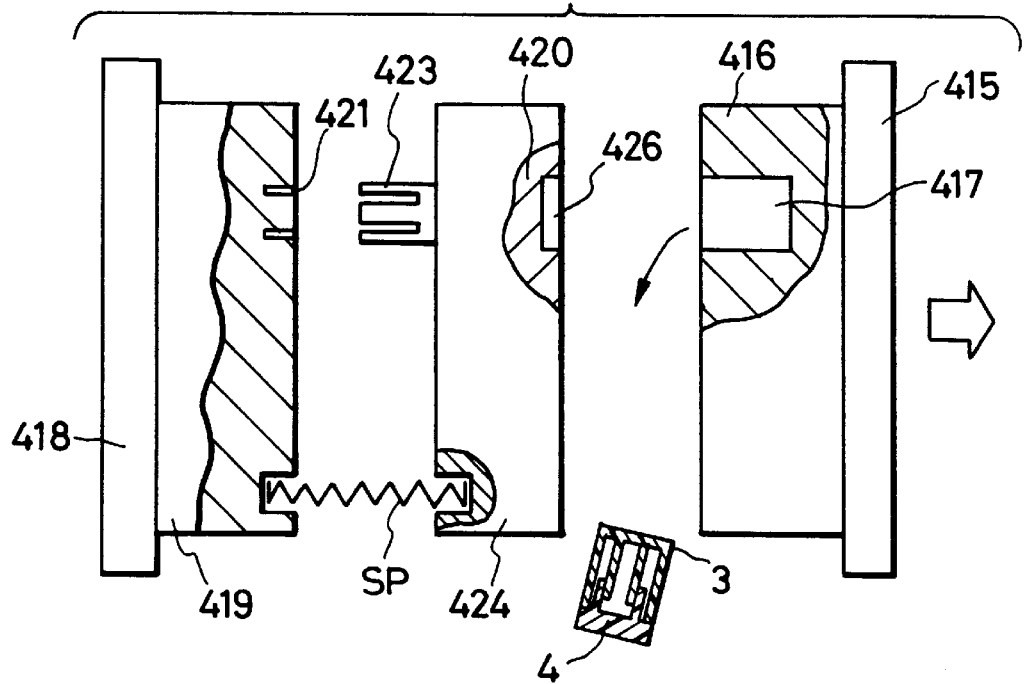
FIG. 59 is a cross-sectional view showing a condition in which the finished product is taken out in the ninth embodiment.

Various modifications can be made in the present invention, and the following modifications fall within the scope of the invention:

In the eighth and ninth embodiments, the assembling operation of connecting the molded retainer 4 and the molded housing 3 together is effected in accordance with the mold re-closing operation. However, instead of this, the following arrangement may be used:

For example, a knockout pin (not shown) is provided on the movable-side mold plate 402. When the molding is completed as shown in FIG. 49 or FIG. 57, the knockout pin is driven to push the molded housing 3 toward the retainer 4, thereby connecting the retainer and the housing together. The thus assembled connector is disengaged from the housing-molding recess because of its own weight (An ejector pin for this purpose may be provided), and is discharged from the mold.

In the tenth and eleventh embodiments, although the arrangement in which the housing and the retainer of the connector are connected together has been shown and described, the present invention can be applied to other various resin-molded products, and the number of the molded products is not limited to two, but the invention can be applied to an arrangement in which more than two parts are to be connected together.

In the tenth and eleventh embodiments, although only the movable mold is displaced or moved in the axial direction, both of the two molds may be movable.

In the tenth and eleventh embodiments, although the whole of the movable mold is rotated, only that portion of the movable mold facing the fixed mold can be rotated, or both of the movable mold and the fixed mold may be rotated.

In the tenth and eleventh embodiments, although one connector is molded and assembled, the mold may be of the type capable of handling a plurality of connectors at the same time, and in this case the angle of rotation of the mold is determined in accordance with the arrangement of the plurality of pairs of molding cavities having their centers disposed on the common axis.

Furthermore, according to the invention, when forming of the connector housing and the retainer, different resins in material or color may be filled in the connector forming mold and the retainer forming mold, so that the connector housing and the retainer can be made different in material or color.

What is claimed is:

1. A mold for producing a resin-molded product assembled from at least two resin components, said mold comprising:
   a pair of metal molds defining molding cavities to mold said at least two resin components including a first resin component and a second resin component matable with the first resin component, the pair of molds being movable towards and away from each other in an axial direction;
   a moving mechanism for moving one of said first and second resin component to face the first and second resin components with each other;
   an intermediate core mounted on one of said two molds, surfaces of said intermediate core respectively facing said two molds to form respective molding cavities for respectively molding said first and second resin components when said two molds are closed together, said intermediate core being movable between a position where said intermediate core forms said molding cavities and a retracted position to which said intermediate core is displaced after the molding so that the two molded resin components can be directly opposed to each other on a common axis, said retracted position being spaced perpendicularly from the direction of opening and closing of said two molds;
   an assembly mechanism, provided in at least one of said two molds, that displaces the second resin component toward the first resin component so as to assemble the first and second resin components together in a predetermined condition; and
   an intermediate plate movably mounted on said one of said two molds for movement in the axial direction, with the intermediate core being movably mounted on said intermediate plate.

2. A mold as claimed in claim 1, wherein said metal molds form a plurality of molding cavities at different positions between opposed surfaces of said two molds when said two molds are closed together; and
   wherein said moving mechanism moves said two molds relative to each other in a direction perpendicular to the axial direction in the mold-opened condition after the molding, so that the first and second resin components, which are retained respectively on the opposed surfaces of said two molds, are faced opposed each other.

3. A mold as claimed in claim 1, wherein said metal molds form a plurality of molding cavities at different positions between opposed surfaces of said two molds when said two molds are closed together,
   wherein said moving mechanism rotates at least one of said two molds a predetermined angle about a rotation axis, and
   wherein said molding cavities are disposed respectively on circles having their centers disposed on said rotation axis.

4. A mold as claimed in claim 1, wherein said intermediate plate is biased axially away from said one of said two molds by a biasing member.

5. A mold for producing a resin-molded product assembled from at least two resin components, said mold comprising:
   a pair of metal molds defining molding cavities to mold said at least two resin components including a first resin component and a second resin component matable with the first resin component, the pair of molds being movable towards and away from each other in an axial direction;
   a moving mechanism for moving one of said first and second resin component to face the first and second resin components with each other;
   an intermediate core mounted on one of said two molds, surfaces of said intermediate core respectively facing said two molds to form respective molding cavities for respectively molding said first and second resin components when said two molds are closed together, said intermediate core being movable between a position where said intermediate core forms said molding cavities and a retracted position to which said intermediate core is displaced after the molding so that the two molded resin components can be directly opposed to each other on a common axis, said retracted position being spaced perpendicularly from the direction of opening and closing of said two molds;
   an assembly mechanism, provided in at least one of said two molds, that displaces the second resin component toward the first resin component so as to assemble the first and second resin components together in a predetermined condition; and
   an intermediate plate movably mounted on said one of said two molds for movement in the axial direction, with the intermediate core being movably mounted on said intermediate plate,
   wherein said intermediate plates includes a relief window formed through a portion of said intermediate plate, and an ejector mechanism ejects said second resin component through the relief window to assemble the first and second resin components together.

6. A mold as claimed in claim 5, wherein said intermediate plate is biased axially away from said one of said two molds by a biasing member.

* * * * *